United States Patent [19]
Barton

[11] Patent Number: 5,317,737
[45] Date of Patent: May 31, 1994

[54] METHOD AND APPARATUS FOR CONTROLLING A RE-ENTRANT SYNCHRONIZATION LOCK TENURE IN A MULTIPROCESSOR SYSTEM

[75] Inventor: Richard R. Barton, Lexington, S.C.

[73] Assignee: NCR Corporation, Dayton, Ohio

[21] Appl. No.: 737,115

[22] Filed: Jul. 29, 1991

[51] Int. Cl.$^5$ .............................................. G06F 12/14
[52] U.S. Cl. .............................. 395/650; 364/DIG. 1;
364/228.1; 364/228.3; 364/246.8; 364/281.5
[58] Field of Search ......................................... 395/650;
364/DIG. 1 MS File

[56] References Cited

U.S. PATENT DOCUMENTS

| | | |
|---|---|---|
| 4,189,771 | 2/1980 | Roever . |
| 4,316,245 | 2/1982 | Luu et al. . |
| 4,318,182 | 3/1982 | Bachman et al. . |
| 4,320,451 | 3/1982 | Bachman et al. . |
| 4,403,285 | 9/1983 | Kikuchi . |
| 4,435,766 | 3/1984 | Haber et al. . |
| 4,445,197 | 4/1984 | Lorie et al. . |
| 4,480,304 | 10/1984 | Carr et al. . |
| 4,494,193 | 1/1985 | Brahm et al. . |
| 4,594,657 | 6/1986 | Byrns . |
| 4,791,554 | 12/1988 | Hirota et al. ................. 364/DIG. 1 |
| 5,175,852 | 12/1992 | Johnson et al. ............... 364/DIG. 2 |
| 5,202,990 | 4/1993 | Saikawa ........................ 364/DIG. 1 |

*Primary Examiner*—Thomas M. Heckler
*Attorney, Agent, or Firm*—Paul W. Martin; Jack R. Penrod

[57] ABSTRACT

A method and apparatus for extending a tenure of a process that owns a system process that has shared data or resources and also is requesting the owned system process. The ability to extend the tenure of the owning process allows the nesting of requests to the system process. By properly ordering how the requests are nested, deadlocks may be avoided. Additionally, by extending the tenure of a current process, some unnecessary changes in processor instructions and data may be avoided and processing efficiency increased.

8 Claims, 3 Drawing Sheets

METHOD AND APPARATUS FOR CONTROLLING A RE-ENTRANT SYNCHRONIZATION LOCK TENURE IN A MULTIPROCESSOR SYSTEM

BACKGROUND OF THE INVENTION

The present invention relates to computer systems having multiple parallel processors, and more particularly to a method for a process requesting access to a second process that is currently owned by the requesting process to have its request extend the current tenure of the second process such that all of the requests of the current owning process are fulfilled before the second process is released.

In systems with multiple parallel processors, data and resources are typically shared by the various tasks being performed by the multiple processors. Since more than one processor may request the use of shared data or resources at a time, some method of operation must be provided to ensure data coherency, such that only the currently accessing processor may access and change the shared data. A similar method of operation must be provided to ensure the coherency of data provided to a shared resource and its software interface. For example, something must prevent two or more processors from outputting data from two different files to a shared printer at the same time. Otherwise, the page printed may have characters and words that are an unintelligible and incoherent admixture of the two data files.

A common way to ensure the coherency of shared data and shared resources in UNIX computer systems (UNIX is a registered trademark of UNIX Systems Laboratory Corporation) and computer systems with operating systems similar to UNIX is to provide a synchronization lock for the shared data or resource. The synchronization lock locks out access by any processor or process until the currently accessing process, referred to as the owner, has completed the access that is currently executing.

The capability to lock out all competing requests for the period of the required access is provided by a synchronization lock. This is accomplished by a portion of the process that accesses the shared data or resource first requesting ownership of the synchronization lock by means of a locking synchronization process, called a primitive, before actually accessing the shared data or resource. If the synchronization lock is not owned at the time, the requesting process is assigned ownership of the synchronization lock and the requesting and owning process accesses to the shared data or resource. After the access is completed, the requesting and owning process releases the shared data or resource by means of an unlocking synchronization primitive. Such operations are well known by those skilled in the use of the UNIX operating system.

A problem arises when the process which is the owner of the synchronization lock requests a further access to the shared process while the shared process is occupied with a current access from the owner. Such a situation, if the shared data or resource is essential to the further execution of the owning process, the owning process may hold the locked process or resource, on the one hand, while also waiting for the locked process or resource to be released, on the other hand. This leads to a deadlock condition where the requesting and owning process cannot progress any further, since it is both holding the lock and waiting for the locked process or resource to be released, if some type of deadlock prevention is not included.

Another problem that occurs when the owning process must make an additional access to the locked process or resource that is currently owned, is the problem of processing inefficiency. When an owning process must release a synchronous lock and a subsequent process acquires that synchronous lock considerable amount of processor time is consumed. When the subsequent processor releases the synchronous lock and it is re-acquired by the previous owner even more processor time is consumed. Furthermore, if one or both of the processors switch context while waiting to acquire ownership of the requested synchronization lock, even more processor time will be consumed. The processing time consumed is an inefficient use of the system's data processing capabilities and such consumption should be kept as low as possible.

Therefore, it is an object of this invention to provide a method for extending a tenure level of an owning process to a shared process or resource to prevent a deadlock condition and to decrease inefficiency.

It is another object of this invention to provide a method for incrementally releasing a tenure level that maintains lock ownership until all current requests of a current lock owner are fulfilled.

SUMMARY OF THE INVENTION

Accordingly the present invention provides a method for use in a multiple processor computer system that changes a tenure of a current owner of a reentrant synchronization lock in order to allow the current owner to re-enter the locked process and exchange information therewith.

In one aspect, the present invention of a method for changing a tenure of the current owner of a re-entrant synchronization lock to allow the current owner to re-enter the locked process includes the steps of accessing a first set of data that identifies the process that is the current owner of the synchronization lock, determining if the process that is the current owner of the synchronization lock is the same process as the one that is requesting ownership of the synchronization lock. If it is the same process, the tenure level of the synchronization lock is increased by one and the method is exited. If the requesting process is not the current owner, then the method acquires exclusive access to a second set of data that represents a state of the synchronization lock. The method reads the second set of data and determines if the synchronization lock of the requested process is owned by any process. If the synchronization lock is not owned, the method assigns the current lock requester as the current owner of the synchronization lock, assigns a current tenure level of the current owner to one, releases the exclusive access to the set of data and exits the method.

In another aspect, the present invention of a method for use in a multiple processor computer system for changing a tenure of a current owner of a reentrant synchronization lock includes the steps of if the requesting process is not the current owner, then the method acquires exclusive access to a set of data that represents a current state of the synchronization lock. The method reads the set of data and determines if the synchronization lock of the requested process is owned by another process. If the synchronization lock is owned, the method releases said exclusive access to the set of data and performs a separate predetermined contention process so the unfulfilled requesting process may contend for the requested process upon a release of the synchronization lock. After performing the predetermined contention process, requesting process returns to attempt to gain access to the requested process again.

BRIEF DESCRIPTION OF THE DRAWINGS

While the specification concludes with the appended claims particularly pointing out and distinctly claiming the subject matter which is regarded as the invention, it is believed that the invention will be better understood from the following detailed description of the illustrative embodiment taken in conjunction with the accompanying drawings in which:

DETAILED DESCRIPTION OF A PREFERRED EMBODIMENT

Figure 1:
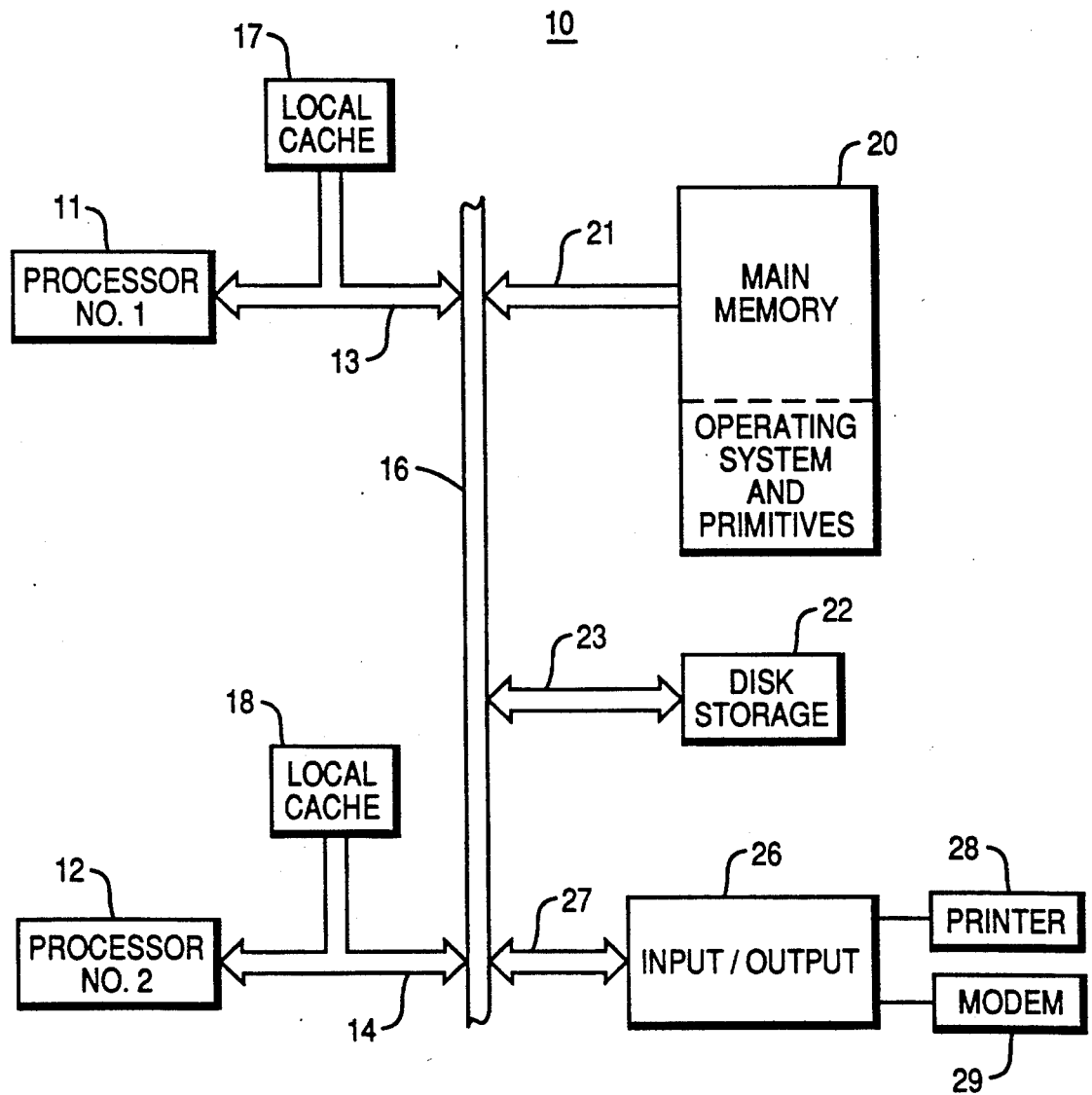
FIG. 1 is a block diagram of a multiple processor system useful for practicing the invention.

FIG. 1 shows a general multiple processor system 10 of a type that is useful for practicing the invention. The processors 11 and 12 are each connected via respective local buses 13, 14 to a shared system bus 16. Each processor also has a respective local cache 17, 18 connected to its respective local bus 13, 14. Such a system is described in copending application U.S. Patent Office Ser. No. 645,073 by the same inventor, and commonly assigned to NCR Corporation.

A main memory 20 is connected to the system bus via bus 21. Typically the main memory 20 has a copy of the operating system and its associated primitive processes therein. The main memory 20 typically maintains a copy of shared data if it is not swapped out to virtual memory.

A disk storage subsystem 22 is also connected to the system bus 16 via a bus 23. Typically the long term storage of the operating system and its associated primitive processes are permanently stored in the disk storage subsystem 22 and loaded into the main memory 20 during an initialization. The disk storage subsystem 22 also provides virtual storage when used in conjunction with an operating system that uses the disk memory as virtual memory, such as the UNIX Operating System.

An input/output subsystem 26 is connected via a bus 27 to the system bus 16. The input/output subsystem 26 provides connections between shared devices such as a printer 28, a modem 29, et cetera.

Figure 2:
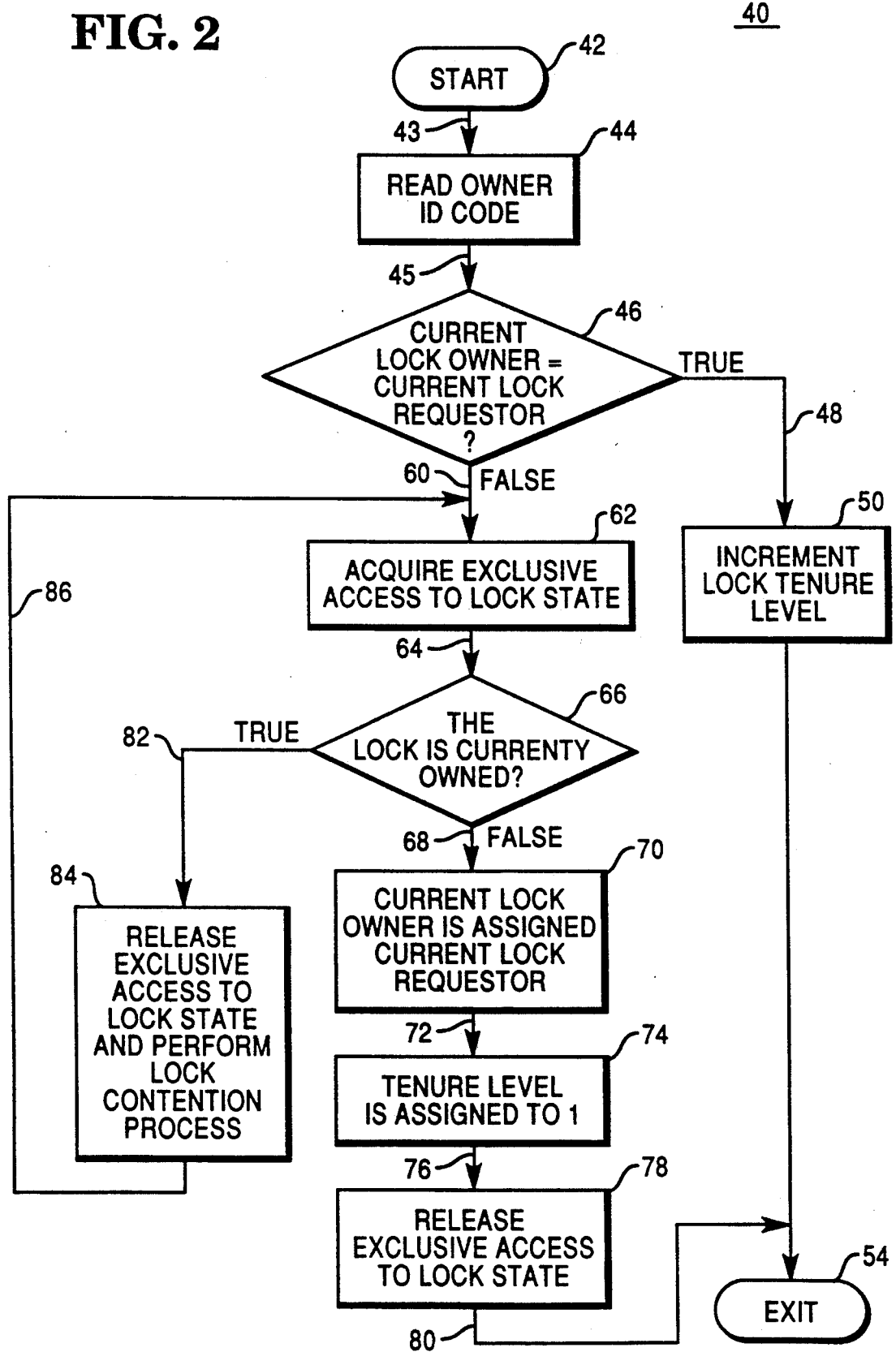
FIG. 2 is a flow diagram of a process that provides a re-entrant synchronization lock tenure according to one embodiment of the invention.

Referring now to FIG. 2, a method 40 to change a tenure level of a synchronization lock of a shared process or resource begins at start 42. After beginning at start 42, the method follows path 43 to action 44. At action 44, a requesting processor, for example processor 11 or 12, reads a set of data that contains an identification code of the current owner of the synchronization lock. Since the processor only reads the identification code and does not change the code in any way, it is not necessary to acquire exclusive access to the entire set of lock state data. After the identification code data is read, the method 40 follows the path 45 to the operation 46. At operation 46, the method determines if the current lock owner is the same as the process requesting ownership of the synchronous lock. If the process that is currently requesting the lock is the same as the current lock owner, the method follows path 48 to the action 50. Action 50 increments a tenure level associated with the current owner of the synchronous lock. After the tenure level is incremented at action 50, the method follows path 52 to an exit 54 of the method 40.

On the other hand, if the method 40 determines at operation 46 that the current lock owner is not the same as the current lock requester the method 40 follows path 60 to an action 62. At action 62 the requesting process acquires exclusive access to a set of state data that indicates the present state of the requested synchronization lock. After exclusive access to the state data has been acquired at action 62, the method follows path 64 to an operation 66. At the operation 66, the method 40 determines if the requested synchronization lock is owned. Since the previous operation 46 determined that the current lock owner is not the same as the current lock requester, there are only two remaining possibilities: the requested synchronization lock is currently not owned by any process, and the requested synchronization lock is currently owned by another process.

If the requested synchronization lock is currently not owned, the method 40 follows path 68 to an action 70. At action 70, the requesting process that has acquired exclusive access to the synchronization lock state data is assigned as the current synchronization lock owner, i.e. its process identification code is written into the set of state data as the owner of the synchronization lock. At the completion of the action 70, the method 40 follows a path 72 to an action 74 which, because the synchronization lock was un-owned immediately before the action 74, assigns a tenure level of one to set of state data associated with the requesting process that was just assigned ownership of the synchronization lock. After the action 74, the method 40 follows path 76 to an action 78 in which the requesting and owning process releases its exclusive access to the state data of the synchronization lock of the requested process. This is to enable other requesting processes to access the synchronization lock state data and determine that the synchronization lock is currently owned and take appropriate action as described below. After the action 78 releases the state data of the synchronization lock, the method 40 follows a path 80 to the exit 54.

Referring back to the operation 66, if the determination is that the synchronization lock is currently owned by a process other than the requesting process, the method 40 follows a path 82 to an action 84. At the action 84, the requesting process( and its processor 11, 12) releases its exclusive access to the state date of the synchronous lock and executes a predetermined contention process that informs the requesting process what to do until the synchronization lock has been released by its current owning process.

The path 86 is the normal path according to the invention for requesting processes to take if another process and processor 11, 12 own the synchronization lock of the shared process. The requesting process has not been granted ownership of the synchronization lock of the requested shared process, but it has been informed according to the present invention of the best way to wait until the synchronization lock of the shared process is available to some other requesting process. After accepting the contention information, the requesting process and processor 11, 12 release their exclusive access to the synchronization lock state data by writing an appropriate entry into a data register (not shown). Upon the release of the access to synchronous lock data, the method continues along path 86 to the operation 62.

Figure 3:
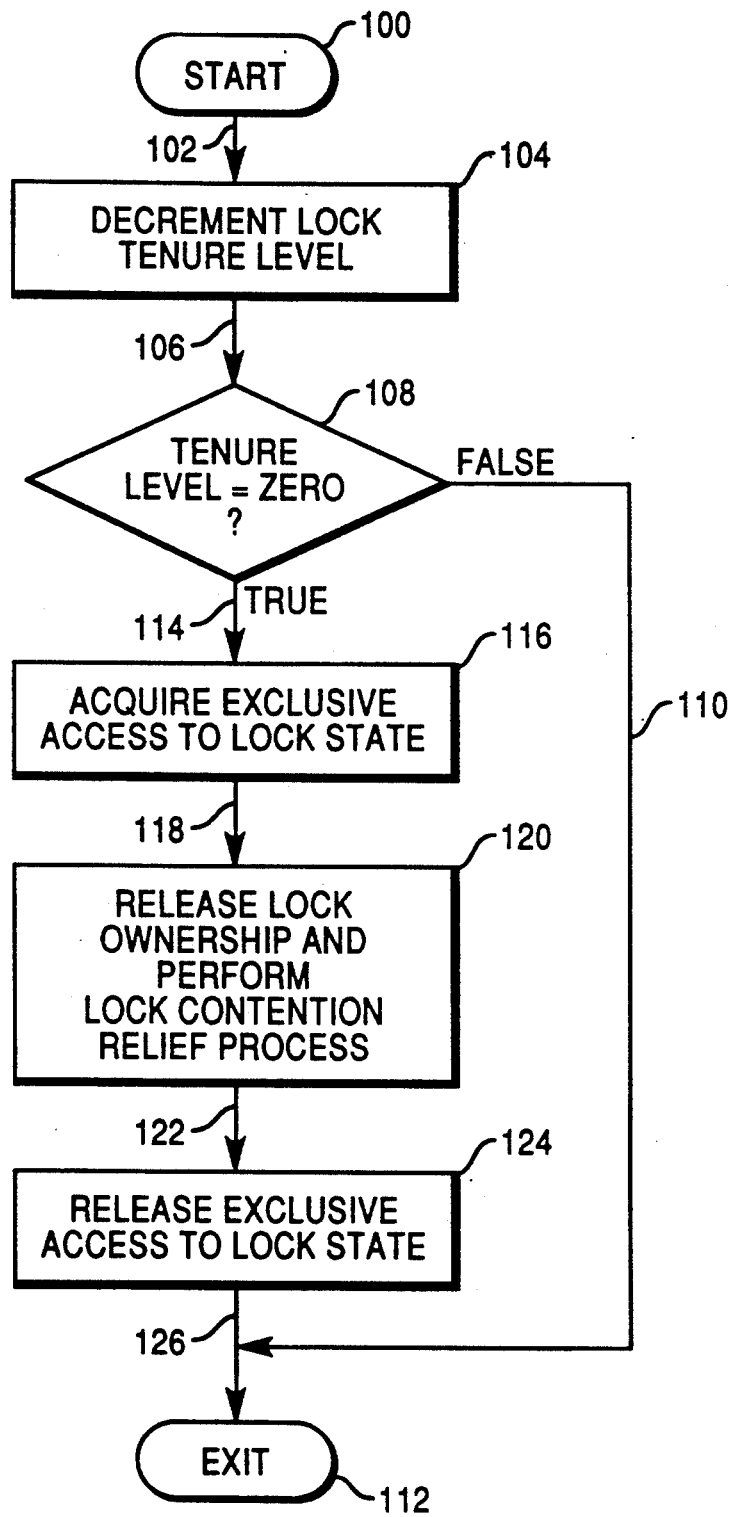
FIG. 3 is a flow diagram of a process a that provides a decrease of the re-entrant synchronization lock tenure until the tenure of the current owner is completed and then a release by the current owner of the synchronization lock that the lock may be acquired by another process.

Referring now to FIG. 3, a further method 90 to change a tenure level of a synchronization lock of a shared process or resource begins at a start 100. The method 90 complements the method 40 described above by decreasing the tenure level of the synchronization lock owner and releasing ownership of the synchronization lock and the shared process that the lock is associated with. After the start 100, the method 90 continues along path 12 to an action 104. At the action 104 the owning process decrements the current tenure level of the synchronization lock by one. Some type of access control to the tenure level should be associated with the method 90 and any one of a number of controls that are known in the art may be used.

After the tenure level of the lock is reduced by one, the method 90 follows path 106 to an operation 108. At the operation 108, the method 90 determines if the current tenure level is equal to zero or not. If the current tenure level is not equal to zero, then the owning process still has a need to exchange data with the shared process or resource associated with the synchronization lock. So if the owning process still needs the shared process or resource, the method 90 follows a path 110 to an exit 112 of the tenure level reduction and conditional lock release process. In such a case, the owning process will extend its ownership of the shared process or resource and reenter the shared process or resource with the next sequential request of the current owner.

On the other hand, if at the operation 108 the current tenure level is determined to be equal to zero, then the owning process has finished all of its needs to exchange data with the shared process or resource associated with the synchronization lock. In such a case, the method 90 follows a path 114 to an action 116. At the action 116, the current owner acquires exclusive access to the state data of the synchronization lock and continues along path 118 to an action 120. At the action 120, the owning process releases ownership of the synchronization lock. This may be accomplished by clearing the synchronization lock owner data, or some similar change. As soon as the ownership of the lock has been released, a predetermined lock contention relief process is executed as part of the action 120. After the action 120, the method 90 continues along a path 122 to an action 124. At the action 124 the method 90 releases the exclusive access of the previously owning process to the synchronization lock state data. After the action 124, the method 90 follows a path 126 to the exit 112, again signifying that the synchronization lock and its associated shared process or resource is no longer needed by the releasing process.

In operation in a multiprocessor system, each process requesting a shared process, including shared resources, must perform the method 40 in order to acquire ownership or extend its tenure of the synchronization lock associated with the shared process. Once it has acquired ownership, the owning process must perform the method 90 to reduce its tenure and ultimately release its ownership of the synchronization lock of the shared process at the completion of its actions with the shared process.

A listing of a computer program that performs this method for advising a requesting process of a state of a synchronization lock of a shared process is included in Appendix A, which is hereby incorporated by reference. This listing is written in the C programming language and provides those skilled in the art with a means for practicing the invention.

Thus, it will now be understood that there has been disclosed a method for changing a tenure level of a requesting process with respect to a synchronization lock of a shared process or resource and therefore provides a more efficient use of processor time by allowing an owning process to reenter the shared process or resource with a subsequent request without going through a release and contention process before regaining the required shared process or resource. While the invention has been particularly illustrated and described with reference to a preferred embodiment thereof, it will be understood by those skilled in the art that various changes in form, details, and applications may be made therein. It is accordingly intended that the appended claims shall cover all such changes in form, details and applications which do not depart from the true spirit and scope of the invention.

APPENDIX A

```
1  /* Copyright 1990 NCR Corporation - Dayton, Ohio, USA */
2  #ident"@(#)./sccs/NSTSRC/relmp/OS2.00.00/usr/src/uts/i386/mp/mpl
   ock.c:mplock.cl.3"
3
4  /*Copyright (c) 1990 UNIX System Laboratories, Inc.*/
5  /*  All Rights Reserved  */
6
7  /*THIS IS UNPUBLISHED PROPRIETARY SOURCE CODE OF       */
8  /*UNIX System Laboratories, Inc.                       */
9  /*The copyright notice above does not evidence any    */
10 /*actual or intended publication of such source code.*/
11
12 /*Copyright (c) 1990 Intel Corporation*/
13 /*  All Rights Reserved*/
14 /**/
15 /*INTEL CORPORATION PROPRIETARY INFORMATION*/
16 /**/
17 /*This software is supplied to USL under the terms*/
18 /* of a license agreement with Intel Corporation and may*/
```

```
19 /*not be copied nor disclosed except in accordance with*/
20 /*the terms of that agreement.    */
21
22 /* Copyright 1989,1990 NCR Corporation - Dayton, Ohio, USA */
23
24 #ident   "@(#):mplock.c      16.48"
25
26 /*
27 **mplock.c
28 **
29 **Multiprocessor Locking primitives
30 **
31 */
32
33 #define INLINE_LOCKS 1
34
35 #include <sys/types.h>
36 #include <sys/param.h>
37 #include <sys/systm.h>
38 #include <sys/pic.h>
39 #include <sys/mp/mptypes.h>
40 #include <sys/mp/percpu.h>
41 #include <sys/mp/mplock.h>
42 #include <sys/mp/locksave.h>
43 #include <sys/mp/xintr.h>
44 #include <sys/proc.h>
45 #include <sys/user.h>
46 #include <sys/debug.h>
47 #include <sys/cmn_err.h>
48 #include <sys/xdebug.h>
49 #if TRACEV
50 #include "sys/tracev.h"
51 struct eventdef ev_mutex = {
52 0x90, 6, "mtx_%s pid %d lk %y %y %y %y\n"
53 };
54 #endif
55
56 #if MP
57
58 int lockdebug = 0;
59
60 #ifdef DEBUG
61 unsigned long simple_spins = 0xffffff;
62 unsigned long mutex_spins = 0xffffff;
63 unsigned long resource_spins = 0xffffff;
64 unsigned long unstack_moves[LOCK_STACK_SIZE];
65 unsigned long locks_by_type[256];
66 #else /* DEBUG */
67 #if MP_STAT
68 unsigned long simple_spins = 0xffffff;
69 #endif /* MP_STAT */
70 #endif /* DEBUG */
71
72 extern int maxrunpri;
73 extern char any_qrunflag, qrunflag;
74
75 /*
76  * The curlock_table is a stack of lock addresses.
77  * When empty (curlock == &curlock == &curlock_table[-1]);
78  * Entries are added by:  *(++curlock) = lockp;
79  * Entries are removed by:lockp = *curlock; *(curlock--) = NULL;
80  * Note that interrupts prevent:lockp = *(curlock--);
81  */
82 extern mutex_t **curlock, *curlock_table[];
83
84 #ifdef DEBUG
```

```
85 #define LOG_MUTEX_INIT('I' | ('N'<<8) | ('I'<<16) | ('T'<<24))
86 #define LOG_MUTEX_LOCK('L' | ('O'<<8) | ('C'<<16) | ('K'<<24))
87 #define LOG_MUTEX_UNLOCK('U' | ('N'<<8) | ('L'<<16) | ('K'<<24))
88 #define LOG_RESRC_INIT('I' | ('N'<<8) | ('I'<<16) | ('T'<<24))
89 #define LOG_RESRC_LOCK('L' | ('O'<<8) | ('C'<<16) | ('K'<<24))
90 #define LOG_RESRC_UNLOCK('U' | ('N'<<8) | ('L'<<16) | ('K'<<24))
91 #endif
92
93 #define WAKE_ONE(chan)wakelproc((caddr_t)(chan), PRMPT)
94 #define WAKE_ALL(chan)wakeprocs((caddr_t)(chan), PRMPT)
95 #define SLEEP(chan, pri)sleep((caddr_t)(chan), pri)
96
97 #define SOMETHING_TO_DO()((maxrunpri != -1) || any_qrunflag || q
    runflag)
98 #define SHOULD_SLEEP(mutex)(mutex->sleep_on_busy && SOMETHING_TO
    _DO())
99
100 /*
101  * The following function is used by the lockdebug code to exclu
    de
102  * functions in mplock.c when searching through the backtrace of
103  * callers. The assumption is that the the order of the function
    s
104  * in the source will be maintained in the object.
105  */
106
107 #ifdef DEBUG
108 int mplock_top() { return 0; }
109 #endif
110
111 void
112 unstack_lock(lockp)
113 register mutex_t *lockp;
114 {
115 register mutex_t **curlck;
116
117 #ifdef DEBUG
118 check_curlock_stack();
119 #endif
120 curlck = curlock;
121 for ( curlck--; *curlck != lockp; curlck-- ) {
122 MP_ASSERT( curlck >= curlock_table );
123 }
124 #ifdef DEBUG
125 unstack_moves[curlock - curlck]++;
126 #endif
127 for ( curlck++; curlck <= curlock; curlck++ ) {
128 curlck[-1] = curlck[0];
129 }
130 *(curlock--) = (mutex_t *)NULL;
131 }
132
133 /*
134  * The mutex_setnest() function is used to unlock a recursive lo
    ck
135  * in situations where the nesting level is indeterminant.
136  * Potential uses are nested unlock/relock:
137  *n = mutex_setnest(&some_lck, 1);
138  *mutex_unlock(&some_lck, ... );
139  *   .   .   .
140  *mutex_lock(&some_lck, ... );
141  *(void) mutex_setnest(&some_lck, n);
142  * or swap nested locks:
143  *n = mutex_setnest(*some_lck_ptr, 1);
144  *mutex_unlock(*some_lck_ptr, ... );
145  *mutex_lock(&another_lck, ... );
```

```
146    *(void) mutex_setnest(&another_lck, n);
147    **some_lck_ptr = &another_lck;
148    */
149
150 unsigned long
151 mutex_setnest(mutex, nest)
152 register mutex_t *mutex;
153 unsigned long nest;
154 {
155 unsigned long oldnest;
156
157 MP_ASSERT( !(mutex->type & LOCK_TYPE_SHARED) );
158 MP_ASSERT( mutex->type & LOCK_TYPE_RECURSIVE );
159 MP_ASSERT( mutex->processor == cpuid );
160 MP_ASSERT( mutex->use_count > 0 );
161 MP_ASSERT( nest != 0 );
162
163 oldnest = mutex->use_count;
164 mutex->use_count = nest;
165
166 return (oldnest);
167 }
168
169 unsigned long
170 mutex_getnest(mutex)
171 register mutex_t *mutex;
172 {
173 return (mutex->use_count);
174 }
175
176 #ifdef DEBUG
177 int locks_saved[MAX_LOCK_NESTING];
178 #endif
179
180 void
181 save_locks(savearea)
182 lock_save_area_t *savearea;
183 {
184 #if !TRIVIAL_LOCKS
185 register lock_save_t *savep;
186 register mutex_t *lockp;
187 register mutex_t **curlck;
188 register int i;
189
190 #ifdef DEBUG
191 check_curlock_stack();
192 #endif
193 curlck = curlock;
194 for (savep = savearea->buffer, i = 0;
195      curlck >= curlock_table;
196      ++savep, ++i) {
197 lockp = *curlck; curlck--;
198 switch (lockp->type) {
199 case EXCLUSIVE_ADVICE_MUTEX:
200 case EXCLUSIVE_ADVICE_SPL_MUTEX: {
201 MP_ASSERT( i < MAX_LOCK_NESTING );
202 MP_ASSERT( lockp->processor == cpuid );
203 MP_ASSERT( lockp->use_count == 1 );
204 savep->sa_lock = lockp;
205 savep->sa_sleep_on_busy = lockp->sleep_on_busy;
206 #ifdef DEBUG
207 savep->sa_getter = lockp->locker;
208 #endif
209 break;
210 }
211 case EXCLUSIVE_ADVICE_RECURSIVE_MUTEX:
212 case EXCLUSIVE_ADVICE_SPL_RECURSIVE_MUTEX: {
```

```
213 MP_ASSERT( i < MAX_LOCK_NESTING );
214 MP_ASSERT( lockp->processor == cpuid );
215 MP_ASSERT( lockp->use_count > 0 );
216 savep->sa_lock = lockp;
217 savep->sa_lock_cnt = lockp->use_count;
218 savep->sa_sleep_on_busy = lockp->sleep_on_busy;
219 #ifdef DEBUG
220 savep->sa_getter = lockp->locker;
221 #endif
222 break;
223 }
224 case EXCLUSIVE_SPIN_MUTEX:
225 case EXCLUSIVE_SLEEP_MUTEX:
226 case EXCLUSIVE_SPIN_SPL_MUTEX:
227 case EXCLUSIVE_SLEEP_SPL_MUTEX: {
228 MP_ASSERT( i < MAX_LOCK_NESTING );
229 MP_ASSERT( lockp->processor == cpuid );
230 MP_ASSERT( lockp->use_count == 1 );
231 savep->sa_lock = lockp;
232 #ifdef DEBUG
233 savep->sa_getter = lockp->locker;
234 #endif
235 break;
236 }
237 case EXCLUSIVE_SPIN_RECURSIVE_MUTEX:
238 case EXCLUSIVE_SLEEP_RECURSIVE_MUTEX:
239 case EXCLUSIVE_SPIN_SPL_RECURSIVE_MUTEX:
240 case EXCLUSIVE_SLEEP_SPL_RECURSIVE_MUTEX: {
241 MP_ASSERT( i < MAX_LOCK_NESTING );
242 MP_ASSERT( lockp->processor == cpuid );
243 MP_ASSERT( lockp->use_count > 0 );
244 savep->sa_lock = lockp;
245 savep->sa_lock_cnt = lockp->use_count;
246 #ifdef DEBUG
247 savep->sa_getter = lockp->locker;
248 #endif
249 break;
250 }
251 case SHARED_SPIN_MUTEX:
252 case SHARED_SLEEP_MUTEX:
253 case SHARED_ADVICE_MUTEX:
254 case SHARED_SPIN_SPL_MUTEX:
255 case SHARED_SLEEP_SPL_MUTEX:
256 case SHARED_ADVICE_SPL_MUTEX: {
257 MP_ASSERT( i < MAX_LOCK_NESTING );
258 savep->sa_lock = lockp;
259 if (lockp->flags == L_EXCL) {
260 MP_ASSERT( lockp->processor == cpuid );
261 MP_ASSERT( lockp->use_count == 1 );
262 savep->sa_flags = L_EXCL;
263 } else {
264 MP_ASSERT( lockp->use_count > 0 );
265 savep->sa_flags = L_SHARED;
266 }
267 #ifdef DEBUG
268 savep->sa_getter = lockp->locker;
269 #endif
270 break;
271 }
272 case UNINITIALIZED_MUTEX: {
273 cmn_err(CE_WARN,
274 "save_locks: (0x%x) uninitialized lock\n",
275 lockp);
276 savep--;
277 i--;
278 break;
279 }
```

```
280 default: {
281 cmn_err(CE_PANIC,
282 "save_locks: (0x%x) unknown lock type\n",
283 lockp);
284 }
285 }
286 }
287 MP_ASSERT( curlck == &curlock_table[-1] );
288 savearea->count = i;
289 #ifdef DEBUG
290 locked_add(locks_saved[i], 1);
291 #endif
292 #endif /* !TRIVIAL_LOCKS */
293 }
294
295 #ifdef DEBUG
296 int locks_released[MAX_LOCK_NESTING];
297 #endif
298
299 void
300 release_locks(savearea)
301 register lock_save_area_t *savearea;
302 {
303 #if !TRIVIAL_LOCKS
304 register lock_save_t*savep;
305 register mutex_t*lockp;
306 register int i;
307
308 MP_ASSERT( savearea != NULL );
309 MP_ASSERT( u.u_simple == (unsigned long *)NULL );
310 MP_ASSERT( u.u_mutex == (unsigned long *)NULL );
311 for (savep = savearea->buffer, i = 0;
312      curlock >= curlock_table;
313      savep++, i++) {
314 #ifdef DEBUG
315 check_curlock_stack();
316 #endif
317 lockp = *curlock; *(curlock--) = (mutex_t *)NULL;
318 #if defined(DEBUG) || MP_STAT
319 MP_ASSERT( lockp != NULL );
320 MP_ASSERT( lockp->mpdebug != 0 );
321 MP_ASSERT( ((lockinfo_t *)(lockp->mpdebug))->is_simple == 0 );
322 ((lockinfo_t *)(lockp->mpdebug))->released++;
323 #endif
324 switch (lockp->type) {
325 case EXCLUSIVE_SPIN_MUTEX:
326 case EXCLUSIVE_SPIN_SPL_MUTEX: {
327 MP_ASSERT( i < MAX_LOCK_NESTING );
328 MP_ASSERT( lockp->processor == cpuid );
329 MP_ASSERT( lockp->use_count == 1 );
330 #ifdef DEBUG
331 savep->sa_getter = lockp->locker;
332 /*
333  * The following assumes that if the last thing
334  * that happened to this lock was it being restored
335  * then this may be a case of "thundering-herd".
336  */
337 if (lockp->db_flags == DB_RESTORED) {
338 MP_ASSERT( lockp->mpdebug != 0 );
339 ((lockinfo_t *)(lockp->mpdebug))->thunder++;
340 }
341 lockp->db_flags = DB_RELEASED;
342 #endif /* DEBUG */
343 savep->sa_lock = lockp;
344 #ifdef DEBUG
345 lockp->processor = NULLCPU;
```

```
346 #endif
347 lockp->use_count = 0;
348 break;
349 }
350 case EXCLUSIVE_SPIN_RECURSIVE_MUTEX:
351 case EXCLUSIVE_SPIN_SPL_RECURSIVE_MUTEX: {
352 MP_ASSERT( i < MAX_LOCK_NESTING );
353 MP_ASSERT( lockp->processor == cpuid );
354 MP_ASSERT( lockp->use_count > 0 );
355 #ifdef DEBUG
356 savep->sa_getter = lockp->locker;
357 /*
358  * The following assumes that if the last thing
359  * that happened to this lock was it being restored
360  * then this may be a case of "thundering-herd".
361  */
362 if (lockp->db_flags == DB_RESTORED) {
363 MP_ASSERT( lockp->mpdebug != 0 );
364 ((lockinfo_t *)(lockp->mpdebug))->thunder++;
365 }
366 lockp->db_flags = DB_RELEASED;
367 #endif /* DEBUG */
368 savep->sa_lock = lockp;
369 savep->sa_lock_cnt = lockp->use_count;
370 lockp->processor = NULLCPU;
371 lockp->use_count = 0;
372 break;
373 }
374 case EXCLUSIVE_SLEEP_MUTEX:
375 case EXCLUSIVE_SLEEP_SPL_MUTEX: {
376 MP_ASSERT( i < MAX_LOCK_NESTING );
377 MP_ASSERT( lockp->processor == cpuid );
378 MP_ASSERT( lockp->use_count == 1 );
379 #ifdef DEBUG
380 savep->sa_getter = lockp->locker;
381 /*
382  * The following assumes that if the last thing
383  * that happened to this lock was it being restored
384  * then this may be a case of "thundering-herd".
385  */
386 if (lockp->db_flags == DB_RESTORED) {
387 MP_ASSERT( lockp->mpdebug != 0 );
388 ((lockinfo_t *)(lockp->mpdebug))->thunder++;
389 }
390 lockp->db_flags = DB_RELEASED;
391 #endif /* DEBUG */
392 savep->sa_lock = lockp;
393 #ifdef DEBUG
394 lockp->processor = NULLCPU;
395 #endif
396
397 #ifdef i486
398 Locked_Zero(&lockp->use_count);
399 #else
400 lockp->use_count = 0;
401 #endif
402 while ((lockp->lock != 0) && (lockp->wake_one <= 1)) {
403         xintr_poll();
404 }
405 if(lockp->wake_one)
406 WAKE_ONE(&lockp->wake_one);
407 break;
408 }
409 case EXCLUSIVE_SLEEP_RECURSIVE_MUTEX:
410 case EXCLUSIVE_SLEEP_SPL_RECURSIVE_MUTEX: {
411 MP_ASSERT( i < MAX_LOCK_NESTING );
```

```
412 MP_ASSERT( lockp->processor == cpuid );
413 MP_ASSERT( lockp->use_count > 0 );
414 #ifdef DEBUG
415 savep->sa_getter = lockp->locker;
416 /*
417  * The following assumes that if the last thing
418  * that happened to this lock was it being restored
419  * then this may be a case of "thundering-herd".
420  */
421 if (lockp->db_flags == DB_RESTORED) {
422 MP_ASSERT( lockp->mpdebug != 0 );
423 ((lockinfo_t *)(lockp->mpdebug))->thunder++;
424 }
425 lockp->db_flags = DB_RELEASED;
426 #endif /* DEBUG */
427 savep->sa_lock = lockp;
428 savep->sa_lock_cnt = lockp->use_count;
429 lockp->processor = NULLCPU;
430 #ifdefi486
431 Locked_Zero(&lockp->use_count);
432 #else
433 lockp->use_count = 0;
434 #endif
435 while ((lockp->lock != 0) && (lockp->wake_one <= 1)) {
436         xintr_poll();
437 }
438 if(lockp->wake_one)
439 WAKE_ONE(&lockp->wake_one);
440 break;
441 }
442 case EXCLUSIVE_ADVICE_MUTEX:
443 case EXCLUSIVE_ADVICE_SPL_MUTEX: {
444 MP_ASSERT( i < MAX_LOCK_NESTING );
445 MP_ASSERT( lockp->processor == cpuid );
446 MP_ASSERT( lockp->use_count == 1 );
447 #ifdef DEBUG
448 savep->sa_getter = lockp->locker;
449 /*
450  * The following assumes that if the last thing
451  * that happened to this lock was it being restored
452  * then this may be a case of "thundering-herd".
453  */
454 if (lockp->db_flags == DB_RESTORED) {
455 MP_ASSERT( lockp->mpdebug != 0 );
456 ((lockinfo_t *)(lockp->mpdebug))->thunder++;
457 }
458 lockp->db_flags = DB_RELEASED;
459 #endif /* DEBUG */
460 savep->sa_lock = lockp;
461 #ifdef DEBUG
462 lockp->processor = NULLCPU;
463 #endif
464 #ifdefi486
465 Locked_Zero(&lockp->use_count);
466 #else
467 lockp->use_count = 0;
468 #endif
469 if (lockp->spinners)
470 break;
471 while ((lockp->lock != 0) && (lockp->wake_one <= 1)) {
472         xintr_poll();
473 }
474 if(lockp->wake_one)
475 WAKE_ONE(&lockp->wake_one);
476 break;
477 }
478 case EXCLUSIVE_ADVICE_RECURSIVE_MUTEX:
```

```
479 case EXCLUSIVE_ADVICE_SPL_RECURSIVE_MUTEX: {
480 MP_ASSERT( i < MAX_LOCK_NESTING );
481 MP_ASSERT( lockp->processor == cpuid );
482 MP_ASSERT( lockp->use_count > 0 );
483 #ifdef DEBUG
484 savep->sa_getter = lockp->locker;
485 /*
486  * The following assumes that if the last thing
487  * that happened to this lock was it being restored
488  * then this may be a case of "thundering-herd".
489  */
490 if (lockp->db_flags == DB_RESTORED) {
491 MP_ASSERT( lockp->mpdebug != 0 );
492 ((lockinfo_t *)(lockp->mpdebug))->thunder++;
493 }
494 lockp->db_flags = DB_RELEASED;
495 #endif /* DEBUG */
496 savep->sa_lock = lockp;
497 savep->sa_lock_cnt = lockp->use_count;
498 lockp->processor = NULLCPU;
499 #ifdef i486
500 Locked_Zero(&lockp->use_count);
501 #else
502 lockp->use_count = 0;
503 #endif
504 if (lockp->spinners)
505 break;
506 while ((lockp->lock != 0) && (lockp->wake_one <= 1)) {
507         xintr_poll();
508 }
509 if(lockp->wake_one)
510 WAKE_ONE(&lockp->wake_one);
511 break;
512 }
513 case SHARED_SPIN_MUTEX:
514 case SHARED_SPIN_SPL_MUTEX: {
515 MP_ASSERT( i < MAX_LOCK_NESTING );
516 #ifdef DEBUG
517 savep->sa_getter = lockp->locker;
518 #endif
519 savep->sa_lock = lockp;
520 simple_lock(&lockp->lock);
521 if (lockp->flags == L_EXCL) {
522 MP_ASSERT( lockp->processor == cpuid );
523 MP_ASSERT( lockp->use_count == 1 );
524 savep->sa_flags = L_EXCL;
525 #ifdef DEBUG
526 lockp->processor = NULLCPU;
527 #endif
528 lockp->use_count = 0;
529 lockp->flags = L_SHARED;
530 #ifdef DEBUG
531 lockp->db_flags = DB_RELEASED;
532 #endif
533 simple_unlock(&lockp->lock);
534 break;
535 } else {
536 MP_ASSERT( lockp->use_count > 0 );
537 savep->sa_flags = L_SHARED;
538 lockp->use_count--;
539 #ifdef DEBUG
540 lockp->db_flags = DB_RELEASED;
541 #endif
542 simple_unlock(&lockp->lock);
543 break;
544 }
545 }
```

```
546 case SHARED_SLEEP_SPL_MUTEX:
547 case SHARED_SLEEP_MUTEX: {
548 MP_ASSERT( i < MAX_LOCK_NESTING );
549 #ifdef DEBUG
550 savep->sa_getter = lockp->locker;
551 #endif
552 savep->sa_lock = lockp;
553 simple_lock(&lockp->lock);
554 if (lockp->flags == L_EXCL) {
555 MP_ASSERT( lockp->processor == cpuid );
556 MP_ASSERT( lockp->use_count == 1 );
557 savep->sa_flags = L_EXCL;
558 #ifdef DEBUG
559 lockp->processor = NULLCPU;
560 #endif
561 lockp->use_count = 0;
562 lockp->flags = L_SHARED;
563 #ifdef DEBUG
564 lockp->db_flags = DB_RELEASED;
565 #endif
566 simple_unlock(&lockp->lock);
567 if (lockp->wake_one)
568 WAKE_ONE(&lockp->wake_one);
569 else if (lockp->wake_all)
570 WAKE_ALL(&lockp->wake_all);
571 break;
572 } else {
573 MP_ASSERT( lockp->use_count > 0 );
574 savep->sa_flags = L_SHARED;
575 if (lockp->use_count == 1) {
576 lockp->use_count = 0;
577 #ifdef DEBUG
578 lockp->db_flags = DB_RELEASED;
579 #endif
580 simple_unlock(&lockp->lock);
581 if (lockp->wake_one)
582 WAKE_ONE(&lockp->wake_one);
583 else if (lockp->wake_all)
584 WAKE_ALL(&lockp->wake_all);
585 break;
586 }
587 lockp->use_count--;
588 #ifdef DEBUG
589 lockp->db_flags = DB_RELEASED;
590 #endif
591 simple_unlock(&lockp->lock);
592 break;
593 }
594 }
595 case SHARED_ADVICE_MUTEX:
596 case SHARED_ADVICE_SPL_MUTEX: {
597 MP_ASSERT( i < MAX_LOCK_NESTING );
598 #ifdef DEBUG
599 savep->sa_getter = lockp->locker;
600 #endif
601 savep->sa_lock = lockp;
602 simple_lock(&lockp->lock);
603 if (lockp->flags == L_EXCL) {
604 MP_ASSERT( lockp->processor == cpuid );
605 MP_ASSERT( lockp->use_count == 1 );
606 savep->sa_flags = L_EXCL;
607 #ifdef DEBUG
608 lockp->processor = NULLCPU;
609 #endif
610 lockp->use_count = 0;
611 lockp->flags = L_SHARED;
```

```
612 #ifdef DEBUG
613 lockp->db_flags = DB_RELEASED;
614 #endif
615 if (lockp->spinners) {
616 simple_unlock(&lockp->lock);
617 break;
618 }
619 simple_unlock(&lockp->lock);
620 if (lockp->wake_one)
621 WAKE_ONE(&lockp->wake_one);
622 else if (lockp->wake_all)
623 WAKE_ALL(&lockp->wake_all);
624 break;
625 } else {
626 MP_ASSERT( lockp->use_count > 0 );
627 savep->sa_flags = L_SHARED;
628 if (lockp->use_count == 1) {
629 lockp->use_count = 0;
630 #ifdef DEBUG
631 lockp->db_flags = DB_RELEASED;
632 #endif
633 if (lockp->spinners) {
634 simple_unlock(&lockp->lock);
635 break;
636 }
637 simple_unlock(&lockp->lock);
638 if (lockp->wake_one)
639 WAKE_ONE(&lockp->wake_one);
640 else if (lockp->wake_all)
641 WAKE_ALL(&lockp->wake_all);
642 break;
643 }
644 lockp->use_count--;
645 #ifdef DEBUG
646 lockp->db_flags = DB_RELEASED;
647 #endif
648 simple_unlock(&lockp->lock);
649 break;
650 }
651 }
652 case UNINITIALIZED_MUTEX: {
653 cmn_err(CE_WARN,
654 "release_locks: (0x%x) uninitialized lock\n",
655 lockp);
656 savep--;
657 i--;
658 break;
659 }
660 default: {
661 cmn_err(CE_PANIC,
662 "release_locks: (0x%x) unknown lock type\n",
663 lockp);
664 }
665 }
666 }
667 MP_ASSERT( curlock == &curlock_table[-1] );
668 savearea->count = i;
669 #ifdef DEBUG
670 locked_add(locks_released[i], 1);
671 #endif
672 #endif /* !TRIVIAL_LOCKS */
673 }
674
675 #ifdef DEBUG
676 int locks_cleaned[MAX_LOCK_NESTING];
677 #endif
678
```

```
679 cleanup_locks()
680 {
681 register mutex_t *lockp;
682 #ifdef DEBUG
683 register int i = 0;
684 #endif
685
686 while (curlock >= curlock_table) {
687 #ifdef DEBUG
688 i++;
689 check_curlock_stack();
690 #endif
691 lockp = *curlock; *(curlock--) = (mutex_t *)NULL;
692 MP_ASSERT( lockp != NULL );
693 MP_ASSERT( lockp->mpdebug != 0 );
694 MP_ASSERT( ((lockinfo_t *)(lockp->mpdebug))->is_simple == 0 );
695 switch (lockp->type) {
696 case EXCLUSIVE_SPIN_MUTEX:
697 case EXCLUSIVE_SPIN_SPL_MUTEX: {
698 MP_ASSERT( lockp->processor == cpuid );
699 MP_ASSERT( lockp->use_count == 1 );
700 #ifdef DEBUG
701 lockp->processor = NULLCPU;
702 #endif
703 lockp->use_count = 0;
704 #ifdef DEBUG
705 lockp->db_flags = DB_CLEANED;
706 #endif
707 break;
708 }
709 case EXCLUSIVE_SPIN_RECURSIVE_MUTEX:
710 case EXCLUSIVE_SPIN_SPL_RECURSIVE_MUTEX: {
711 MP_ASSERT( lockp->processor == cpuid );
712 MP_ASSERT( lockp->use_count > 0 );
713 lockp->processor = NULLCPU;
714 lockp->use_count = 0;
715 #ifdef DEBUG
716 lockp->db_flags = DB_CLEANED;
717 #endif
718 break;
719 }
720 case EXCLUSIVE_SLEEP_MUTEX:
721 case EXCLUSIVE_SLEEP_SPL_MUTEX: {
722 MP_ASSERT( lockp->processor == cpuid );
723 MP_ASSERT( lockp->use_count == 1 );
724 #ifdef DEBUG
725 lockp->processor = NULLCPU;
726 #endif
727 #ifdef i486
728 Locked_Zero(&lockp->use_count);
729 #else
730 lockp->use_count = 0;
731 #endif
732 #ifdef DEBUG
733 lockp->db_flags = DB_CLEANED;
734 #endif
735 while ((lockp->lock != 0) && (lockp->wake_one <= 1)) {
736 xintr_poll();
737 }
738 if(lockp->wake_one)
739 WAKE_ONE(&lockp->wake_one);
740 break;
741 }
742 case EXCLUSIVE_SLEEP_RECURSIVE_MUTEX:
743 case EXCLUSIVE_SLEEP_SPL_RECURSIVE_MUTEX: {
744 MP_ASSERT( lockp->processor == cpuid );
```

```
745 MP_ASSERT( lockp->use_count > 0 );
746 lockp->processor = NULLCPU;
747 #ifdef i486
748 Locked_Zero(&lockp->use_count);
749 #else
750 lockp->use_count = 0;
751 #endif
752 #ifdef DEBUG
753 lockp->db_flags = DB_CLEANED;
754 #endif
755 while ((lockp->lock != 0) && (lockp->wake_one <= 1)) {
756 xintr_poll();
757 }
758 if(lockp->wake_one)
759 WAKE_ONE(&lockp->wake_one);
760 break;
761 }
762 case EXCLUSIVE_ADVICE_MUTEX:
763 case EXCLUSIVE_ADVICE_SPL_MUTEX: {
764 MP_ASSERT( lockp->processor == cpuid );
765 MP_ASSERT( lockp->use_count == 1 );
766 #ifdef DEBUG
767 lockp->processor = NULLCPU;
768 #endif
769 #ifdef i486
770 Locked_Zero(&lockp->use_count);
771 #else
772 lockp->use_count = 0;
773 #endif
774 #ifdef DEBUG
775 lockp->db_flags = DB_CLEANED;
776 #endif
777 if (lockp->spinners)
778 break;
779 while ((lockp->lock != 0) && (lockp->wake_one <= 1)) {
780 xintr_poll();
781 }
782 if(lockp->wake_one)
783 WAKE_ONE(&lockp->wake_one);
784 break;
785 }
786 case EXCLUSIVE_ADVICE_RECURSIVE_MUTEX:
787 case EXCLUSIVE_ADVICE_SPL_RECURSIVE_MUTEX: {
788 MP_ASSERT( lockp->processor == cpuid );
789 MP_ASSERT( lockp->use_count > 0 );
790 lockp->processor = NULLCPU;
791 #ifdef i486
792 Locked_Zero(&lockp->use_count);
793 #else
794 lockp->use_count = 0;
795 #endif
796 #ifdef DEBUG
797 lockp->db_flags = DB_CLEANED;
798 #endif
799 if (lockp->spinners)
800 break;
801 while ((lockp->lock != 0) && (lockp->wake_one <= 1)) {
802 xintr_poll();
803 }
804 if(lockp->wake_one)
805 WAKE_ONE(&lockp->wake_one);
806 break;
807 }
808 case SHARED_SPIN_MUTEX:
809 case SHARED_SPIN_SPL_MUTEX: {
810 simple_lock(&lockp->lock);
```

```
811 if (lockp->flags == L_EXCL) {
812 MP_ASSERT( lockp->processor == cpuid );
813 MP_ASSERT( lockp->use_count == 1 );
814 #ifdef DEBUG
815 lockp->processor = NULLCPU;
816 #endif
817 lockp->use_count = 0;
818 lockp->flags = L_SHARED;
819 #ifdef DEBUG
820 lockp->db_flags = DB_CLEANED;
821 #endif
822 simple_unlock(&lockp->lock);
823 } else {
824 MP_ASSERT( lockp->use_count > 0 );
825 if (lockp->use_count == 1) {
826 lockp->use_count = 0;
827 #ifdef DEBUG
828 lockp->db_flags = DB_CLEANED;
829 #endif
830 simple_unlock(&lockp->lock);
831 } else {
832 lockp->use_count--;
833 #ifdef DEBUG
834 lockp->db_flags = DB_CLEANED;
835 #endif
836 simple_unlock(&lockp->lock);
837 }
838 }
839 break;
840 }
841 case SHARED_SLEEP_MUTEX:
842 case SHARED_SLEEP_SPL_MUTEX: {
843 simple_lock(&lockp->lock);
844 if (lockp->flags == L_EXCL) {
845 MP_ASSERT( lockp->processor == cpuid );
846 MP_ASSERT( lockp->use_count == 1 );
847 #ifdef DEBUG
848 lockp->processor = NULLCPU;
849 #endif
850 lockp->use_count = 0;
851 lockp->flags = L_SHARED;
852 #ifdef DEBUG
853 lockp->db_flags = DB_CLEANED;
854 #endif
855 simple_unlock(&lockp->lock);
856 if (lockp->wake_one)
857 WAKE_ONE(&lockp->wake_one);
858 else if (lockp->wake_all)
859 WAKE_ALL(&lockp->wake_all);
860 } else {
861 MP_ASSERT( lockp->use_count > 0 );
862 if (lockp->use_count == 1) {
863 lockp->use_count = 0;
864 #ifdef DEBUG
865 lockp->db_flags = DB_CLEANED;
866 #endif
867 simple_unlock(&lockp->lock);
868 if (lockp->wake_one)
869 WAKE_ONE(&lockp->wake_one);
870 else if (lockp->wake_all)
871 WAKE_ALL(&lockp->wake_all);
872 } else {
873 lockp->use_count--;
874 #ifdef DEBUG
875 lockp->db_flags = DB_CLEANED;
876 #endif
```

```
877 simple_unlock(&lockp->lock);
878 }
879 }
880 break;
881 }
882 case SHARED_ADVICE_MUTEX:
883 case SHARED_ADVICE_SPL_MUTEX: {
884 simple_lock(&lockp->lock);
885 if (lockp->flags == L_EXCL) {
886 MP_ASSERT( lockp->processor == cpuid );
887 MP_ASSERT( lockp->use_count == 1 );
888 #ifdef DEBUG
889 lockp->processor = NULLCPU;
890 #endif
891 lockp->use_count = 0;
892 lockp->flags = L_SHARED;
893 #ifdef DEBUG
894 lockp->db_flags = DB_CLEANED;
895 #endif
896 if (lockp->spinners) {
897 simple_unlock(&lockp->lock);
898 break;
899 }
900 simple_unlock(&lockp->lock);
901 if (lockp->wake_one)
902 WAKE_ONE(&lockp->wake_one);
903 else if (lockp->wake_all)
904 WAKE_ALL(&lockp->wake_all);
905 } else {
906 MP_ASSERT( lockp->use_count > 0 );
907 if (lockp->use_count == 1) {
908 lockp->use_count = 0;
909 #ifdef DEBUG
910 lockp->db_flags = DB_CLEANED;
911 #endif
912 if (lockp->spinners) {
913 simple_unlock(&lockp->lock);
914 break;
915 }
916 simple_unlock(&lockp->lock);
917 if (lockp->wake_one)
918 WAKE_ONE(&lockp->wake_one);
919 else if (lockp->wake_all)
920 WAKE_ALL(&lockp->wake_all);
921 } else {
922 lockp->use_count--;
923 #ifdef DEBUG
924 lockp->db_flags = DB_CLEANED;
925 #endif
926 simple_unlock(&lockp->lock);
927 }
928 }
929 break;
930 }
931 case UNINITIALIZED_MUTEX: {
932 cmn_err(CE_WARN,
933 "cleanup_locks: (0x%x) uninitialized lock\n",
934 lockp);
935 break;
936 }
937 default: {
938 cmn_err(CE_PANIC,
939 "cleanup_locks: (0x%x) unknown lock type\n",
940 lockp);
941 }
942 }
943 }
```

```
944 MP_ASSERT( curlock == &curlock_table[-1] );
945 xintr_poll();
946 #ifdef DEBUG
947 locked_add(locks_cleaned[i], 1);
948 #endif
949 }
950
951 #ifdef DEBUG
952 int locks_restored[MAX_LOCK_NESTING];
953 #endif
954
955 void
956 restore_locks(savearea)
957 register lock_save_area_t *savearea;
958 {
959 #if !TRIVIAL_LOCKS
960 register lock_save_t*savep;
961 register mutex_t*lockp;
962
963 MP_ASSERT( u.u_simple == (unsigned long *)NULL );
964 MP_ASSERT( u.u_mutex == (unsigned long *)NULL );
965
966 if (curlock >= curlock_table)
967 cleanup_locks();
968 /*
969  * Because the L_TRY feature may have been used to acquire the locks
970  * in an order that violates the hierarchy, we use L_TRY here to attempt
971  * to get all locks. If any attempt fails, we unlock all locks already
972  * acquired and start over.
973  */
974 #ifdef DEBUG
975 locked_add(locks_restored[savearea->count], 1);
976 #endif
977 savep = &savearea->buffer[savearea->count - 1];
978 while (savep >= savearea->buffer) {
979 lockp = savep->sa_lock;
980 MP_ASSERT( lockp != NULL );
981 MP_ASSERT( lockp->mpdebug != 0 );
982 MP_ASSERT( ((lockinfo_t *)(lockp->mpdebug))->is_simple == 0 );
983 switch (lockp->type) {
984 case EXCLUSIVE_SPIN_MUTEX:
985 case EXCLUSIVE_SLEEP_MUTEX:
986 case EXCLUSIVE_ADVICE_MUTEX:
987 case EXCLUSIVE_SPIN_SPL_MUTEX:
988 case EXCLUSIVE_SLEEP_SPL_MUTEX:
989 case EXCLUSIVE_ADVICE_SPL_MUTEX: {
990 if (mutex_trylock_01(lockp) != L_FAIL) {
991 #ifdef DEBUG
992 lockp->processor = cpuid;
993 lockp->db_flags = DB_RESTORED;
994 lockp->locker = savep->sa_getter;
995 MP_ASSERT( lockp->use_count == 1);
996 #endif
997 savep--;
998 } else {
999 cleanup_locks();
1000 savep = &savearea->buffer[savearea->count - 1];
1001 }
1002 break;
1003 }
1004 case EXCLUSIVE_SPIN_RECURSIVE_MUTEX:
1005 case EXCLUSIVE_SLEEP_RECURSIVE_MUTEX:
1006 case EXCLUSIVE_ADVICE_RECURSIVE_MUTEX:
```

```
1007 case EXCLUSIVE_SPIN_SPL_RECURSIVE_MUTEX:
1008 case EXCLUSIVE_SLEEP_SPL_RECURSIVE_MUTEX:
1009 case EXCLUSIVE_ADVICE_SPL_RECURSIVE_MUTEX: {
1010 if (mutex_trylock_09(lockp) != L_FAIL) {
1011 #ifdef DEBUG
1012 lockp->db_flags = DB_RESTORED;
1013 lockp->locker = savep->sa_getter;
1014 MP_ASSERT( lockp->use_count == 1);
1015 #endif
1016 lockp->use_count = savep->sa_lock_cnt;
1017 savep--;
1018 } else {
1019 cleanup_locks();
1020 savep = &savearea->buffer[savearea->count - 1];
1021 }
1022 break;
1023 }
1024 case SHARED_SPIN_MUTEX:
1025 case SHARED_SLEEP_MUTEX:
1026 case SHARED_ADVICE_MUTEX:
1027 case SHARED_SPIN_SPL_MUTEX:
1028 case SHARED_SLEEP_SPL_MUTEX:
1029 case SHARED_ADVICE_SPL_MUTEX: {
1030 if (savep->sa_flags == L_EXCL) {
1031 if (mutex_trylock_e11(lockp) != L_FAIL) {
1032 #ifdef DEBUG
1033 lockp->db_flags = DB_RESTORED;
1034 lockp->locker = savep->sa_getter;
1035 #endif
1036 savep--;
1037 break;
1038 }
1039 } else {
1040 if (mutex_trylock_s11(lockp) != L_FAIL) {
1041 #ifdef DEBUG
1042 lockp->db_flags = DB_RESTORED;
1043 lockp->locker = savep->sa_getter;
1044 #endif
1045 savep--;
1046 break;
1047 }
1048 }
1049 cleanup_locks();
1050 savep = &savearea->buffer[savearea->count - 1];
1051 break;
1052 }
1053 case UNINITIALIZED_MUTEX: {
1054 cmn_err(CE_WARN,
1055 "restore_locks: (0x%x) uninitialized lock\n",
1056 lockp);
1057 break;
1058 }
1059 default: {
1060 cmn_err(CE_PANIC,
1061 "restore_locks: (0x%x) unknown lock type\n",
1062 lockp);
1063 }
1064 }
1065 }
1066 #endif /* !TRIVIAL_LOCKS */
1067 }
1068
1069 #if !TRIVIAL_LOCKS
1070
1071 int
```

```
1072 mutex_init(mutex, flags, lockinfo)
1073 register mutex_t *mutex;
1074 int flags;
1075 lockinfo_t *lockinfo;
1076 {
1077 #ifdef DEBUG
1078 check_lock_address(mutex);
1079 mutex->db_flags = DB_INITTED;
1080 mutex->flags = 0;
1081 mutex->wake_one = 0x00dead00;
1082 mutex->wake_all = 0x00dead00;
1083 mutex->spinners = 0x00dead00;
1084 mutex->processor = NULLCPU;
1085 #if !TRACEV
1086 if (lockdebug == 1) {
1087 lock_log(LOG_MUTEX_INIT, mutex, flags, lockinfo,
1088   0, prior_caller(1), prior_caller(2), cpuid);
1089 }
1090 #endif /* !TRACEV */
1091 #endif /* DEBUG */
1092 simple_lock_init(&mutex->lock, 0);
1093 mutex->use_count = 0;
1094 switch (flags & (L_EXCL|L_SHARED|L_SPIN|L_SLEEP|L_NOSPL|L_RECURSIVE)) {
1095 case (L_EXCL): {
1096 mutex->type = EXCLUSIVE_ADVICE_SPL_MUTEX;
1097 mutex->spinners = 0;
1098 mutex->wake_one = 0;
1099 break;
1100 }
1101 case (L_EXCL | L_RECURSIVE): {
1102 mutex->type = EXCLUSIVE_ADVICE_SPL_RECURSIVE_MUTEX;
1103 mutex->spinners = 0;
1104 mutex->wake_one = 0;
1105 mutex->processor = NULLCPU;
1106 break;
1107 }
1108 case (L_EXCL | L_NOSPL): {
1109 mutex->type = EXCLUSIVE_ADVICE_MUTEX;
1110 mutex->spinners = 0;
1111 mutex->wake_one = 0;
1112 break;
1113 }
1114 case (L_EXCL | L_NOSPL | L_RECURSIVE): {
1115 mutex->type = EXCLUSIVE_ADVICE_RECURSIVE_MUTEX;
1116 mutex->spinners = 0;
1117 mutex->wake_one = 0;
1118 mutex->processor = NULLCPU;
1119 break;
1120 }
1121 case (L_EXCL | L_SPIN): {
1122 mutex->type = EXCLUSIVE_SPIN_SPL_MUTEX;
1123 break;
1124 }
1125 case (L_EXCL | L_SPIN | L_RECURSIVE): {
1126 mutex->type = EXCLUSIVE_SPIN_SPL_RECURSIVE_MUTEX;
1127 mutex->processor = NULLCPU;
1128 break;
1129 }
1130 case (L_EXCL | L_SPIN | L_NOSPL): {
1131 mutex->type = EXCLUSIVE_SPIN_MUTEX;
1132 break;
1133 }
1134 case (L_EXCL | L_SPIN | L_NOSPL | L_RECURSIVE): {
1135 mutex->type = EXCLUSIVE_SPIN_RECURSIVE_MUTEX;
1136 mutex->processor = NULLCPU;
```

```
1137 break;
1138 }
1139 case (L_EXCL | L_SLEEP):
1140 case (L_EXCL | L_SLEEP | L_NOSPL): {
1141 mutex->type = EXCLUSIVE_SLEEP_MUTEX;
1142 mutex->wake_one = 0;
1143 break;
1144 }
1145 case (L_EXCL | L_SLEEP | L_RECURSIVE):
1146 case (L_EXCL | L_SLEEP | L_NOSPL | L_RECURSIVE): {
1147 mutex->type = EXCLUSIVE_SLEEP_RECURSIVE_MUTEX;
1148 mutex->wake_one = 0;
1149 mutex->processor = NULLCPU;
1150 break;
1151 }
1152 case (L_SHARED): {
1153 mutex->type = SHARED_ADVICE_SPL_MUTEX;
1154 mutex->flags = L_SHARED;
1155 mutex->wake_one = 0;
1156 mutex->wake_all = 0;
1157 mutex->spinners = 0;
1158 break;
1159 }
1160 case (L_SHARED | L_NOSPL): {
1161 mutex->type = SHARED_ADVICE_MUTEX;
1162 mutex->flags = L_SHARED;
1163 mutex->wake_one = 0;
1164 mutex->wake_all = 0;
1165 mutex->spinners = 0;
1166 break;
1167 }
1168 case (L_SHARED | L_SPIN): {
1169 mutex->type = SHARED_SPIN_SPL_MUTEX;
1170 mutex->flags = L_SHARED;
1171 break;
1172 }
1173 case (L_SHARED | L_SPIN | L_NOSPL): {
1174 mutex->type = SHARED_SPIN_MUTEX;
1175 mutex->flags = L_SHARED;
1176 break;
1177 }
1178 case (L_SHARED | L_SLEEP):
1179 case (L_SHARED | L_SLEEP | L_NOSPL): {
1180 mutex->type = SHARED_SLEEP_MUTEX;
1181 mutex->flags = L_SHARED;
1182 mutex->wake_one = 0;
1183 mutex->wake_all = 0;
1184 break;
1185 }
1186 default: {
1187 cmn_err(CE_WARN,
1188 "mutex_init: (0x%x) insufficient flags\n",
1189 mutex);
1190 mutex->type = EXCLUSIVE_ADVICE_SPL_RECURSIVE_MUTEX;
1191 break;
1192 }
1193 }
1194 #if defined(DEBUG) || MP_STAT
1195 attach_lockinfo(mutex, lockinfo);
1196 #endif
1197 }
1198
1199 #ifdef ASM_LOCKS
1200 int
1201 mutex_lock_c(mutex, flags, splfunc)
1202 #else
1203
```

```
1204
1205 int
1206 mutex_lock(mutex, flags, splfunc)
1207 #endif
1208 register mutex_t *mutex;
1209 int flags;
1210 int (*splfunc)();
1211 {
1212 int oldipl;
1213 #ifdef DEBUG
1214 register lockinfo_t *info;
1215 register unsigned long spins;
1216
1217 check_lock_address(mutex);
1218 if (mutex->type == UNINITIALIZED_MUTEX) {
1219 cmn_err(CE_WARN,
1220 "mutex_lock: (0x%x) uninitialized lock\n",
1221 mutex);
1222 }
1223 locks_by_type[mutex->type]++;
1224 info = (lockinfo_t *)(mutex->mpdebug);
1225 check_lock_address(info);
1226 check_curlock_stack();
1227 if (lockdebug == 1) {
1228 if ( !(flags & L_TRY) && (curlock >= curlock_table) ) {
1229 check_lock_nesting(mutex);
1230 check_lock_hierarchy(mutex);
1231 }
1232 #if !TRACEV
1233 lock_log(LOG_MUTEX_LOCK, mutex, flags, mutex->mpdebug,
1234  splfunc, prior_caller(1), prior_caller(2), cpuid);
1235 #endif
1236 if (info->profile)
1237 record_lock_backtrace(info);
1238 }
1239 #else /* DEBUG */
1240 #if MP_STAT
1241 register lockinfo_t *info;
1242 register unsigned long spins;
1243
1244 info = (lockinfo_t *)(mutex->mpdebug);
1245 #endif
1246 #endif /* DEBUG */
1247 #if TRACEV
1248 if (tracechk(ev_mutex))
1249 tracev(&ev_mutex, "lock", curproc ? curproc->p_pid : 0, mutex,
1250 mutex->mpdebug, prior_caller(1), prior_caller(2));
1251 #endif
1252
1253 switch(mutex->type) {
1254 case EXCLUSIVE_SPIN_SPL_MUTEX: {
1255 #if defined(DEBUG) || MP_STAT
1256 if (splfunc != splnull)
1257 info->spl_needed++;
1258 #endif
1259 oldipl = (*splfunc)();
1260 MP_ASSERT( !mutex_is_mine(mutex, 0) );
1261 #ifdef DEBUG
1262 if (lockdebug == 1)
1263 check_lock_mask(mutex->mpdebug, L_EXCL | flags);
1264 #endif
1265 simple_lock(&mutex->lock);
1266 for (;;) {
1267 if (mutex->use_count == 0) {
1268 #ifdef DEBUG
1269 mutex->processor = cpuid;
```

```
1270 #endif
1271 mutex->use_count = 1;
1272 simple_unlock(&mutex->lock);
1273 *(++curlock) = mutex;
1274 #if MP_STAT
1275 if (flags & L_TRY)
1276 info->try_hits++;
1277 else
1278 info->get_hits++;
1279 #endif
1280 #ifdef DEBUG
1281 info->try_max = mutex_spins;
1282 mutex->db_flags = DB_LOCKED;
1283 mutex->locker = lock_caller();
1284 #endif
1285 return (oldipl);
1286 }
1287 if (flags & L_TRY) {
1288 #if MP_STAT
1289 info->try_misses++;
1290 #endif
1291 #ifdef DEBUG
1292 if (--info->try_max == 0) {
1293 calldebug();
1294 info->try_max = mutex_spins;
1295 }
1296 #endif
1297 simple_unlock(&mutex->lock);
1298 if (oldipl != NULLSPL)
1299 splx(oldipl);
1300 return (L_FAIL);
1301 }
1302 #if MP_STAT
1303 info->get_misses++;
1304 #endif
1305 simple_unlock(&mutex->lock);
1306 if (oldipl != NULLSPL)
1307 splx(oldipl);
1308 #if defined(DEBUG) || MP_STAT
1309 spins = 0;
1310 #endif
1311 while (mutex->use_count != 0) {
1312 xintr_poll();
1313 #if defined(DEBUG) || MP_STAT
1314 spins++;
1315 #endif
1316 #ifdef DEBUG
1317 if (spins >= mutex_spins) {
1318 calldebug();
1319 spins = 0;
1320 }
1321 #endif
1322 }
1323 #if MP_STAT
1324 get_spins(info, spins);
1325 #endif
1326 (*splfunc)();
1327 simple_lock(&mutex->lock);
1328 }
1329 }
1330 case EXCLUSIVE_SPIN_SPL_RECURSIVE_MUTEX: {
1331 #if defined(DEBUG) || MP_STAT
1332 if (splfunc != splnull)
1333 info->spl_needed++;
1334 #endif
1335 if (mutex->processor == cpuid) {
```

```
1336 oldipl = (*splfunc)();
1337 mutex->use_count++;
1338 #ifdef DEBUG
1339 info->recursed++;
1340 if (lockdebug == 1)
1341 log_recursion(mutex);
1342 #else /* DEBUG */
1343 #if MP_STAT
1344 info->recursed++;
1345 #endif
1346 #endif /* DEBUG */
1347 return (oldipl);
1348 }
1349 oldipl = (*splfunc)();
1350 #ifdef DEBUG
1351 if (lockdebug == 1)
1352 check_lock_mask(mutex->mpdebug, L_EXCL | flags);
1353 #endif
1354 simple_lock(&mutex->lock);
1355 for (;;) {
1356 if (mutex->use_count == 0) {
1357 mutex->processor = cpuid;
1358 mutex->use_count = 1;
1359 simple_unlock(&mutex->lock);
1360 *(++curlock) = mutex;
1361 #if MP_STAT
1362 if (flags & L_TRY)
1363 info->try_hits++;
1364 else
1365 info->get_hits++;
1366 #endif
1367 #ifdef DEBUG
1368 info->try_max = mutex_spins;
1369 mutex->db_flags = DB_LOCKED;
1370 mutex->locker = lock_caller();
1371 #endif
1372 return (oldipl);
1373 }
1374 if (flags & L_TRY) {
1375 #if MP_STAT
1376 info->try_misses++;
1377 #endif
1378 #ifdef DEBUG
1379 if (--info->try_max == 0) {
1380 calldebug();
1381 info->try_max = mutex_spins;
1382 }
1383 #endif
1384 simple_unlock(&mutex->lock);
1385 if (oldipl != NULLSPL)
1386 splx(oldipl);
1387 return (L_FAIL);
1388 }
1389 #if MP_STAT
1390 info->get_misses++;
1391 #endif
1392 simple_unlock(&mutex->lock);
1393 if (oldipl != NULLSPL)
1394 splx(oldipl);
1395 #if defined(DEBUG) || MP_STAT
1396 spins = 0;
1397 #endif
1398 while (mutex->use_count != 0) {
1399 xintr_poll();
1400 #if defined(DEBUG) || MP_STAT
1401 spins++;
```

```
1402 #endif
1403 #ifdef DEBUG
1404 if (spins >= mutex_spins) {
1405 calldebug();
1406 spins = 0;
1407 }
1408 #endif
1409 }
1410 #if MP_STAT
1411 get_spins(info, spins);
1412 #endif
1413 (*splfunc)();
1414 simple_lock(&mutex->lock);
1415 }
1416 }
1417 case EXCLUSIVE_ADVICE_SPL_MUTEX: {
1418 #if defined(DEBUG) || MP_STAT
1419 if (splfunc != splnull)
1420 info->spl_needed++;
1421 #endif
1422 oldipl = (*splfunc)();
1423 MP_ASSERT( !mutex_is_mine(mutex, 0) );
1424 #ifdef DEBUG
1425 if (lockdebug == 1)
1426 check_lock_mask(mutex->mpdebug, L_EXCL | flags);
1427 #endif
1428 simple_lock(&mutex->lock);
1429 for (;;) {
1430 if (mutex->use_count == 0) {
1431 #ifdef DEBUG
1432 mutex->processor = cpuid;
1433 #endif
1434 mutex->use_count = 1;
1435 if (flags & L_ADV_SLEEP) {
1436 #ifdef DEBUG
1437 info->advised++;
1438 #endif
1439 mutex->sleep_on_busy = 1;
1440 } else {
1441 mutex->sleep_on_busy = 0;
1442 }
1443 simple_unlock(&mutex->lock);
1444 *(++curlock) = mutex;
1445 #if MP_STAT
1446 if (flags & L_TRY)
1447 info->try_hits++;
1448 else
1449 info->get_hits++;
1450 #endif
1451 #ifdef DEBUG
1452 info->try_max = mutex_spins;
1453 mutex->db_flags = DB_LOCKED;
1454 mutex->locker = lock_caller();
1455 #endif
1456 return (oldipl);
1457 }
1458 if (flags & L_TRY) {
1459 #if MP_STAT
1460 info->try_misses++;
1461 #endif
1462 #ifdef DEBUG
1463 if (--info->try_max == 0) {
1464 calldebug();
1465 info->try_max = mutex_spins;
1466 }
1467 #endif
```

```
1468 simple_unlock(&mutex->lock);
1469 if (oldipl != NULLSPL)
1470 splx(oldipl);
1471 return (L_FAIL);
1472 }
1473 #if MP_STAT
1474 info->get_misses++;
1475 #endif
1476 switch (flags & (L_SPIN | L_SLEEP)) {
1477 case L_SLEEP: {
1478 mutex->wake_one++;
1479 simple_release(&mutex->lock);
1480
1481 SLEEP(&mutex->wake_one, PZERO);
1482 #if MP_STAT
1483 info->get_sleeps++;
1484 #endif
1485 simple_lock(&mutex->lock);
1486 mutex->wake_one--;
1487 break;
1488 }
1489 case L_SPIN: {
1490 mutex->spinners++;
1491 simple_unlock(&mutex->lock);
1492 if (oldipl != NULLSPL)
1493 splx(oldipl);
1494 #if defined(DEBUG) || MP_STAT
1495 spins = 0;
1496 #endif
1497 while (mutex->use_count != 0) {
1498 xintr_poll();
1499 #if defined(DEBUG) || MP_STAT
1500 spins++;
1501 #endif
1502 #ifdef DEBUG
1503 if (spins >= mutex_spins) {
1504 calldebug();
1505 spins = 0;
1506 }
1507 #endif
1508 }
1509 #if MP_STAT
1510 get_spins(info, spins);
1511 #endif
1512 (*splfunc)();
1513 simple_lock(&mutex->lock);
1514 mutex->spinners--;
1515 break;
1516 }
1517 default: {
1518 if (SHOULD_SLEEP(mutex)) {
1519 mutex->wake_one++;
1520 simple_release(&mutex->lock);
1521
1522 SLEEP(&mutex->wake_one, PZERO);
1523 #if MP_STAT
1524 info->get_sleeps++;
1525 #endif
1526 simple_lock(&mutex->lock);
1527 mutex->wake_one--;
1528 break;
1529 }
1530 mutex->spinners++;
1531 simple_unlock(&mutex->lock);
1532 if (oldipl != NULLSPL)
1533 splx(oldipl);
1534 #if defined(DEBUG) || MP_STAT
```

```
1535 spins = 0;
1536 #endif
1537 while (mutex->use_count != 0) {
1538 xintr_poll();
1539 if (SHOULD_SLEEP(mutex))
1540 break;
1541 #if defined(DEBUG) || MP_STAT
1542 spins++;
1543 #endif
1544 #ifdef DEBUG
1545 if (spins >= mutex_spins) {
1546 calldebug();
1547 spins = 0;
1548 }
1549 #endif
1550 }
1551 #if MP_STAT
1552 get_spins(info, spins);
1553 #endif
1554 (*splfunc)();
1555 simple_lock(&mutex->lock);
1556 mutex->spinners--;
1557 break;
1558 }
1559 } /* end switch (flags & ()) */
1560 }
1561 }
1562 case EXCLUSIVE_ADVICE_SPL_RECURSIVE_MUTEX: {
1563 #if defined(DEBUG) || MP_STAT
1564 if (splfunc != splnull)
1565 info->spl_needed++;
1566 #endif
1567 if (mutex->processor == cpuid) {
1568 oldipl = (*splfunc)();
1569 mutex->use_count++;
1570 if (flags & L_ADV_SLEEP) {
1571 #ifdef DEBUG
1572 info->advised++;
1573 #endif
1574 mutex->sleep_on_busy = 1;
1575 }
1576 #ifdef DEBUG
1577 info->recursed++;
1578 if (lockdebug == 1)
1579 log_recursion(mutex);
1580 #else /* DEBUG */
1581 #if MP_STAT
1582 info->recursed++;
1583 #endif
1584 #endif /* DEBUG */
1585 return (oldipl);
1586 }
1587 oldipl = (*splfunc)();
1588 #ifdef DEBUG
1589 if (lockdebug == 1)
1590 check_lock_mask(mutex->mpdebug, L_EXCL | flags);
1591 #endif
1592 simple_lock(&mutex->lock);
1593 for (;;) {
1594 if (mutex->use_count == 0) {
1595 mutex->processor = cpuid;
1596 mutex->use_count = 1;
1597 if (flags & L_ADV_SLEEP) {
1598 #ifdef DEBUG
1599 info->advised++;
1600 #endif
1601 mutex->sleep_on_busy = 1;
```

```
1602 } else {
1603 mutex->sleep_on_busy = 0;
1604 }
1605 simple_unlock(&mutex->lock);
1606 *(++curlock) = mutex;
1607 #if MP_STAT
1608 if (flags & L_TRY)
1609 info->try_hits++;
1610 else
1611 info->get_hits++;
1612 #endif
1613 #ifdef DEBUG
1614 info->try_max = mutex_spins;
1615 mutex->db_flags = DB_LOCKED;
1616 mutex->locker = lock_caller();
1617 #endif
1618 return (oldipl);
1619 }
1620 if (flags & L_TRY) {
1621 #if MP_STAT
1622 info->try_misses++;
1623 #endif
1624 #ifdef DEBUG
1625 if (--info->try_max == 0) {
1626 calldebug();
1627 info->try_max = mutex_spins;
1628 }
1629 #endif
1630 simple_unlock(&mutex->lock);
1631 if (oldipl != NULLSPL)
1632 splx(oldipl);
1633 return (L_FAIL);
1634 }
1635 #if MP_STAT
1636 info->get_misses++;
1637 #endif
1638 switch (flags & (L_SPIN | L_SLEEP)) {
1639 case L_SLEEP: {
1640 mutex->wake_one++;
1641 simple_release(&mutex->lock);
1642
1643 SLEEP(&mutex->wake_one, PZERO);
1644 #if MP_STAT
1645 info->get_sleeps++;
1646 #endif
1647 simple_lock(&mutex->lock);
1648 mutex->wake_one--;
1649 break;
1650 }
1651 case L_SPIN: {
1652 mutex->spinners++;
1653 simple_unlock(&mutex->lock);
1654 if (oldipl != NULLSPL)
1655 splx(oldipl);
1656 #if defined(DEBUG) || MP_STAT
1657 spins = 0;
1658 #endif
1659 while (mutex->use_count != 0) {
1660 xintr_poll();
1661 #if defined(DEBUG) || MP_STAT
1662 spins++;
1663 #endif
1664 #ifdef DEBUG
1665 if (spins >= mutex_spins) {
1666 calldebug();
1667 spins = 0;
```

```
1668 }
1669 #endif
1670 }
1671 #if MP_STAT
1672 get_spins(info, spins);
1673 #endif
1674 (*splfunc)();
1675 simple_lock(&mutex->lock);
1676 mutex->spinners--;
1677 break;
1678 }
1679 default: {
1680 if (SHOULD_SLEEP(mutex)) {
1681 mutex->wake_one++;
1682 simple_release(&mutex->lock);
1683
1684 SLEEP(&mutex->wake_one, PZERO);
1685 #if MP_STAT
1686 info->get_sleeps++;
1687 #endif
1688 simple_lock(&mutex->lock);
1689 mutex->wake_one--;
1690 break;
1691 }
1692 mutex->spinners++;
1693 simple_unlock(&mutex->lock);
1694 if (oldipl != NULLSPL)
1695 splx(oldipl);
1696 #if defined(DEBUG) || MP_STAT
1697 spins = 0;
1698 #endif
1699 while (mutex->use_count != 0) {
1700 xintr_poll();
1701 if (SHOULD_SLEEP(mutex))
1702 break;
1703 #if defined(DEBUG) || MP_STAT
1704 spins++;
1705 #endif
1706 #ifdef DEBUG
1707 if (spins >= mutex_spins) {
1708 calldebug();
1709 spins = 0;
1710 }
1711 #endif
1712 }
1713 #if MP_STAT
1714 get_spins(info, spins);
1715 #endif
1716 (*splfunc)();
1717 simple_lock(&mutex->lock);
1718 mutex->spinners--;
1719 break;
1720 }
1721 } /* end switch (flags & ()) */
1722 }
1723 }
1724 case EXCLUSIVE_SPIN_MUTEX: {
1725 MP_ASSERT( splfunc == splnull );
1726 MP_ASSERT( !mutex_is_mine(mutex, 0) );
1727 #ifdef DEBUG
1728 if (lockdebug == 1)
1729 check_lock_mask(mutex->mpdebug, L_EXCL | flags);
1730 #endif
1731 simple_lock(&mutex->lock);
1732 for (;;) {
1733 if (mutex->use_count == 0) {
```

```
1734 #ifdef DEBUG
1735 mutex->processor = cpuid;
1736 #endif
1737 mutex->use_count = 1;
1738 simple_unlock(&mutex->lock);
1739 *(++curlock) = mutex;
1740 #if MP_STAT
1741 if (flags & L_TRY)
1742 info->try_hits++;
1743 else
1744 info->get_hits++;
1745 #endif
1746 #ifdef DEBUG
1747 info->try_max = mutex_spins;
1748 mutex->db_flags = DB_LOCKED;
1749 mutex->locker = lock_caller();
1750 #endif
1751 return (0);
1752 }
1753 if (flags & L_TRY) {
1754 #if MP_STAT
1755 info->try_misses++;
1756 #endif
1757 #ifdef DEBUG
1758 if (--info->try_max == 0) {
1759 calldebug();
1760 info->try_max = mutex_spins;
1761 }
1762 #endif
1763 simple_unlock(&mutex->lock);
1764 return (L_FAIL);
1765 }
1766 #if MP_STAT
1767 info->get_misses++;
1768 #endif
1769 simple_unlock(&mutex->lock);
1770 #if defined(DEBUG) || MP_STAT
1771 spins = 0;
1772 #endif
1773 while (mutex->use_count != 0) {
1774 xintr_poll();
1775 #if defined(DEBUG) || MP_STAT
1776 spins++;
1777 #endif
1778 #ifdef DEBUG
1779 if (spins >= mutex_spins) {
1780 calldebug();
1781 spins = 0;
1782 }
1783 #endif
1784 }
1785 #if MP_STAT
1786 get_spins(info, spins);
1787 #endif
1788 simple_lock(&mutex->lock);
1789 }
1790 }
1791 case EXCLUSIVE_SPIN_RECURSIVE_MUTEX: {
1792 MP_ASSERT( splfunc == splnull );
1793 if (mutex->processor == cpuid) {
1794 mutex->use_count++;
1795 #ifdef DEBUG
1796 info->recursed++;
1797 if (lockdebug == 1)
1798 log_recursion(mutex);
1799 #else /* DEBUG */
1800 #if MP_STAT
```

```
1801 info->recursed++;
1802 #endif
1803 #endif /* DEBUG */
1804 return (0);
1805 }
1806 #ifdef DEBUG
1807 if (lockdebug == 1)
1808 check_lock_mask(mutex->mpdebug, L_EXCL | flags);
1809 #endif
1810 simple_lock(&mutex->lock);
1811 for (;;) {
1812 if (mutex->use_count == 0) {
1813 mutex->processor = cpuid;
1814 mutex->use_count = 1;
1815 simple_unlock(&mutex->lock);
1816 *(++curlock) = mutex;
1817 #if MP_STAT
1818 if (flags & L_TRY)
1819 info->try_hits++;
1820 else
1821 info->get_hits++;
1822 #endif
1823 #ifdef DEBUG
1824 info->try_max = mutex_spins;
1825 mutex->db_flags = DB_LOCKED;
1826 mutex->locker = lock_caller();
1827 #endif
1828 return (0);
1829 }
1830 if (flags & L_TRY) {
1831 #if MP_STAT
1832 info->try_misses++;
1833 #endif
1834 #ifdef DEBUG
1835 if (--info->try_max == 0) {
1836 calldebug();
1837 info->try_max = mutex_spins;
1838 }
1839 #endif
1840 simple_unlock(&mutex->lock);
1841 return (L_FAIL);
1842 }
1843 #if MP_STAT
1844 info->get_misses++;
1845 #endif
1846 simple_unlock(&mutex->lock);
1847 #if defined(DEBUG) || MP_STAT
1848 spins = 0;
1849 #endif
1850 while (mutex->use_count != 0) {
1851 xintr_poll();
1852 #if defined(DEBUG) || MP_STAT
1853 spins++;
1854 #endif
1855 #ifdef DEBUG
1856 if (spins >= mutex_spins) {
1857 calldebug();
1858 spins = 0;
1859 }
1860 #endif
1861 }
1862 #if MP_STAT
1863 get_spins(info, spins);
1864 #endif
1865 simple_lock(&mutex->lock);
1866 }
1867 }
```

```
1868 case EXCLUSIVE_SLEEP_MUTEX: {
1869 MP_ASSERT( splfunc == splnull );
1870 MP_ASSERT( !mutex_is_mine(mutex, 0) );
1871 #ifdef DEBUG
1872 if (lockdebug == 1)
1873 check_lock_mask(mutex->mpdebug, L_EXCL | flags);
1874 #endif
1875 simple_lock(&mutex->lock);
1876 for (;;) {
1877 if (mutex->use_count == 0) {
1878 #ifdef DEBUG
1879 mutex->processor = cpuid;
1880 #endif
1881 mutex->use_count = 1;
1882 simple_unlock(&mutex->lock);
1883 *(++curlock) = mutex;
1884 #if MP_STAT
1885 if (flags & L_TRY)
1886 info->try_hits++;
1887 else
1888 info->get_hits++;
1889 #endif
1890 #ifdef DEBUG
1891 info->try_max = mutex_spins;
1892 mutex->db_flags = DB_LOCKED;
1893 mutex->locker = lock_caller();
1894 #endif
1895 return (0);
1896 }
1897 if (flags & L_TRY) {
1898 #if MP_STAT
1899 info->try_misses++;
1900 #endif
1901 #ifdef DEBUG
1902 if (--info->try_max == 0) {
1903 calldebug();
1904 info->try_max = mutex_spins;
1905 }
1906 #endif
1907 simple_unlock(&mutex->lock);
1908 return (L_FAIL);
1909 }
1910 #if MP_STAT
1911 info->get_misses++;
1912 #endif
1913 mutex->wake_one++;
1914 simple_release(&mutex->lock);
1915
1916 SLEEP(&mutex->wake_one, PZERO);
1917 #if MP_STAT
1918 info->get_sleeps++;
1919 #endif
1920 simple_lock(&mutex->lock);
1921 mutex->wake_one--;
1922 }
1923 }
1924 case EXCLUSIVE_SLEEP_RECURSIVE_MUTEX: {
1925 MP_ASSERT( splfunc == splnull );
1926 if (mutex->processor == cpuid) {
1927 mutex->use_count++;
1928 #ifdef DEBUG
1929 info->recursed++;
1930 if (lockdebug == 1)
1931 log_recursion(mutex);
1932 #else /* DEBUG */
1933 #if MP_STAT
```

```
1934 info->recursed++;
1935 #endif
1936 #endif /* DEBUG */
1937 return (0);
1938 }
1939 #ifdef DEBUG
1940 if (lockdebug == 1)
1941 check_lock_mask(mutex->mpdebug, L_EXCL | flags);
1942 #endif
1943 simple_lock(&mutex->lock);
1944 for (;;) {
1945 if (mutex->use_count == 0) {
1946 mutex->processor = cpuid;
1947 mutex->use_count = 1;
1948 simple_unlock(&mutex->lock);
1949 *(++curlock) = mutex;
1950 #if MP_STAT
1951 if (flags & L_TRY)
1952 info->try_hits++;
1953 else
1954 info->get_hits++;
1955 #endif
1956 #ifdef DEBUG
1957 info->try_max = mutex_spins;
1958 mutex->db_flags = DB_LOCKED;
1959 mutex->locker = lock_caller();
1960 #endif
1961 return (0);
1962 }
1963 if (flags & L_TRY) {
1964 #if MP_STAT
1965 info->try_misses++;
1966 #endif
1967 #ifdef DEBUG
1968 if (--info->try_max == 0) {
1969 calldebug();
1970 info->try_max = mutex_spins;
1971 }
1972 #endif
1973 simple_unlock(&mutex->lock);
1974 return (L_FAIL);
1975 }
1976 #if MP_STAT
1977 info->get_misses++;
1978 #endif
1979 mutex->wake_one++;
1980 simple_release(&mutex->lock);
1981
1982 SLEEP(&mutex->wake_one, PZERO);
1983 #if MP_STAT
1984 info->get_sleeps++;
1985 #endif
1986 simple_lock(&mutex->lock);
1987 mutex->wake_one--;
1988 }
1989 }
1990 case EXCLUSIVE_ADVICE_MUTEX: {
1991 MP_ASSERT( splfunc == splnull );
1992 MP_ASSERT( !mutex_is_mine(mutex, 0) );
1993 #ifdef DEBUG
1994 if (lockdebug == 1)
1995 check_lock_mask(mutex->mpdebug, L_EXCL | flags);
1996 #endif
1997 simple_lock(&mutex->lock);
1998 for (;;) {
1999 if (mutex->use_count == 0) {
```

```
2000 #ifdef DEBUG
2001 mutex->processor = cpuid;
2002 #endif
2003 mutex->use_count = 1;
2004 if (flags & L_ADV_SLEEP) {
2005 #ifdef DEBUG
2006 info->advised++;
2007 #endif
2008 mutex->sleep_on_busy = 1;
2009 } else {
2010 mutex->sleep_on_busy = 0;
2011 }
2012 simple_unlock(&mutex->lock);
2013 *(++curlock) = mutex;
2014 #if MP_STAT
2015 if (flags & L_TRY)
2016 info->try_hits++;
2017 else
2018 info->get_hits++;
2019 #endif
2020 #ifdef DEBUG
2021 info->try_max = mutex_spins;
2022 mutex->db_flags = DB_LOCKED;
2023 mutex->locker = lock_caller();
2024 #endif
2025 return (0);
2026 }
2027 if (flags & L_TRY) {
2028 #if MP_STAT
2029 info->try_misses++;
2030 #endif
2031 #ifdef DEBUG
2032 if (--info->try_max == 0) {
2033 calldebug();
2034 info->try_max = mutex_spins;
2035 }
2036 #endif
2037 simple_unlock(&mutex->lock);
2038 return (L_FAIL);
2039 }
2040 #if MP_STAT
2041 info->get_misses++;
2042 #endif
2043 switch (flags & (L_SPIN | L_SLEEP)) {
2044 case L_SLEEP: {
2045 mutex->wake_one++;
2046 simple_release(&mutex->lock);
2047
2048 SLEEP(&mutex->wake_one, PZERO);
2049 #if MP_STAT
2050 info->get_sleeps++;
2051 #endif
2052 simple_lock(&mutex->lock);
2053 mutex->wake_one--;
2054 break;
2055 }
2056 case L_SPIN: {
2057 mutex->spinners++;
2058 simple_unlock(&mutex->lock);
2059 #if defined(DEBUG) || MP_STAT
2060 spins = 0;
2061 #endif
2062 while (mutex->use_count != 0) {
2063 xintr_poll();
2064 #if defined(DEBUG) || MP_STAT
2065 spins++;
```

```
2066 #endif
2067 #ifdef DEBUG
2068 if (spins >= mutex_spins) {
2069 calldebug();
2070 spins = 0;
2071 }
2072 #endif
2073 }
2074 #if MP_STAT
2075 get_spins(info, spins);
2076 #endif
2077 simple_lock(&mutex->lock);
2078 mutex->spinners--;
2079 break;
2080 }
2081 default: {
2082 if (SHOULD_SLEEP(mutex)) {
2083 mutex->wake_one++;
2084 simple_release(&mutex->lock);
2085
2086 SLEEP(&mutex->wake_one, PZERO);
2087 #if MP_STAT
2088 info->get_sleeps++;
2089 #endif
2090 simple_lock(&mutex->lock);
2091 mutex->wake_one--;
2092 break;
2093 }
2094 mutex->spinners++;
2095 simple_unlock(&mutex->lock);
2096 #if defined(DEBUG) || MP_STAT
2097 spins = 0;
2098 #endif
2099 while (mutex->use_count != 0) {
2100 xintr_poll();
2101 if (SHOULD_SLEEP(mutex))
2102 break;
2103 #if defined(DEBUG) || MP_STAT
2104 spins++;
2105 #endif
2106 #ifdef DEBUG
2107 if (spins >= mutex_spins) {
2108 calldebug();
2109 spins = 0;
2110 }
2111 #endif
2112 }
2113 #if MP_STAT
2114 get_spins(info, spins);
2115 #endif
2116 simple_lock(&mutex->lock);
2117 mutex->spinners--;
2118 break;
2119 }
2120 } /* end switch (flags & ()) */
2121 }
2122 }
2123 case EXCLUSIVE_ADVICE_RECURSIVE_MUTEX: {
2124 MP_ASSERT( splfunc == splnull );
2125 if (mutex->processor == cpuid) {
2126 mutex->use_count++;
2127 if (flags & L_ADV_SLEEP) {
2128 #ifdef DEBUG
2129 info->advised++;
2130 #endif
2131 mutex->sleep_on_busy = 1;
```

```
2132 }
2133 #ifdef DEBUG
2134 info->recursed++;
2135 if (lockdebug == 1)
2136 log_recursion(mutex);
2137 #else /* DEBUG */
2138 #if MP_STAT
2139 info->recursed++;
2140 #endif
2141 #endif /* DEBUG */
2142 return (0);
2143 }
2144 #ifdef DEBUG
2145 if (lockdebug == 1)
2146 check_lock_mask(mutex->mpdebug, L_EXCL | flags);
2147 #endif
2148 simple_lock(&mutex->lock);
2149 for (;;) {
2150 if (mutex->use_count == 0) {
2151 mutex->processor = cpuid;
2152 mutex->use_count = 1;
2153 if (flags & L_ADV_SLEEP) {
2154 #ifdef DEBUG
2155 info->advised++;
2156 #endif
2157 mutex->sleep_on_busy = 1;
2158 } else {
2159 mutex->sleep_on_busy = 0;
2160 }
2161 simple_unlock(&mutex->lock);
2162 *(++curlock) = mutex;
2163 #if MP_STAT
2164 if (flags & L_TRY)
2165 info->try_hits++;
2166 else
2167 info->get_hits++;
2168 #endif
2169 #ifdef DEBUG
2170 info->try_max = mutex_spins;
2171 mutex->db_flags = DB_LOCKED;
2172 mutex->locker = lock_caller();
2173 #endif
2174 return (0);
2175 }
2176 if (flags & L_TRY) {
2177 #if MP_STAT
2178 info->try_misses++;
2179 #endif
2180 #ifdef DEBUG
2181 if (--info->try_max == 0) {
2182 calldebug();
2183 info->try_max = mutex_spins;
2184 }
2185 #endif
2186 simple_unlock(&mutex->lock);
2187 return (L_FAIL);
2188 }
2189 #if MP_STAT
2190 info->get_misses++;
2191 #endif
2192 switch (flags & (L_SPIN | L_SLEEP)) {
2193 case L_SLEEP: {
2194 mutex->wake_one++;
2195 simple_release(&mutex->lock);
2196
2197 SLEEP(&mutex->wake_one, PZERO);
```

```
2198 #if MP_STAT
2199 info->get_sleeps++;
2200 #endif
2201 simple_lock(&mutex->lock);
2202 mutex->wake_one--;
2203 break;
2204 }
2205 case L_SPIN: {
2206 mutex->spinners++;
2207 simple_unlock(&mutex->lock);
2208 #if defined(DEBUG) || MP_STAT
2209 spins = 0;
2210 #endif
2211 while (mutex->use_count != 0) {
2212 xintr_poll();
2213 #if defined(DEBUG) || MP_STAT
2214 spins++;
2215 #endif
2216 #ifdef DEBUG
2217 if (spins >= mutex_spins) {
2218 calldebug();
2219 spins = 0;
2220 }
2221 #endif
2222 }
2223 #if MP_STAT
2224 get_spins(info, spins);
2225 #endif
2226 simple_lock(&mutex->lock);
2227 mutex->spinners--;
2228 break;
2229 }
2230 default: {
2231 if (SHOULD_SLEEP(mutex)) {
2232 mutex->wake_one++;
2233 simple_release(&mutex->lock);
2234
2235 SLEEP(&mutex->wake_one, PZERO);
2236 #if MP_STAT
2237 info->get_sleeps++;
2238 #endif
2239 simple_lock(&mutex->lock);
2240 mutex->wake_one--;
2241 break;
2242 }
2243 mutex->spinners++;
2244 simple_unlock(&mutex->lock);
2245 #if defined(DEBUG) || MP_STAT
2246 spins = 0;
2247 #endif
2248 while (mutex->use_count != 0) {
2249 xintr_poll();
2250 if (SHOULD_SLEEP(mutex))
2251 break;
2252 #if defined(DEBUG) || MP_STAT
2253 spins++;
2254 #endif
2255 #ifdef DEBUG
2256 if (spins >= mutex_spins) {
2257 calldebug();
2258 spins = 0;
2259 }
2260 #endif
2261 }
2262 #if MP_STAT
2263 get_spins(info, spins);
```

```
2264 #endif
2265 simple_lock(&mutex->lock);
2266 mutex->spinners--;
2267 break;
2268 }
2269 } /* end switch (flags & ()) */
2270 }
2271 }
2272 case SHARED_SPIN_SPL_MUTEX: {
2273 #if defined(DEBUG) || MP_STAT
2274 if (splfunc != splnull)
2275 info->spl_needed++;
2276 #endif
2277 switch(flags & (L_SHARED | L_EXCL | L_CHG)) {
2278 case (L_SHARED): {
2279 MP_ASSERT( !mutex_is_mine(mutex, L_EXCL) );
2280 oldipl = (*splfunc)();
2281 #ifdef DEBUG
2282 if (lockdebug == 1)
2283 check_lock_mask(mutex->mpdebug, flags);
2284 #endif
2285 simple_lock(&mutex->lock);
2286 for (;;) {
2287 if ( (mutex->flags == L_SHARED) ||
2288      mutex_is_mine(mutex, L_SHARED) ) {
2289 mutex->use_count++;
2290 simple_unlock(&mutex->lock);
2291 *(++curlock) = mutex;
2292 #if MP_STAT
2293 if (flags & L_TRY)
2294 info->try_hits++;
2295 else
2296 info->get_hits++;
2297 #endif
2298 #ifdef DEBUG
2299 info->try_max = mutex_spins;
2300 mutex->db_flags = DB_LOCKED;
2301 mutex->locker = lock_caller();
2302 #endif
2303 return (oldipl);
2304 }
2305 if (flags & L_TRY) {
2306 #if MP_STAT
2307 info->try_misses++;
2308 #endif
2309 #ifdef DEBUG
2310 if (--info->try_max == 0) {
2311 calldebug();
2312 info->try_max = mutex_spins;
2313 }
2314 #endif
2315 simple_unlock(&mutex->lock);
2316 if (oldipl != NULLSPL)
2317 splx(oldipl);
2318 return (L_FAIL);
2319 }
2320 #if MP_STAT
2321 info->get_misses++;
2322 #endif
2323 simple_unlock(&mutex->lock);
2324 if (oldipl != NULLSPL)
2325 splx(oldipl);
2326 #if defined(DEBUG) || MP_STAT
2327 spins = 0;
2328 #endif
2329 while (mutex->flags != L_SHARED) {
2330 xintr_poll();
```

```
2331 #if defined(DEBUG) || MP_STAT
2332         spins++;
2333 #endif
2334 #ifdef DEBUG
2335         if (spins >= mutex_spins) {
2336 calldebug();
2337 spins = 0;
2338         }
2339 #endif
2340 }
2341 #if MP_STAT
2342 get_spins(info, spins);
2343 #endif
2344 (*splfunc)();
2345 simple_lock(&mutex->lock);
2346 }
2347 }
2348 case (L_EXCL): {
2349 MP_ASSERT( !mutex_is_mine(mutex, 0) );
2350 oldipl = (*splfunc)();
2351 #ifdef DEBUG
2352 if (lockdebug == 1)
2353 check_lock_mask(mutex->mpdebug, flags);
2354 #endif
2355 simple_lock(&mutex->lock);
2356 for (;;) {
2357 if (mutex->use_count == 0) {
2358 #ifdef DEBUG
2359 mutex->processor = cpuid;
2360 #endif
2361 mutex->use_count = 1;
2362 mutex->flags = L_EXCL;
2363 simple_unlock(&mutex->lock);
2364 *(++curlock) = mutex;
2365 #if MP_STAT
2366 if (flags & L_TRY)
2367 info->try_hits++;
2368 else
2369 info->get_hits++;
2370 #endif
2371 #ifdef DEBUG
2372 info->try_max = mutex_spins;
2373 mutex->db_flags = DB_LOCKED;
2374 mutex->locker = lock_caller();
2375 #endif
2376 return (oldipl);
2377 }
2378 if (flags & L_TRY) {
2379 #if MP_STAT
2380 info->try_misses++;
2381 #endif
2382 #ifdef DEBUG
2383 if (--info->try_max == 0) {
2384 calldebug();
2385 info->try_max = mutex_spins;
2386 }
2387 #endif
2388 simple_unlock(&mutex->lock);
2389 if (oldipl != NULLSPL)
2390 splx(oldipl);
2391 return (L_FAIL);
2392 }
2393 mutex->flags |= L_EXCL;
2394 #if MP_STAT
2395 info->get_misses++;
2396 #endif
```

```
2397 simple_unlock(&mutex->lock);
2398 if (oldipl != NULLSPL)
2399 splx(oldipl);
2400 #if defined(DEBUG) || MP_STAT
2401 spins = 0;
2402 #endif
2403 while (mutex->use_count != 0) {
2404 xintr_poll();
2405 #if defined(DEBUG) || MP_STAT
2406 spins++;
2407 #endif
2408 #ifdef DEBUG
2409 if (spins >= mutex_spins) {
2410 calldebug();
2411 spins = 0;
2412 }
2413 #endif
2414 }
2415 #if MP_STAT
2416 get_spins(info, spins);
2417 #endif
2418 (*splfunc)();
2419 simple_lock(&mutex->lock);
2420 }
2421 }
2422 case (L_SHARED | L_CHG): {
2423 MP_ASSERT( mutex_is_mine(mutex, L_EXCL) );
2424 MP_ASSERT( mutex->flags == L_EXCL );
2425 MP_ASSERT( mutex->processor == cpuid );
2426 MP_ASSERT( mutex->use_count == 1 );
2427 oldipl = (*splfunc)();
2428 #if MP_STAT
2429 info->chg_down++;
2430 #endif
2431 simple_lock(&mutex->lock);
2432 mutex->flags = L_SHARED;
2433 #ifdef DEBUG
2434 mutex->db_flags = DB_DOWNGRADED;
2435 mutex->locker = lock_caller();
2436 #endif
2437 simple_unlock(&mutex->lock);
2438 return (oldipl);
2439 }
2440 case (L_EXCL | L_CHG): {
2441 MP_ASSERT( mutex_is_mine(mutex, L_SHARED) );
2442 oldipl = (*splfunc)();
2443 #ifdef DEBUG
2444 if (lockdebug == 1)
2445 check_lock_mask(mutex->mpdebug, flags);
2446 #endif
2447 simple_lock(&mutex->lock);
2448 if (mutex->use_count == 1) {
2449 mutex->flags = L_EXCL;
2450 #if MP_STAT
2451 info->chg_hits++;
2452 #endif
2453 #ifdef DEBUG
2454 mutex->processor = cpuid;
2455 mutex->db_flags = DB_UPGRADED;
2456 mutex->locker = lock_caller();
2457 #endif
2458 simple_unlock(&mutex->lock);
2459 return (oldipl);
2460 }
2461 if (flags & L_TRY) {
2462 #if MP_STAT
2463 info->chg_misses++;
```

```
2464 #endif
2465 simple_unlock(&mutex->lock);
2466 if (oldipl != NULLSPL)
2467 splx(oldipl);
2468 return (L_FAIL);
2469 }
2470 if (mutex->flags & L_CHG) {
2471 #if MP_STAT
2472 info->chg_fails++;
2473 #endif
2474 simple_unlock(&mutex->lock);
2475 if (oldipl != NULLSPL)
2476 splx(oldipl);
2477 return (L_FAIL);
2478 }
2479 mutex->flags |= L_CHG;
2480 for (;;) {
2481 #if MP_STAT
2482 info->chg_misses++;
2483 #endif
2484 simple_unlock(&mutex->lock);
2485 if (oldipl != NULLSPL)
2486 splx(oldipl);
2487 #if defined(DEBUG) || MP_STAT
2488 spins = 0;
2489 #endif
2490 while (mutex->use_count > 1) {
2491 xintr_poll();
2492 #if defined(DEBUG) || MP_STAT
2493 spins++;
2494 #endif
2495 #ifdef DEBUG
2496 if (spins >= mutex_spins) {
2497 calldebug();
2498 spins = 0;
2499 }
2500 #endif
2501 }
2502 #if MP_STAT
2503 info->chg_spins += spins;
2504 #endif
2505 (*splfunc)();
2506 simple_lock(&mutex->lock);
2507 if (mutex->use_count == 1) {
2508 mutex->flags = L_EXCL;
2509 #if MP_STAT
2510 info->chg_hits++;
2511 #endif
2512 #ifdef DEBUG
2513 mutex->processor = cpuid;
2514 mutex->db_flags = DB_UPGRADED;
2515 mutex->locker = lock_caller();
2516 #endif
2517 simple_unlock(&mutex->lock);
2518 return (oldipl);
2519 }
2520 }
2521 }
2522 default: {
2523 cmn_err(CE_PANIC,
2524 "mutex_lock: (0x%x) bad flags\n",
2525 mutex);
2526 return (L_FAIL);
2527 }
2528 } /* end switch (flags & (L_SHARED | L_EXCL | L_CHG)) */
2529 }
```

```
2530 case SHARED_ADVICE_SPL_MUTEX: {
2531 #if defined(DEBUG) || MP_STAT
2532 if (splfunc != splnull)
2533 info->spl_needed++;
2534 #endif
2535 switch(flags & (L_SHARED | L_EXCL | L_CHG)) {
2536 case (L_SHARED): {
2537 MP_ASSERT( !mutex_is_mine(mutex, L_EXCL) );
2538 oldipl = (*splfunc)();
2539 #ifdef DEBUG
2540 if (lockdebug == 1)
2541 check_lock_mask(mutex->mpdebug, flags);
2542 #endif
2543 simple_lock(&mutex->lock);
2544 for (;;) {
2545 if ( (mutex->flags == L_SHARED) ||
2546      mutex_is_mine(mutex, L_SHARED) ) {
2547 mutex->use_count++;
2548 simple_unlock(&mutex->lock);
2549 *(++curlock) = mutex;
2550 #if MP_STAT
2551 if (flags & L_TRY)
2552 info->try_hits++;
2553 else
2554 info->get_hits++;
2555 #endif
2556 #ifdef DEBUG
2557 info->try_max = mutex_spins;
2558 mutex->db_flags = DB_LOCKED;
2559 mutex->locker = lock_caller();
2560 #endif
2561 return (oldipl);
2562 }
2563 if (flags & L_TRY) {
2564 #if MP_STAT
2565 info->try_misses++;
2566 #endif
2567 #ifdef DEBUG
2568 if (--info->try_max == 0) {
2569 calldebug();
2570 info->try_max = mutex_spins;
2571 }
2572 #endif
2573 simple_unlock(&mutex->lock);
2574 if (oldipl != NULLSPL)
2575 splx(oldipl);
2576 return (L_FAIL);
2577 }
2578 #if MP_STAT
2579 info->get_misses++;
2580 #endif
2581 switch (flags & (L_SPIN | L_SLEEP)) {
2582 case L_SLEEP: {
2583 mutex->wake_all++;
2584 simple_release(&mutex->lock);
2585
2586 SLEEP(&mutex->wake_all, PZERO);
2587 #if MP_STAT
2588 info->get_sleeps++;
2589 #endif
2590 simple_lock(&mutex->lock);
2591 mutex->wake_all--;
2592 break;
2593 }
2594 case L_SPIN: {
2595 mutex->spinners++;
2596 simple_unlock(&mutex->lock);
```

```
2597 if (oldipl != NULLSPL)
2598 splx(oldipl);
2599 #if defined(DEBUG) || MP_STAT
2600 spins = 0;
2601 #endif
2602 while (mutex->flags != L_SHARED) {
2603 xintr_poll();
2604 #if defined(DEBUG) || MP_STAT
2605         spins++;
2606 #endif
2607 #ifdef DEBUG
2608         if (spins >= mutex_spins) {
2609 calldebug();
2610 spins = 0;
2611         }
2612 #endif
2613 }
2614 #if MP_STAT
2615 get_spins(info, spins);
2616 #endif
2617 (*splfunc)();
2618 simple_lock(&mutex->lock);
2619 mutex->spinners--;
2620 break;
2621 }
2622 default: {
2623 if (SHOULD_SLEEP(mutex)) {
2624 mutex->wake_all++;
2625 simple_release(&mutex->lock);
2626
2627 SLEEP(&mutex->wake_all, PZERO);
2628 #if MP_STAT
2629 info->get_sleeps++;
2630 #endif
2631 simple_lock(&mutex->lock);
2632 mutex->wake_all--;
2633 break;
2634 }
2635 mutex->spinners++;
2636 simple_unlock(&mutex->lock);
2637 if (oldipl != NULLSPL)
2638 splx(oldipl);
2639 #if defined(DEBUG) || MP_STAT
2640 spins = 0;
2641 #endif
2642 while (mutex->flags != L_SHARED) {
2643 xintr_poll();
2644 if (SHOULD_SLEEP(mutex))
2645 break;
2646 #if defined(DEBUG) || MP_STAT
2647         spins++;
2648 #endif
2649 #ifdef DEBUG
2650         if (spins >= mutex_spins) {
2651 calldebug();
2652 spins = 0;
2653         }
2654 #endif
2655 }
2656 #if MP_STAT
2657 get_spins(info, spins);
2658 #endif
2659 (*splfunc)();
2660 simple_lock(&mutex->lock);
2661 mutex->spinners--;
2662 break;
```

```
2663 }
2664 } /* end switch */
2665 }
2666 }
2667 case (L_EXCL): {
2668 MP_ASSERT( !mutex_is_mine(mutex, 0) );
2669 oldipl = (*splfunc)();
2670 #ifdef DEBUG
2671 if (lockdebug == 1)
2672 check_lock_mask(mutex->mpdebug, flags);
2673 #endif
2674 simple_lock(&mutex->lock);
2675 for (;;) {
2676 if (mutex->use_count == 0) {
2677 #ifdef DEBUG
2678 mutex->processor = cpuid;
2679 #endif
2680 mutex->use_count = 1;
2681 mutex->flags = L_EXCL;
2682 simple_unlock(&mutex->lock);
2683 *(++curlock) = mutex;
2684 #if MP_STAT
2685 if (flags & L_TRY)
2686 info->try_hits++;
2687 else
2688 info->get_hits++;
2689 #endif
2690 #ifdef DEBUG
2691 info->try_max = mutex_spins;
2692 mutex->db_flags = DB_LOCKED;
2693 mutex->locker = lock_caller();
2694 #endif
2695 return (oldipl);
2696 }
2697 if (flags & L_TRY) {
2698 #if MP_STAT
2699 info->try_misses++;
2700 #endif
2701 #ifdef DEBUG
2702 if (--info->try_max == 0) {
2703 calldebug();
2704 info->try_max = mutex_spins;
2705 }
2706 #endif
2707 simple_unlock(&mutex->lock);
2708 if (oldipl != NULLSPL)
2709 splx(oldipl);
2710 return (L_FAIL);
2711 }
2712 mutex->flags |= L_EXCL;
2713 #if MP_STAT
2714 info->get_misses++;
2715 #endif
2716 switch (flags & (L_SPIN | L_SLEEP)) {
2717 case L_SLEEP: {
2718 mutex->wake_one++;
2719 simple_release(&mutex->lock);
2720
2721 SLEEP(&mutex->wake_one, PZERO);
2722 #if MP_STAT
2723 info->get_sleeps++;
2724 #endif
2725 simple_lock(&mutex->lock);
2726 mutex->wake_one--;
2727 break;
2728 }
2729 case L_SPIN: {
```

```
2730 mutex->spinners++;
2731 simple_unlock(&mutex->lock);
2732 if (oldipl != NULLSPL)
2733 splx(oldipl);
2734 #if defined(DEBUG) || MP_STAT
2735 spins = 0;
2736 #endif
2737 while (mutex->use_count != 0) {
2738 xintr_poll();
2739 #if defined(DEBUG) || MP_STAT
2740 spins++;
2741 #endif
2742 #ifdef DEBUG
2743 if (spins >= mutex_spins) {
2744 calldebug();
2745 spins = 0;
2746 }
2747 #endif
2748 }
2749 #if MP_STAT
2750 get_spins(info, spins);
2751 #endif
2752 (*splfunc)();
2753 simple_lock(&mutex->lock);
2754 mutex->spinners--;
2755 break;
2756 }
2757 default: {
2758 if (SHOULD_SLEEP(mutex)) {
2759 mutex->wake_one++;
2760 simple_release(&mutex->lock);
2761
2762 SLEEP(&mutex->wake_one, PZERO);
2763 #if MP_STAT
2764 info->get_sleeps++;
2765 #endif
2766 simple_lock(&mutex->lock);
2767 mutex->wake_one--;
2768 break;
2769 }
2770 mutex->spinners++;
2771 simple_unlock(&mutex->lock);
2772 if (oldipl != NULLSPL)
2773 splx(oldipl);
2774 #if defined(DEBUG) || MP_STAT
2775 spins = 0;
2776 #endif
2777 while (mutex->use_count != 0) {
2778 xintr_poll();
2779 if (SHOULD_SLEEP(mutex))
2780 break;
2781 #if defined(DEBUG) || MP_STAT
2782 spins++;
2783 #endif
2784 #ifdef DEBUG
2785 if (spins >= mutex_spins) {
2786 calldebug();
2787 spins = 0;
2788 }
2789 #endif
2790 }
2791 #if MP_STAT
2792 get_spins(info, spins);
2793 #endif
2794 mutex->spinners--;
2795 (*splfunc)();
```

```
2796 simple_lock(&mutex->lock);
2797 break;
2798 }
2799 } /* end switch */
2800 }
2801 }
2802 case (L_SHARED | L_CHG): {
2803 MP_ASSERT( mutex_is_mine(mutex, L_EXCL) );
2804 MP_ASSERT( mutex->flags == L_EXCL );
2805 MP_ASSERT( mutex->processor == cpuid );
2806 MP_ASSERT( mutex->use_count == 1 );
2807 oldipl = (*splfunc)();
2808 #if MP_STAT
2809 info->chg_down++;
2810 #endif
2811 simple_lock(&mutex->lock);
2812 mutex->flags = L_SHARED;
2813 #ifdef DEBUG
2814 mutex->db_flags = DB_DOWNGRADED;
2815 mutex->locker = lock_caller();
2816 #endif
2817 if (mutex->spinners) {
2818 simple_unlock(&mutex->lock);
2819 return (oldipl);
2820 }
2821 simple_unlock(&mutex->lock);
2822 if (mutex->wake_all && !mutex->wake_one)
2823 WAKE_ALL(&mutex->wake_all);
2824 return (oldipl);
2825 }
2826 case (L_EXCL | L_CHG): {
2827 MP_ASSERT( mutex_is_mine(mutex, L_SHARED) );
2828 oldipl = (*splfunc)();
2829 #ifdef DEBUG
2830 if (lockdebug == 1)
2831 check_lock_mask(mutex->mpdebug, flags);
2832 #endif
2833 simple_lock(&mutex->lock);
2834 if (mutex->use_count == 1) {
2835 mutex->flags = L_EXCL;
2836 #if MP_STAT
2837 info->chg_hits++;
2838 #endif
2839 #ifdef DEBUG
2840 mutex->processor = cpuid;
2841 mutex->db_flags = DB_UPGRADED;
2842 mutex->locker = lock_caller();
2843 #endif
2844 simple_unlock(&mutex->lock);
2845 return (oldipl);
2846 }
2847 if (flags & L_TRY) {
2848 #if MP_STAT
2849 info->chg_misses++;
2850 #endif
2851 simple_unlock(&mutex->lock);
2852 if (oldipl != NULLSPL)
2853 splx(oldipl);
2854 return (L_FAIL);
2855 }
2856 switch (flags & (L_SPIN | L_SLEEP)) {
2857 case L_SLEEP: {
2858 #if MP_STAT
2859 info->chg_fails++;
2860 #endif
2861 simple_unlock(&mutex->lock);
```

```
2862 if (oldipl != NULLSPL)
2863 splx(oldipl);
2864 return (L_FAIL);
2865 }
2866 case L_SPIN: {
2867 if (mutex->flags & L_CHG) {
2868 #if MP_STAT
2869 info->chg_fails++;
2870 #endif
2871 simple_unlock(&mutex->lock);
2872 if (oldipl != NULLSPL)
2873 splx(oldipl);
2874 return (L_FAIL);
2875 }
2876 mutex->flags |= L_CHG;
2877 for (;;) {
2878 #if MP_STAT
2879 info->chg_misses++;
2880 #endif
2881 simple_unlock(&mutex->lock);
2882 if (oldipl != NULLSPL)
2883 splx(oldipl);
2884 #if defined(DEBUG) || MP_STAT
2885 spins = 0;
2886 #endif
2887 while (mutex->use_count > 1) {
2888 xintr_poll();
2889 #if defined(DEBUG) || MP_STAT
2890 spins++;
2891 #endif
2892 #ifdef DEBUG
2893 if (spins >= mutex_spins) {
2894 calldebug();
2895 spins = 0;
2896 }
2897 #endif
2898 }
2899 #if MP_STAT
2900 info->chg_spins += spins;
2901 #endif
2902 (*splfunc)();
2903 simple_lock(&mutex->lock);
2904 if (mutex->use_count == 1) {
2905 mutex->flags = L_EXCL;
2906 #if MP_STAT
2907 info->chg_hits++;
2908 #endif
2909 #ifdef DEBUG
2910 mutex->processor = cpuid;
2911 mutex->db_flags = DB_UPGRADED;
2912 mutex->locker = lock_caller();
2913 #endif
2914 simple_unlock(&mutex->lock);
2915 return (oldipl);
2916 }
2917 }
2918 }
2919 default: {
2920 if ((mutex->flags & L_CHG) ||
2921     SHOULD_SLEEP(mutex)) {
2922 #if MP_STAT
2923 info->chg_fails++;
2924 #endif
2925 simple_unlock(&mutex->lock);
2926 if (oldipl != NULLSPL)
2927 splx(oldipl);
```

```
2928 return (L_FAIL);
2929 }
2930 mutex->flags |= L_CHG;
2931 for (;;) {
2932 #if MP_STAT
2933 info->chg_misses++;
2934 #endif
2935 simple_unlock(&mutex->lock);
2936 if (oldipl != NULLSPL)
2937 splx(oldipl);
2938 #if defined(DEBUG) || MP_STAT
2939 spins = 0;
2940 #endif
2941 while (mutex->use_count > 1) {
2942 xintr_poll();
2943 if (SHOULD_SLEEP(mutex))
2944 break;
2945 #if defined(DEBUG) || MP_STAT
2946 spins++;
2947 #endif
2948 #ifdef DEBUG
2949 if (spins >= mutex_spins) {
2950 calldebug();
2951 spins = 0;
2952 }
2953 #endif
2954 }
2955 #if MP_STAT
2956 info->chg_spins += spins;
2957 #endif
2958 (*splfunc)();
2959 simple_lock(&mutex->lock);
2960 if (mutex->use_count == 1) {
2961 mutex->flags = L_EXCL;
2962 #if MP_STAT
2963 info->chg_hits++;
2964 #endif
2965 #ifdef DEBUG
2966 mutex->processor = cpuid;
2967 mutex->db_flags = DB_UPGRADED;
2968 mutex->locker = lock_caller();
2969 #endif
2970 simple_unlock(&mutex->lock);
2971 return (oldipl);
2972 }
2973 if (SHOULD_SLEEP(mutex)) {
2974 #if MP_STAT
2975 info->chg_fails++;
2976 #endif
2977 mutex->flags &= ~L_CHG;
2978 simple_unlock(&mutex->lock);
2979 if (oldipl != NULLSPL)
2980 splx(oldipl);
2981 return (L_FAIL);
2982 }
2983 }
2984 }
2985 } /* end switch (flags & (L_SPIN | L_SLEEP)) */
2986 }
2987 default: {
2988 cmn_err(CE_PANIC,
2989 "mutex_lock: (0x%x) bad flags\n",
2990 mutex);
2991 return (L_FAIL);
2992 }
2993 } /* end switch (flags & (L_SHARED | L_EXCL | L_CHG)) */
2994 }
```

```
2995 case SHARED_SPIN_MUTEX: {
2996 MP_ASSERT( splfunc == splnull );
2997 switch(flags & (L_SHARED | L_EXCL | L_CHG)) {
2998 case (L_SHARED): {
2999 MP_ASSERT( !mutex_is_mine(mutex, L_EXCL) );
3000 #ifdef DEBUG
3001 if (lockdebug == 1)
3002 check_lock_mask(mutex->mpdebug, flags);
3003 #endif
3004 simple_lock(&mutex->lock);
3005 for (;;) {
3006 if ( (mutex->flags == L_SHARED) ||
3007      mutex_is_mine(mutex, L_SHARED) ) {
3008 mutex->use_count++;
3009 simple_unlock(&mutex->lock);
3010 *(++curlock) = mutex;
3011 #if MP_STAT
3012 if (flags & L_TRY)
3013 info->try_hits++;
3014 else
3015 info->get_hits++;
3016 #endif
3017 #ifdef DEBUG
3018 info->try_max = mutex_spins;
3019 mutex->db_flags = DB_LOCKED;
3020 mutex->locker = lock_caller();
3021 #endif
3022 return (0);
3023 }
3024 if (flags & L_TRY) {
3025 #if MP_STAT
3026 info->try_misses++;
3027 #endif
3028 #ifdef DEBUG
3029 if (--info->try_max == 0) {
3030 calldebug();
3031 info->try_max = mutex_spins;
3032 }
3033 #endif
3034 simple_unlock(&mutex->lock);
3035 return (L_FAIL);
3036 }
3037 #if MP_STAT
3038 info->get_misses++;
3039 #endif
3040 simple_unlock(&mutex->lock);
3041 #if defined(DEBUG) || MP_STAT
3042 spins = 0;
3043 #endif
3044 while (mutex->flags != L_SHARED) {
3045 xintr_poll();
3046 #if defined(DEBUG) || MP_STAT
3047         spins++;
3048 #endif
3049 #ifdef DEBUG
3050         if (spins >= mutex_spins) {
3051 calldebug();
3052 spins = 0;
3053         }
3054 #endif
3055 }
3056 #if MP_STAT
3057 get_spins(info, spins);
3058 #endif
3059 simple_lock(&mutex->lock);
3060 }
3061 }
```

```
3062 case (L_EXCL): {
3063 MP_ASSERT( !mutex_is_mine(mutex, 0) );
3064 #ifdef DEBUG
3065 if (lockdebug == 1)
3066 check_lock_mask(mutex->mpdebug, flags);
3067 #endif
3068 simple_lock(&mutex->lock);
3069 for (;;) {
3070 if (mutex->use_count == 0) {
3071 #ifdef DEBUG
3072 mutex->processor = cpuid;
3073 #endif
3074 mutex->use_count = 1;
3075 mutex->flags = L_EXCL;
3076 simple_unlock(&mutex->lock);
3077 *(++curlock) = mutex;
3078 #if MP_STAT
3079 if (flags & L_TRY)
3080 info->try_hits++;
3081 else
3082 info->get_hits++;
3083 #endif
3084 #ifdef DEBUG
3085 info->try_max = mutex_spins;
3086 mutex->db_flags = DB_LOCKED;
3087 mutex->locker = lock_caller();
3088 #endif
3089 return (0);
3090 }
3091 if (flags & L_TRY) {
3092 #if MP_STAT
3093 info->try_misses++;
3094 #endif
3095 #ifdef DEBUG
3096 if (--info->try_max == 0) {
3097 calldebug();
3098 info->try_max = mutex_spins;
3099 }
3100 #endif
3101 simple_unlock(&mutex->lock);
3102 return (L_FAIL);
3103 }
3104 mutex->flags |= L_EXCL;
3105 #if MP_STAT
3106 info->get_misses++;
3107 #endif
3108 simple_unlock(&mutex->lock);
3109 #if defined(DEBUG) || MP_STAT
3110 spins = 0;
3111 #endif
3112 while (mutex->use_count != 0) {
3113 xintr_poll();
3114 #if defined(DEBUG) || MP_STAT
3115 spins++;
3116 #endif
3117 #ifdef DEBUG
3118 if (spins >= mutex_spins) {
3119 calldebug();
3120 spins = 0;
3121 }
3122 #endif
3123 }
3124 #if MP_STAT
3125 get_spins(info, spins);
3126 #endif
3127 simple_lock(&mutex->lock);
```

```
3128 }
3129 }
3130 case (L_SHARED | L_CHG): {
3131 MP_ASSERT( mutex_is_mine(mutex, L_EXCL) );
3132 MP_ASSERT( mutex->flags == L_EXCL );
3133 MP_ASSERT( mutex->processor == cpuid );
3134 MP_ASSERT( mutex->use_count == 1 );
3135 #if MP_STAT
3136 info->chg_down++;
3137 #endif
3138 simple_lock(&mutex->lock);
3139 mutex->flags = L_SHARED;
3140 #ifdef DEBUG
3141 mutex->db_flags = DB_DOWNGRADED;
3142 mutex->locker = lock_caller();
3143 #endif
3144 simple_unlock(&mutex->lock);
3145 return (0);
3146 }
3147 case (L_EXCL | L_CHG): {
3148 MP_ASSERT( mutex_is_mine(mutex, L_SHARED) );
3149 #ifdef DEBUG
3150 if (lockdebug == 1)
3151 check_lock_mask(mutex->mpdebug, flags);
3152 #endif
3153 simple_lock(&mutex->lock);
3154 if (mutex->use_count == 1) {
3155 mutex->flags = L_EXCL;
3156 #if MP_STAT
3157 info->chg_hits++;
3158 #endif
3159 #ifdef DEBUG
3160 mutex->processor = cpuid;
3161 mutex->db_flags = DB_UPGRADED;
3162 mutex->locker = lock_caller();
3163 #endif
3164 simple_unlock(&mutex->lock);
3165 return (0);
3166 }
3167 if (flags & L_TRY) {
3168 #if MP_STAT
3169 info->chg_misses++;
3170 #endif
3171 simple_unlock(&mutex->lock);
3172 return (L_FAIL);
3173 }
3174 if (mutex->flags & L_CHG) {
3175 #if MP_STAT
3176 info->chg_fails++;
3177 #endif
3178 simple_unlock(&mutex->lock);
3179 return (L_FAIL);
3180 }
3181 mutex->flags |= L_CHG;
3182 for (;;) {
3183 #if MP_STAT
3184 info->chg_misses++;
3185 #endif
3186 simple_unlock(&mutex->lock);
3187 #if defined(DEBUG) || MP_STAT
3188 spins = 0;
3189 #endif
3190 while (mutex->use_count > 1) {
3191 xintr_poll();
3192 #if defined(DEBUG) || MP_STAT
3193 spins++;
3194 #endif
```

```
3195 #ifdef DEBUG
3196 if (spins >= mutex_spins) {
3197 calldebug();
3198 spins = 0;
3199 }
3200 #endif
3201 }
3202 #if MP_STAT
3203 info->chg_spins += spins;
3204 #endif
3205 simple_lock(&mutex->lock);
3206 if (mutex->use_count == 1) {
3207 mutex->flags = L_EXCL;
3208 #if MP_STAT
3209 info->chg_hits++;
3210 #endif
3211 #ifdef DEBUG
3212 mutex->processor = cpuid;
3213 mutex->db_flags = DB_UPGRADED;
3214 mutex->locker = lock_caller();
3215 #endif
3216 simple_unlock(&mutex->lock);
3217 return (0);
3218 }
3219 }
3220 }
3221 default: {
3222 cmn_err(CE_PANIC,
3223 "mutex_lock: (0x%x) bad flags\n",
3224 mutex);
3225 return (L_FAIL);
3226 }
3227 } /* end switch (flags & (L_SHARED | L_EXCL | L_CHG)) */
3228 }
3229 case SHARED_SLEEP_MUTEX: {
3230 MP_ASSERT( splfunc == splnull );
3231 switch(flags & (L_SHARED | L_EXCL | L_CHG)) {
3232 case (L_SHARED): {
3233 MP_ASSERT( !mutex_is_mine(mutex, L_EXCL) );
3234 #ifdef DEBUG
3235 if (lockdebug == 1)
3236 check_lock_mask(mutex->mpdebug, flags);
3237 #endif
3238 simple_lock(&mutex->lock);
3239 for (;;) {
3240 if ( (mutex->flags == L_SHARED) ||
3241     mutex_is_mine(mutex, L_SHARED) ) {
3242 mutex->use_count++;
3243 simple_unlock(&mutex->lock);
3244 *(++curlock) = mutex;
3245 #if MP_STAT
3246 if (flags & L_TRY)
3247 info->try_hits++;
3248 else
3249 info->get_hits++;
3250 #endif
3251 #ifdef DEBUG
3252 info->try_max = mutex_spins;
3253 mutex->db_flags = DB_LOCKED;
3254 mutex->locker = lock_caller();
3255 #endif
3256 return (0);
3257 }
3258 if (flags & L_TRY) {
3259 #if MP_STAT
3260 info->try_misses++;
```

```
3261 #endif
3262 #ifdef DEBUG
3263 if (--info->try_max == 0) {
3264 calldebug();
3265 info->try_max = mutex_spins;
3266 }
3267 #endif
3268 simple_unlock(&mutex->lock);
3269 return (L_FAIL);
3270 }
3271 #if MP_STAT
3272 info->get_misses++;
3273 #endif
3274 mutex->wake_all++;
3275 simple_release(&mutex->lock);
3276
3277 SLEEP(&mutex->wake_all, PZERO);
3278 #if MP_STAT
3279 info->get_sleeps++;
3280 #endif
3281 simple_lock(&mutex->lock);
3282 mutex->wake_all--;
3283 }
3284 }
3285 case (L_EXCL): {
3286 MP_ASSERT( !mutex_is_mine(mutex, 0) );
3287 #ifdef DEBUG
3288 if (lockdebug == 1)
3289 check_lock_mask(mutex->mpdebug, flags);
3290 #endif
3291 simple_lock(&mutex->lock);
3292 for (;;) {
3293 if (mutex->use_count == 0) {
3294 #ifdef DEBUG
3295 mutex->processor = cpuid;
3296 #endif
3297 mutex->use_count = 1;
3298 mutex->flags = L_EXCL;
3299 simple_unlock(&mutex->lock);
3300 *(++curlock) = mutex;
3301 #if MP_STAT
3302 if (flags & L_TRY)
3303 info->try_hits++;
3304 else
3305 info->get_hits++;
3306 #endif
3307 #ifdef DEBUG
3308 info->try_max = mutex_spins;
3309 mutex->db_flags = DB_LOCKED;
3310 mutex->locker = lock_caller();
3311 #endif
3312 return (0);
3313 }
3314 if (flags & L_TRY) {
3315 #if MP_STAT
3316 info->try_misses++;
3317 #endif
3318 #ifdef DEBUG
3319 if (--info->try_max == 0) {
3320 calldebug();
3321 info->try_max = mutex_spins;
3322 }
3323 #endif
3324 simple_unlock(&mutex->lock);
3325 return (L_FAIL);
3326 }
```

```
3327 mutex->flags |= L_EXCL;
3328 #if MP_STAT
3329 info->get_misses++;
3330 #endif
3331 mutex->wake_one++;
3332 simple_release(&mutex->lock);
3333
3334 SLEEP(&mutex->wake_one, PZERO);
3335 #if MP_STAT
3336 info->get_sleeps++;
3337 #endif
3338 simple_lock(&mutex->lock);
3339 mutex->wake_one--;
3340 }
3341 }
3342 case (L_SHARED | L_CHG): {
3343 MP_ASSERT( mutex_is_mine(mutex, L_EXCL) );
3344 MP_ASSERT( mutex->flags == L_EXCL );
3345 MP_ASSERT( mutex->processor == cpuid );
3346 MP_ASSERT( mutex->use_count == 1 );
3347 #if MP_STAT
3348 info->chg_down++;
3349 #endif
3350 simple_lock(&mutex->lock);
3351 mutex->flags = L_SHARED;
3352 #ifdef DEBUG
3353 mutex->db_flags = DB_DOWNGRADED;
3354 mutex->locker = lock_caller();
3355 #endif
3356 simple_unlock(&mutex->lock);
3357 if (mutex->wake_all && !mutex->wake_one)
3358 WAKE_ALL(&mutex->wake_all);
3359 return (0);
3360 }
3361 case (L_EXCL | L_CHG): {
3362 MP_ASSERT( mutex_is_mine(mutex, L_SHARED) );
3363 #ifdef DEBUG
3364 if (lockdebug == 1)
3365 check_lock_mask(mutex->mpdebug, flags);
3366 #endif
3367 simple_lock(&mutex->lock);
3368 if (mutex->use_count == 1) {
3369 mutex->flags = L_EXCL;
3370 #if MP_STAT
3371 info->chg_hits++;
3372 #endif
3373 #ifdef DEBUG
3374 mutex->processor = cpuid;
3375 mutex->db_flags = DB_UPGRADED;
3376 mutex->locker = lock_caller();
3377 #endif
3378 simple_unlock(&mutex->lock);
3379 return (0);
3380 }
3381 if (flags & L_TRY) {
3382 #if MP_STAT
3383 info->chg_misses++;
3384 #endif
3385 simple_unlock(&mutex->lock);
3386 return (L_FAIL);
3387 }
3388 #if MP_STAT
3389 info->chg_fails++;
3390 #endif
3391 simple_unlock(&mutex->lock);
3392 return (L_FAIL);
```

```
3393 }
3394 default: {
3395 cmn_err(CE_PANIC,
3396 "mutex_lock: (0x%x) bad flags\n",
3397 mutex);
3398 return (L_FAIL);
3399 }
3400 } /* end switch (flags & (L_SHARED | L_EXCL | L_CHG)) */
3401 }
3402 case SHARED_ADVICE_MUTEX: {
3403 MP_ASSERT( splfunc == splnull );
3404 switch(flags & (L_SHARED | L_EXCL | L_CHG)) {
3405 case (L_SHARED): {
3406 MP_ASSERT( !mutex_is_mine(mutex, L_EXCL) );
3407 #ifdef DEBUG
3408 if (lockdebug == 1)
3409 check_lock_mask(mutex->mpdebug, flags);
3410 #endif
3411 simple_lock(&mutex->lock);
3412 for (;;) {
3413 if ( (mutex->flags == L_SHARED) ||
3414     mutex_is_mine(mutex, L_SHARED) ) {
3415 mutex->use_count++;
3416 simple_unlock(&mutex->lock);
3417 *(++curlock) = mutex;
3418 #if MP_STAT
3419 if (flags & L_TRY)
3420 info->try_hits++;
3421 else
3422 info->get_hits++;
3423 #endif
3424 #ifdef DEBUG
3425 info->try_max = mutex_spins;
3426 mutex->db_flags = DB_LOCKED;
3427 mutex->locker = lock_caller();
3428 #endif
3429 return (0);
3430 }
3431 if (flags & L_TRY) {
3432 #if MP_STAT
3433 info->try_misses++;
3434 #endif
3435 #ifdef DEBUG
3436 if (--info->try_max == 0) {
3437 calldebug();
3438 info->try_max = mutex_spins;
3439 }
3440 #endif
3441 simple_unlock(&mutex->lock);
3442 return (L_FAIL);
3443 }
3444 #if MP_STAT
3445 info->get_misses++;
3446 #endif
3447 switch (flags & (L_SPIN | L_SLEEP)) {
3448 case L_SLEEP: {
3449 mutex->wake_all++;
3450 simple_release(&mutex->lock);
3451
3452 SLEEP(&mutex->wake_all, PZERO);
3453 #if MP_STAT
3454 info->get_sleeps++;
3455 #endif
3456 simple_lock(&mutex->lock);
3457 mutex->wake_all--;
3458 break;
3459 }
```

```
3460 case L_SPIN: {
3461 mutex->spinners++;
3462 simple_unlock(&mutex->lock);
3463 #if defined(DEBUG) || MP_STAT
3464 spins = 0;
3465 #endif
3466 while (mutex->flags != L_SHARED) {
3467 xintr_poll();
3468 #if defined(DEBUG) || MP_STAT
3469         spins++;
3470 #endif
3471 #ifdef DEBUG
3472         if (spins >= mutex_spins) {
3473 calldebug();
3474 spins = 0;
3475         }
3476 #endif
3477 }
3478 #if MP_STAT
3479 get_spins(info, spins);
3480 #endif
3481 simple_lock(&mutex->lock);
3482 mutex->spinners--;
3483 break;
3484 }
3485 default: {
3486 if (SHOULD_SLEEP(mutex)) {
3487 mutex->wake_all++;
3488 simple_release(&mutex->lock);
3489
3490 SLEEP(&mutex->wake_all, PZERO);
3491 #if MP_STAT
3492 info->get_sleeps++;
3493 #endif
3494 simple_lock(&mutex->lock);
3495 mutex->wake_all--;
3496 break;
3497 }
3498 mutex->spinners++;
3499 simple_unlock(&mutex->lock);
3500 #if defined(DEBUG) || MP_STAT
3501 spins = 0;
3502 #endif
3503 while (mutex->flags != L_SHARED) {
3504 xintr_poll();
3505 if (SHOULD_SLEEP(mutex))
3506 break;
3507 #if defined(DEBUG) || MP_STAT
3508         spins++;
3509 #endif
3510 #ifdef DEBUG
3511         if (spins >= mutex_spins) {
3512 calldebug();
3513 spins = 0;
3514         }
3515 #endif
3516 }
3517 #if MP_STAT
3518 get_spins(info, spins);
3519 #endif
3520 simple_lock(&mutex->lock);
3521 mutex->spinners--;
3522 break;
3523 }
3524 } /* end switch */
3525 }
3526 }
```

```
3527 case (L_EXCL): {
3528 MP_ASSERT( !mutex_is_mine(mutex, 0) );
3529 #ifdef DEBUG
3530 if (lockdebug == 1)
3531 check_lock_mask(mutex->mpdebug, flags);
3532 #endif
3533 simple_lock(&mutex->lock);
3534 for (;;) {
3535 if (mutex->use_count == 0) {
3536 #ifdef DEBUG
3537 mutex->processor = cpuid;
3538 #endif
3539 mutex->use_count = 1;
3540 mutex->flags = L_EXCL;
3541 simple_unlock(&mutex->lock);
3542 *(++curlock) = mutex;
3543 #if MP_STAT
3544 if (flags & L_TRY)
3545 info->try_hits++;
3546 else
3547 info->get_hits++;
3548 #endif
3549 #ifdef DEBUG
3550 info->try_max = mutex_spins;
3551 mutex->db_flags = DB_LOCKED;
3552 mutex->locker = lock_caller();
3553 #endif
3554 return (0);
3555 }
3556 if (flags & L_TRY) {
3557 #if MP_STAT
3558 info->try_misses++;
3559 #endif
3560 #ifdef DEBUG
3561 if (--info->try_max == 0) {
3562 calldebug();
3563 info->try_max = mutex_spins;
3564 }
3565 #endif
3566 simple_unlock(&mutex->lock);
3567 return (L_FAIL);
3568 }
3569 mutex->flags |= L_EXCL;
3570 #if MP_STAT
3571 info->get_misses++;
3572 #endif
3573 switch (flags & (L_SPIN | L_SLEEP)) {
3574 case L_SLEEP: {
3575 mutex->wake_one++;
3576 simple_release(&mutex->lock);
3577
3578 SLEEP(&mutex->wake_one, PZERO);
3579 #if MP_STAT
3580 info->get_sleeps++;
3581 #endif
3582 simple_lock(&mutex->lock);
3583 mutex->wake_one--;
3584 break;
3585 }
3586 case L_SPIN: {
3587 mutex->spinners++;
3588 simple_unlock(&mutex->lock);
3589 #if defined(DEBUG) || MP_STAT
3590 spins = 0;
3591 #endif
3592 while (mutex->use_count != 0) {
```

```
3593 xintr_poll();
3594 #if defined(DEBUG) || MP_STAT
3595 spins++;
3596 #endif
3597 #ifdef DEBUG
3598 if (spins >= mutex_spins) {
3599 calldebug();
3600 spins = 0;
3601 }
3602 #endif
3603 }
3604 #if MP_STAT
3605 get_spins(info, spins);
3606 #endif
3607 simple_lock(&mutex->lock);
3608 mutex->spinners--;
3609 break;
3610 }
3611 default: {
3612 if (SHOULD_SLEEP(mutex)) {
3613 mutex->wake_one++;
3614 simple_release(&mutex->lock);
3615
3616 SLEEP(&mutex->wake_one, PZERO);
3617 #if MP_STAT
3618 info->get_sleeps++;
3619 #endif
3620 simple_lock(&mutex->lock);
3621 mutex->wake_one--;
3622 break;
3623 }
3624 mutex->spinners++;
3625 simple_unlock(&mutex->lock);
3626 #if defined(DEBUG) || MP_STAT
3627 spins = 0;
3628 #endif
3629 while (mutex->use_count != 0) {
3630 xintr_poll();
3631 if (SHOULD_SLEEP(mutex))
3632 break;
3633 #if defined(DEBUG) || MP_STAT
3634 spins++;
3635 #endif
3636 #ifdef DEBUG
3637 if (spins >= mutex_spins) {
3638 calldebug();
3639 spins = 0;
3640 }
3641 #endif
3642 }
3643 #if MP_STAT
3644 get_spins(info, spins);
3645 #endif
3646 mutex->spinners--;
3647 simple_lock(&mutex->lock);
3648 break;
3649 }
3650 } /* end switch */
3651 }
3652 }
3653 case (L_SHARED | L_CHG): {
3654 MP_ASSERT( mutex_is_mine(mutex, L_EXCL) );
3655 MP_ASSERT( mutex->flags == L_EXCL );
3656 MP_ASSERT( mutex->processor == cpuid );
3657 MP_ASSERT( mutex->use_count == 1 );
3658 #if MP_STAT
```

```
3659 info->chg_down++;
3660 #endif
3661 simple_lock(&mutex->lock);
3662 mutex->flags = L_SHARED;
3663 #ifdef DEBUG
3664 mutex->db_flags = DB_DOWNGRADED;
3665 mutex->locker = lock_caller();
3666 #endif
3667 if (mutex->spinners) {
3668 simple_unlock(&mutex->lock);
3669 return (0);
3670 }
3671 simple_unlock(&mutex->lock);
3672 if (mutex->wake_all && !mutex->wake_one)
3673 WAKE_ALL(&mutex->wake_all);
3674 return (0);
3675 }
3676 case (L_EXCL | L_CHG): {
3677 MP_ASSERT( mutex_is_mine(mutex, L_SHARED) );
3678 #ifdef DEBUG
3679 if (lockdebug == 1)
3680 check_lock_mask(mutex->mpdebug, flags);
3681 #endif
3682 simple_lock(&mutex->lock);
3683 if (mutex->use_count == 1) {
3684 mutex->flags = L_EXCL;
3685 #if MP_STAT
3686 info->chg_hits++;
3687 #endif
3688 #ifdef DEBUG
3689 mutex->processor = cpuid;
3690 mutex->db_flags = DB_UPGRADED;
3691 mutex->locker = lock_caller();
3692 #endif
3693 simple_unlock(&mutex->lock);
3694 return (0);
3695 }
3696 if (flags & L_TRY) {
3697 #if MP_STAT
3698 info->chg_misses++;
3699 #endif
3700 simple_unlock(&mutex->lock);
3701 return (L_FAIL);
3702 }
3703 switch (flags & (L_SPIN | L_SLEEP)) {
3704 case L_SLEEP: {
3705 #if MP_STAT
3706 info->chg_fails++;
3707 #endif
3708 simple_unlock(&mutex->lock);
3709 return (L_FAIL);
3710 }
3711 case L_SPIN: {
3712 if (mutex->flags & L_CHG) {
3713 #if MP_STAT
3714 info->chg_fails++;
3715 #endif
3716 simple_unlock(&mutex->lock);
3717 return (L_FAIL);
3718 }
3719 mutex->flags |= L_CHG;
3720 for (;;) {
3721 #if MP_STAT
3722 info->chg_misses++;
3723 #endif
3724 simple_unlock(&mutex->lock);
```

```
3725 #if defined(DEBUG) || MP_STAT
3726 spins = 0;
3727 #endif
3728 while (mutex->use_count > 1) {
3729 xintr_poll();
3730 #if defined(DEBUG) || MP_STAT
3731 spins++;
3732 #endif
3733 #ifdef DEBUG
3734 if (spins >= mutex_spins) {
3735 calldebug();
3736 spins = 0;
3737 }
3738 #endif
3739 }
3740 #if MP_STAT
3741 info->chg_spins += spins;
3742 #endif
3743 simple_lock(&mutex->lock);
3744 if (mutex->use_count == 1) {
3745 mutex->flags = L_EXCL;
3746 #if MP_STAT
3747 info->chg_hits++;
3748 #endif
3749 #ifdef DEBUG
3750 mutex->processor = cpuid;
3751 mutex->db_flags = DB_UPGRADED;
3752 mutex->locker = lock_caller();
3753 #endif
3754 simple_unlock(&mutex->lock);
3755 return (0);
3756 }
3757 }
3758 }
3759 default: {
3760 if ((mutex->flags & L_CHG) ||
3761     SHOULD_SLEEP(mutex)) {
3762 #if MP_STAT
3763 info->chg_fails++;
3764 #endif
3765 simple_unlock(&mutex->lock);
3766 return (L_FAIL);
3767 }
3768 mutex->flags |= L_CHG;
3769 for (;;) {
3770 #if MP_STAT
3771 info->chg_misses++;
3772 #endif
3773 simple_unlock(&mutex->lock);
3774 #if defined(DEBUG) || MP_STAT
3775 spins = 0;
3776 #endif
3777 while (mutex->use_count > 1) {
3778 xintr_poll();
3779 if (SHOULD_SLEEP(mutex))
3780 break;
3781 #if defined(DEBUG) || MP_STAT
3782 spins++;
3783 #endif
3784 #ifdef DEBUG
3785 if (spins >= mutex_spins) {
3786 calldebug();
3787 spins = 0;
3788 }
3789 #endif
3790 }
```

```
3791 #if MP_STAT
3792 info->chg_spins += spins;
3793 #endif
3794 simple_lock(&mutex->lock);
3795 if (mutex->use_count == 1) {
3796 mutex->flags = L_EXCL;
3797 #if MP_STAT
3798 info->chg_hits++;
3799 #endif
3800 #ifdef DEBUG
3801 mutex->processor = cpuid;
3802 mutex->db_flags = DB_UPGRADED;
3803 mutex->locker = lock_caller();
3804 #endif
3805 simple_unlock(&mutex->lock);
3806 return (0);
3807 }
3808 if (SHOULD_SLEEP(mutex)) {
3809 #if MP_STAT
3810 info->chg_fails++;
3811 #endif
3812 mutex->flags &= ~L_CHG;
3813 simple_unlock(&mutex->lock);
3814 return (L_FAIL);
3815 }
3816 }
3817 }
3818 } /* end switch (flags & (L_SPIN | L_SLEEP)) */
3819 }
3820 default: {
3821 cmn_err(CE_PANIC,
3822 "mutex_lock: (0x%x) bad flags\n",
3823 mutex);
3824 return (L_FAIL);
3825 }
3826 } /* end switch (flags & (L_SHARED | L_EXCL | L_CHG)) */
3827 }
3828 case UNINITIALIZED_MUTEX: {
3829 cmn_err(CE_WARN,
3830 "mutex_lock: (0x%x) uninitialized lock\n",
3831 mutex);
3832 return (L_FAIL);
3833 }
3834 case EXCLUSIVE_SLEEP_SPL_RECURSIVE_MUTEX:
3835 case EXCLUSIVE_SLEEP_SPL_MUTEX:
3836 case SHARED_SLEEP_SPL_MUTEX:
3837 default: {
3838 cmn_err(CE_PANIC,
3839 "mutex_lock: (0x%x) unknown lock type\n",
3840 mutex);
3841 return (L_FAIL);
3842 }
3843 } /* end switch(mutex->type) */
3844 }
3845
3846 #ifdef ASM_LOCKS
3847 void
3848 mutex_unlock_c(mutex, oldipl)
3849 #else
3850
3851
3852 void
3853 mutex_unlock(mutex, oldipl)
3854 #endif
3855 mutex_t *mutex;
3856 int oldipl;
```

```
3857 {
3858 #ifdef DEBUG
3859 check_lock_address(mutex);
3860 check_curlock_stack();
3861 #if !TRACEV
3862 if (lockdebug == 1) {
3863 lock_log(LOG_MUTEX_UNLOCK, mutex, 0, mutex->mpdebug,
3864  oldipl, prior_caller(1), prior_caller(2), cpuid);
3865 }
3866 #endif /* !TRACEV */
3867 #endif /* DEBUG */
3868 #if TRACEV
3869 if (tracechk(ev_mutex))
3870 tracev(&ev_mutex, "unlock", curproc ? curproc->p_pid : 0, mutex,
3871 mutex->mpdebug, prior_caller(1), prior_caller(2));
3872 #endif
3873 switch (mutex->type) {
3874 case EXCLUSIVE_SPIN_SPL_MUTEX: {
3875 #if defined(DEBUG) || MP_STAT
3876 if (oldipl != NULLSPL)
3877 ((lockinfo_t *)(mutex->mpdebug))->spl_needed++;
3878 #endif
3879 MP_ASSERT( mutex->processor == cpuid );
3880 MP_ASSERT( mutex->use_count == 1 );
3881 #ifdef DEBUG
3882 mutex->db_flags = DB_UNLOCKED;
3883 mutex->unlocker = lock_caller();
3884 if (lockdebug == 1)
3885 check_lock_mask(mutex->mpdebug, L_TRY);
3886 #endif
3887 if (*curlock == mutex) {
3888 *(curlock--) = (mutex_t *)NULL;
3889 } else {
3890 unstack_lock(mutex);
3891 }
3892 #ifdef DEBUG
3893 mutex->processor = NULLCPU;
3894 #endif
3895 mutex->use_count = 0;
3896 break;
3897
3898 }
3899 case EXCLUSIVE_SPIN_SPL_RECURSIVE_MUTEX: {
3900 #if defined(DEBUG) || MP_STAT
3901 if (oldipl != NULLSPL)
3902 ((lockinfo_t *)(mutex->mpdebug))->spl_needed++;
3903 #endif
3904 MP_ASSERT( mutex->processor == cpuid );
3905 MP_ASSERT( mutex->use_count > 0 );
3906 #ifdef DEBUG
3907 mutex->db_flags = DB_UNLOCKED;
3908 mutex->unlocker = lock_caller();
3909 if (lockdebug == 1)
3910 check_lock_mask(mutex->mpdebug, L_TRY);
3911 #endif
3912 if (mutex->use_count == 1) {
3913 if (*curlock == mutex) {
3914 *(curlock--) = (mutex_t *)NULL;
3915 } else {
3916 unstack_lock(mutex);
3917 }
3918 mutex->processor = NULLCPU;
3919 mutex->use_count = 0;
3920 } else {
3921 mutex->use_count--;
3922 }
3923 break;
```

```
3924
3925 }
3926 case EXCLUSIVE_ADVICE_SPL_MUTEX: {
3927 #if defined(DEBUG) || MP_STAT
3928 if (oldipl != NULLSPL)
3929 ((lockinfo_t *)(mutex->mpdebug))->spl_needed++;
3930 #endif
3931 MP_ASSERT( mutex->processor == cpuid );
3932 MP_ASSERT( mutex->use_count == 1 );
3933 #ifdef DEBUG
3934 mutex->db_flags = DB_UNLOCKED;
3935 mutex->unlocker = lock_caller();
3936 if (lockdebug == 1)
3937 check_lock_mask(mutex->mpdebug, L_TRY);
3938 #endif
3939 if (*curlock == mutex) {
3940 *(curlock--) = (mutex_t *)NULL;
3941 } else {
3942 unstack_lock(mutex);
3943 }
3944 #ifdef DEBUG
3945 mutex->processor = NULLCPU;
3946 #endif
3947 #ifdef i486
3948 Locked_Zero(&mutex->use_count);
3949 #else
3950 mutex->use_count = 0;
3951 #endif
3952 /*
3953  * If simple lock is held, we may be in the
3954  * window where another processor saw the
3955  * use_count non-zero and is getting ready
3956  * to set wake_one to 1 and go to sleep.
3957  * If another process is already asleep, the
3958  * one in the window can safely be ignored.
3959  */
3960 while ((mutex->lock != 0) && (mutex->wake_one <= 1)) {
3961 xintr_poll();
3962 }
3963 if (mutex->spinners)
3964 break;
3965 if (mutex->wake_one)
3966 WAKE_ONE(&mutex->wake_one);
3967 break;
3968
3969 }
3970 case EXCLUSIVE_ADVICE_SPL_RECURSIVE_MUTEX: {
3971 #if defined(DEBUG) || MP_STAT
3972 if (oldipl != NULLSPL)
3973 ((lockinfo_t *)(mutex->mpdebug))->spl_needed++;
3974 #endif
3975 MP_ASSERT( mutex->processor == cpuid );
3976 MP_ASSERT( mutex->use_count > 0 );
3977 #ifdef DEBUG
3978 mutex->db_flags = DB_UNLOCKED;
3979 mutex->unlocker = lock_caller();
3980 if (lockdebug == 1)
3981 check_lock_mask(mutex->mpdebug, L_TRY);
3982 #endif
3983 if (mutex->use_count == 1) {
3984 if (*curlock == mutex) {
3985 *(curlock--) = (mutex_t *)NULL;
3986 } else {
3987 unstack_lock(mutex);
3988 }
3989 mutex->processor = NULLCPU;
```

```
3990 #ifdef i486
3991 Locked_Zero(&mutex->use_count);
3992 #else
3993 mutex->use_count = 0;
3994 #endif
3995 /*
3996  * If simple lock is held, we may be in the
3997  * window where another processor saw the
3998  * use_count non-zero and is getting ready
3999  * to set wake_one to 1 and go to sleep.
4000  * If another process is already asleep, the
4001  * one in the window can safely be ignored.
4002  */
4003 while ((mutex->lock != 0) && (mutex->wake_one <= 1)) {
4004 xintr_poll();
4005 }
4006 if (mutex->spinners)
4007 break;
4008 if (mutex->wake_one)
4009 WAKE_ONE(&mutex->wake_one);
4010 } else {
4011 mutex->use_count--;
4012 }
4013 break;
4014
4015 }
4016 case EXCLUSIVE_SPIN_MUTEX: {
4017 MP_ASSERT( oldipl == NULLSPL );
4018 MP_ASSERT( mutex->processor == cpuid );
4019 MP_ASSERT( mutex->use_count == 1 );
4020 #ifdef DEBUG
4021 mutex->db_flags = DB_UNLOCKED;
4022 mutex->unlocker = lock_caller();
4023 if (lockdebug == 1)
4024 check_lock_mask(mutex->mpdebug, L_TRY);
4025 #endif
4026 if (*curlock == mutex) {
4027 *(curlock--) = (mutex_t *)NULL;
4028 } else {
4029 unstack_lock(mutex);
4030 }
4031 #ifdef DEBUG
4032 mutex->processor = NULLCPU;
4033 #endif
4034 mutex->use_count = 0;
4035 return;
4036
4037 }
4038 case EXCLUSIVE_SPIN_RECURSIVE_MUTEX: {
4039 MP_ASSERT( oldipl == NULLSPL );
4040 MP_ASSERT( mutex->processor == cpuid );
4041 MP_ASSERT( mutex->use_count > 0 );
4042 #ifdef DEBUG
4043 mutex->db_flags = DB_UNLOCKED;
4044 mutex->unlocker = lock_caller();
4045 if (lockdebug == 1)
4046 check_lock_mask(mutex->mpdebug, L_TRY);
4047 #endif
4048 if (mutex->use_count == 1) {
4049 if (*curlock == mutex) {
4050 *(curlock--) = (mutex_t *)NULL;
4051 } else {
4052 unstack_lock(mutex);
4053 }
4054 mutex->processor = NULLCPU;
4055 mutex->use_count = 0;
```

```
4056 } else {
4057 mutex->use_count--;
4058 }
4059 return;
4060
4061 }
4062 case EXCLUSIVE_SLEEP_MUTEX: {
4063 MP_ASSERT( oldipl == NULLSPL );
4064 MP_ASSERT( mutex->processor == cpuid );
4065 MP_ASSERT( mutex->use_count == 1 );
4066 #ifdef DEBUG
4067 mutex->db_flags = DB_UNLOCKED;
4068 mutex->unlocker = lock_caller();
4069 if (lockdebug == 1)
4070 check_lock_mask(mutex->mpdebug, L_TRY);
4071 #endif
4072 if (*curlock == mutex) {
4073 *(curlock--) = (mutex_t *)NULL;
4074 } else {
4075 unstack_lock(mutex);
4076 }
4077 #ifdef DEBUG
4078 mutex->processor = NULLCPU;
4079 #endif
4080 #ifdef i486
4081 Locked_Zero(&mutex->use_count);
4082 #else
4083 mutex->use_count = 0;
4084 #endif
4085 /*
4086  * If simple lock is held, we may be in the
4087  * window where another processor saw the
4088  * use_count non-zero and is getting ready
4089  * to set wake_one to 1 and go to sleep.
4090  * If another process is already asleep, the
4091  * one in the window can safely be ignored.
4092  */
4093 while ((mutex->lock != 0) && (mutex->wake_one <= 1)) {
4094 xintr_poll();
4095 }
4096 if (mutex->wake_one)
4097 WAKE_ONE(&mutex->wake_one);
4098 return;
4099
4100 }
4101 case EXCLUSIVE_SLEEP_RECURSIVE_MUTEX: {
4102 MP_ASSERT( oldipl == NULLSPL );
4103 MP_ASSERT( mutex->processor == cpuid );
4104 MP_ASSERT( mutex->use_count > 0 );
4105 #ifdef DEBUG
4106 mutex->db_flags = DB_UNLOCKED;
4107 mutex->unlocker = lock_caller();
4108 if (lockdebug == 1)
4109 check_lock_mask(mutex->mpdebug, L_TRY);
4110 #endif
4111 if (mutex->use_count == 1) {
4112 if (*curlock == mutex) {
4113 *(curlock--) = (mutex_t *)NULL;
4114 } else {
4115 unstack_lock(mutex);
4116 }
4117 mutex->processor = NULLCPU;
4118 #ifdef i486
4119 Locked_Zero(&mutex->use_count);
4120 #else
4121 mutex->use_count = 0;
```

```
4122 #endif
4123 /*
4124  * If simple lock is held, we may be in the
4125  * window where another processor saw the
4126  * use_count non-zero and is getting ready
4127  * to set wake_one to 1 and go to sleep.
4128  * If another process is already asleep, the
4129  * one in the window can safely be ignored.
4130  */
4131 while ((mutex->lock != 0) && (mutex->wake_one <= 1)) {
4132 xintr_poll();
4133 }
4134 if (mutex->wake_one)
4135 WAKE_ONE(&mutex->wake_one);
4136 } else {
4137 mutex->use_count--;
4138 }
4139 return;
4140
4141 }
4142 case EXCLUSIVE_ADVICE_MUTEX: {
4143 MP_ASSERT( oldipl == NULLSPL );
4144 MP_ASSERT( mutex->processor == cpuid );
4145 MP_ASSERT( mutex->use_count == 1 );
4146 #ifdef DEBUG
4147 mutex->db_flags = DB_UNLOCKED;
4148 mutex->unlocker = lock_caller();
4149 if (lockdebug == 1)
4150 check_lock_mask(mutex->mpdebug, L_TRY);
4151 #endif
4152 if (*curlock == mutex) {
4153 *(curlock--) = (mutex_t *)NULL;
4154 } else {
4155 unstack_lock(mutex);
4156 }
4157 #ifdef DEBUG
4158 mutex->processor = NULLCPU;
4159 #endif
4160 #ifdef i486
4161 Locked_Zero(&mutex->use_count);
4162 #else
4163 mutex->use_count = 0;
4164 #endif
4165 /*
4166  * If simple lock is held, we may be in the
4167  * window where another processor saw the
4168  * use_count non-zero and is getting ready
4169  * to set wake_one to 1 and go to sleep.
4170  * If another process is already asleep, the
4171  * one in the window can safely be ignored.
4172  */
4173 while ((mutex->lock != 0) && (mutex->wake_one <= 1)) {
4174 xintr_poll();
4175 }
4176 if (mutex->spinners)
4177 return;
4178 if (mutex->wake_one)
4179 WAKE_ONE(&mutex->wake_one);
4180 return;
4181
4182 }
4183 case EXCLUSIVE_ADVICE_RECURSIVE_MUTEX: {
4184 MP_ASSERT( oldipl == NULLSPL );
4185 MP_ASSERT( mutex->processor == cpuid );
4186 MP_ASSERT( mutex->use_count > 0 );
4187 #ifdef DEBUG
```

```
4188 mutex->db_flags = DB_UNLOCKED;
4189 mutex->unlocker = lock_caller();
4190 if (lockdebug == 1)
4191 check_lock_mask(mutex->mpdebug, L_TRY);
4192 #endif
4193 if (mutex->use_count == 1) {
4194 if (*curlock == mutex) {
4195 *(curlock--) = (mutex_t *)NULL;
4196 } else {
4197 unstack_lock(mutex);
4198 }
4199 mutex->processor = NULLCPU;
4200 #ifdef i486
4201 Locked_Zero(&mutex->use_count);
4202 #else
4203 mutex->use_count = 0;
4204 #endif
4205 /*
4206  * If simple lock is held, we may be in the
4207  * window where another processor saw the
4208  * use_count non-zero and is getting ready
4209  * to set wake_one to 1 and go to sleep.
4210  * If another process is already asleep, the
4211  * one in the window can safely be ignored.
4212  */
4213 while ((mutex->lock != 0) && (mutex->wake_one <= 1)) {
4214 xintr_poll();
4215 }
4216 if (mutex->spinners)
4217 return;
4218 if (mutex->wake_one)
4219 WAKE_ONE(&mutex->wake_one);
4220 } else {
4221 mutex->use_count--;
4222 }
4223 return;
4224
4225 }
4226 case SHARED_SPIN_SPL_MUTEX: {
4227 #if defined(DEBUG) || MP_STAT
4228 if (oldipl != NULLSPL)
4229 ((lockinfo_t *)(mutex->mpdebug))->spl_needed++;
4230 #endif
4231 #ifdef DEBUG
4232 if (lockdebug == 1)
4233 check_lock_mask(mutex->mpdebug, L_TRY);
4234 #endif
4235 simple_lock(&mutex->lock);
4236 if(mutex->flags == L_EXCL) {
4237 MP_ASSERT( mutex->processor == cpuid );
4238 MP_ASSERT( mutex->use_count == 1 );
4239 #ifdef DEBUG
4240 mutex->db_flags = DB_UNLOCKED;
4241 mutex->unlocker = lock_caller();
4242 #endif
4243 if (*curlock == mutex) {
4244 *(curlock--) = (mutex_t *)NULL;
4245 } else {
4246 unstack_lock(mutex);
4247 }
4248 #ifdef DEBUG
4249 mutex->processor = NULLCPU;
4250 #endif
4251 mutex->use_count = 0;
4252 mutex->flags = L_SHARED;
4253 simple_unlock(&mutex->lock);
4254 } else {
```

```
4255 MP_ASSERT( mutex->flags & L_SHARED );
4256 MP_ASSERT( mutex->use_count > 0 );
4257 #ifdef DEBUG
4258 mutex->db_flags = DB_UNLOCKED;
4259 mutex->unlocker = lock_caller();
4260 #endif
4261 if (*curlock == mutex) {
4262 *(curlock--) = (mutex_t *)NULL;
4263 } else {
4264 unstack_lock(mutex);
4265 }
4266 mutex->use_count--;
4267 simple_unlock(&mutex->lock);
4268 }
4269 break;
4270
4271 }
4272 case SHARED_ADVICE_SPL_MUTEX: {
4273 #if defined(DEBUG) || MP_STAT
4274 if (oldipl != NULLSPL)
4275 ((lockinfo_t *)(mutex->mpdebug))->spl_needed++;
4276 #endif
4277 #ifdef DEBUG
4278 if (lockdebug == 1)
4279 check_lock_mask(mutex->mpdebug, L_TRY);
4280 #endif
4281 simple_lock(&mutex->lock);
4282 if(mutex->flags == L_EXCL) {
4283 MP_ASSERT( mutex->processor == cpuid );
4284 MP_ASSERT( mutex->use_count == 1 );
4285 #ifdef DEBUG
4286 mutex->db_flags = DB_UNLOCKED;
4287 mutex->unlocker = lock_caller();
4288 #endif
4289 if (*curlock == mutex) {
4290 *(curlock--) = (mutex_t *)NULL;
4291 } else {
4292 unstack_lock(mutex);
4293 }
4294 #ifdef DEBUG
4295 mutex->processor = NULLCPU;
4296 #endif
4297 mutex->use_count = 0;
4298 mutex->flags = L_SHARED;
4299 if (mutex->spinners) {
4300 simple_unlock(&mutex->lock);
4301 break;
4302 }
4303 simple_unlock(&mutex->lock);
4304 if (mutex->wake_one)
4305 WAKE_ONE(&mutex->wake_one);
4306 else if (mutex->wake_all)
4307 WAKE_ALL(&mutex->wake_all);
4308 } else {
4309 MP_ASSERT( mutex->flags & L_SHARED );
4310 MP_ASSERT( mutex->use_count > 0 );
4311 #ifdef DEBUG
4312 mutex->db_flags = DB_UNLOCKED;
4313 mutex->unlocker = lock_caller();
4314 #endif
4315 if (*curlock == mutex) {
4316 *(curlock--) = (mutex_t *)NULL;
4317 } else {
4318 unstack_lock(mutex);
4319 }
4320 if (mutex->use_count == 1) {
```

```
4321 MP_ASSERT( !(mutex->flags & L_CHG) );
4322 mutex->use_count = 0;
4323 if (mutex->spinners) {
4324 MP_ASSERT( mutex->flags & L_EXCL );
4325 if (mutex->wake_one == 0) {
4326 simple_unlock(&mutex->lock);
4327 break;
4328 }
4329 }
4330 simple_unlock(&mutex->lock);
4331 if (mutex->wake_one)
4332 WAKE_ONE(&mutex->wake_one);
4333 else if (mutex->wake_all)
4334 WAKE_ALL(&mutex->wake_all);
4335 break;
4336 }
4337 mutex->use_count--;
4338 simple_unlock(&mutex->lock);
4339 }
4340 break;
4341
4342 }
4343 case SHARED_SPIN_MUTEX: {
4344 MP_ASSERT( oldipl == NULLSPL );
4345 #ifdef DEBUG
4346 if (lockdebug == 1)
4347 check_lock_mask(mutex->mpdebug, L_TRY);
4348 #endif
4349 simple_lock(&mutex->lock);
4350 if(mutex->flags == L_EXCL) {
4351 MP_ASSERT( mutex->processor == cpuid );
4352 MP_ASSERT( mutex->use_count == 1 );
4353 #ifdef DEBUG
4354 mutex->db_flags = DB_UNLOCKED;
4355 mutex->unlocker = lock_caller();
4356 #endif
4357 if (*curlock == mutex) {
4358 *(curlock--) = (mutex_t *)NULL;
4359 } else {
4360 unstack_lock(mutex);
4361 }
4362 #ifdef DEBUG
4363 mutex->processor = NULLCPU;
4364 #endif
4365 mutex->use_count = 0;
4366 mutex->flags = L_SHARED;
4367 simple_unlock(&mutex->lock);
4368 } else {
4369 MP_ASSERT( mutex->flags & L_SHARED );
4370 MP_ASSERT( mutex->use_count > 0 );
4371 #ifdef DEBUG
4372 mutex->db_flags = DB_UNLOCKED;
4373 mutex->unlocker = lock_caller();
4374 #endif
4375 if (*curlock == mutex) {
4376 *(curlock--) = (mutex_t *)NULL;
4377 } else {
4378 unstack_lock(mutex);
4379 }
4380 mutex->use_count--;
4381 simple_unlock(&mutex->lock);
4382 }
4383 return;
4384
4385 }
4386 case SHARED_SLEEP_MUTEX: {
```

```
4387 MP_ASSERT( oldipl == NULLSPL );
4388 #ifdef DEBUG
4389 if (lockdebug == 1)
4390 check_lock_mask(mutex->mpdebug, L_TRY);
4391 #endif
4392 simple_lock(&mutex->lock);
4393 if(mutex->flags == L_EXCL) {
4394 MP_ASSERT( mutex->processor == cpuid );
4395 MP_ASSERT( mutex->use_count == 1 );
4396 #ifdef DEBUG
4397 mutex->db_flags = DB_UNLOCKED;
4398 mutex->unlocker = lock_caller();
4399 #endif
4400 if (*curlock == mutex) {
4401 *(curlock--) = (mutex_t *)NULL;
4402 } else {
4403 unstack_lock(mutex);
4404 }
4405 #ifdef DEBUG
4406 mutex->processor = NULLCPU;
4407 #endif
4408 mutex->use_count = 0;
4409 mutex->flags = L_SHARED;
4410 simple_unlock(&mutex->lock);
4411 if (mutex->wake_one)
4412 WAKE_ONE(&mutex->wake_one);
4413 else if (mutex->wake_all)
4414 WAKE_ALL(&mutex->wake_all);
4415 } else {
4416 MP_ASSERT( mutex->flags & L_SHARED );
4417 MP_ASSERT( mutex->use_count > 0 );
4418 #ifdef DEBUG
4419 mutex->db_flags = DB_UNLOCKED;
4420 mutex->unlocker = lock_caller();
4421 #endif
4422 if (*curlock == mutex) {
4423 *(curlock--) = (mutex_t *)NULL;
4424 } else {
4425 unstack_lock(mutex);
4426 }
4427 if (mutex->use_count == 1) {
4428 MP_ASSERT( !(mutex->flags & L_CHG) );
4429 mutex->use_count = 0;
4430 simple_unlock(&mutex->lock);
4431 if (mutex->wake_one)
4432 WAKE_ONE(&mutex->wake_one);
4433 else if (mutex->wake_all)
4434 WAKE_ALL(&mutex->wake_all);
4435 return;
4436 }
4437 mutex->use_count--;
4438 simple_unlock(&mutex->lock);
4439 }
4440 return;
4441
4442 }
4443 case SHARED_ADVICE_MUTEX: {
4444 MP_ASSERT( oldipl == NULLSPL );
4445 #ifdef DEBUG
4446 if (lockdebug == 1)
4447 check_lock_mask(mutex->mpdebug, L_TRY);
4448 #endif
4449 simple_lock(&mutex->lock);
4450 if(mutex->flags == L_EXCL) {
4451 MP_ASSERT( mutex->processor == cpuid );
4452 MP_ASSERT( mutex->use_count == 1 );
4453 #ifdef DEBUG
```

```
4454 mutex->db_flags = DB_UNLOCKED;
4455 mutex->unlocker = lock_caller();
4456 #endif
4457 if (*curlock == mutex) {
4458 *(curlock--) = (mutex_t *)NULL;
4459 } else {
4460 unstack_lock(mutex);
4461 }
4462 #ifdef DEBUG
4463 mutex->processor = NULLCPU;
4464 #endif
4465 mutex->use_count = 0;
4466 mutex->flags = L_SHARED;
4467 if (mutex->spinners) {
4468 simple_unlock(&mutex->lock);
4469 return;
4470 }
4471 simple_unlock(&mutex->lock);
4472 if (mutex->wake_one)
4473 WAKE_ONE(&mutex->wake_one);
4474 else if (mutex->wake_all)
4475 WAKE_ALL(&mutex->wake_all);
4476 } else {
4477 MP_ASSERT( mutex->flags & L_SHARED );
4478 MP_ASSERT( mutex->use_count > 0 );
4479 #ifdef DEBUG
4480 mutex->db_flags = DB_UNLOCKED;
4481 mutex->unlocker = lock_caller();
4482 #endif
4483 if (*curlock == mutex) {
4484 *(curlock--) = (mutex_t *)NULL;
4485 } else {
4486 unstack_lock(mutex);
4487 }
4488 if (mutex->use_count == 1) {
4489 MP_ASSERT( !(mutex->flags & L_CHG) );
4490 mutex->use_count = 0;
4491 if (mutex->spinners) {
4492 MP_ASSERT( mutex->flags & L_EXCL );
4493 if (mutex->wake_one == 0) {
4494 simple_unlock(&mutex->lock);
4495 return;
4496 }
4497 }
4498 simple_unlock(&mutex->lock);
4499 if (mutex->wake_one)
4500 WAKE_ONE(&mutex->wake_one);
4501 else if (mutex->wake_all)
4502 WAKE_ALL(&mutex->wake_all);
4503 return;
4504 }
4505 mutex->use_count--;
4506 simple_unlock(&mutex->lock);
4507 }
4508 return;
4509
4510 }
4511 case UNINITIALIZED_MUTEX: {
4512 cmn_err(CE_WARN,
4513 "mutex_unlock: (0x%x) uninitialized lock\n",
4514 mutex);
4515 return;
4516 }
4517 case EXCLUSIVE_SLEEP_SPL_RECURSIVE_MUTEX:
4518 case EXCLUSIVE_SLEEP_SPL_MUTEX:
4519 case SHARED_SLEEP_SPL_MUTEX:
```

```
4520 default: {
4521 cmn_err(CE_PANIC,
4522 "mutex_unlock: (0x%x) unknown lock\n",
4523 mutex);
4524 return;
4525 }
4526 } /* end switch(mutex->type) */
4527
4528 if (oldipl != NULLSPL)
4529 splx(oldipl);
4530 return;
4531 }
4532
4533 #endif /* !TRIVIAL_LOCKS */
4534
4535 #ifdef ASM_LOCKS
4536
4537 int shared_count,excl_count,shared_chg_count,excl_chg_count;
4538 poll_advise(mutex)
4539 register mutex_t *mutex;
4540 {
4541 while ((mutex->lock != 0) && (mutex->wake_one <= 1)) {
4542 xintr_poll();
4543 }
4544 if (mutex->spinners)
4545 return;
4546 if (mutex->wake_one) {
4547 WAKE_ONE(&mutex->wake_one);
4548 }
4549 }
4550 poll_sleep(mutex)
4551 register mutex_t *mutex;
4552 {
4553 while ((mutex->lock != 0) && (mutex->wake_one <= 1)) {
4554 xintr_poll();
4555 }
4556 if (mutex->wake_one) {
4557 WAKE_ONE(&mutex->wake_one);
4558 }
4559 }
4560
4561 #else /* ASM_LOCKS */
4562
4563 #if !TRIVIAL_LOCKS
4564 int
4565 mutex_trylock_01(mutex)
4566 register mutex_t *mutex;
4567 {
4568 simple_lock(&mutex->lock);
4569 if (mutex->use_count == 0) {
4570 mutex->use_count = 1;
4571 simple_unlock(&mutex->lock);
4572 *(++curlock) = mutex;
4573 #if MP_STAT
4574 ((lockinfo_t *)(mutex->mpdebug))->try_hits++;
4575 #endif
4576 return (0);
4577 } else {
4578 simple_unlock(&mutex->lock);
4579 #if MP_STAT
4580 ((lockinfo_t *)(mutex->mpdebug))->try_misses++;
4581 #endif
4582 return (L_FAIL);
4583 }
4584 }
4585
```

```
4586 void
4587 mutex_unlock_01(mutex)
4588 register mutex_t *mutex;
4589 {
4590 if (*curlock == mutex) {
4591 *(curlock--) = (mutex_t *)NULL;
4592 } else {
4593 unstack_lock(mutex);
4594 }
4595 mutex->use_count = 0;
4596 return;
4597 }
4598
4599 int
4600 mutex_trylock_05(mutex)
4601 register mutex_t *mutex;
4602 {
4603 disable_interrupts();
4604 simple_lock(&mutex->lock);
4605 if (mutex->use_count == 0) {
4606 mutex->use_count = 1;
4607 simple_unlock(&mutex->lock);
4608 *(++curlock) = mutex;
4609 #if MP_STAT
4610 ((lockinfo_t *)(mutex->mpdebug))->try_hits++;
4611 #endif
4612 return (0);
4613 } else {
4614 simple_unlock(&mutex->lock);
4615 enable_interrupts();
4616 #if MP_STAT
4617 ((lockinfo_t *)(mutex->mpdebug))->try_misses++;
4618 #endif
4619 return (L_FAIL);
4620 }
4621 }
4622
4623 void
4624 mutex_unlock_05(mutex, oldipl)
4625 register mutex_t *mutex;
4626 int oldipl;
4627 {
4628 if (*curlock == mutex) {
4629 *(curlock--) = (mutex_t *)NULL;
4630 } else {
4631 unstack_lock(mutex);
4632 }
4633 mutex->use_count = 0;
4634 ipl = oldipl;
4635 enable_interrupts();
4636 return;
4637 }
4638
4639 int
4640 mutex_trylock_09(mutex)
4641 register mutex_t *mutex;
4642 {
4643 if (mutex->processor == cpuid) {
4644 mutex->use_count++;
4645 #if MP_STAT
4646 ((lockinfo_t *)(mutex->mpdebug))->recursed++;
4647 #endif
4648 return (0);
4649 }
4650 simple_lock(&mutex->lock);
4651 if (mutex->use_count == 0) {
```

```
4652 mutex->processor = cpuid;
4653 mutex->use_count = 1;
4654 simple_unlock(&mutex->lock);
4655 *(++curlock) = mutex;
4656 #if MP_STAT
4657 ((lockinfo_t *)(mutex->mpdebug))->try_hits++;
4658 #endif
4659 return (0);
4660 } else {
4661 simple_unlock(&mutex->lock);
4662 #if MP_STAT
4663 ((lockinfo_t *)(mutex->mpdebug))->try_misses++;
4664 #endif
4665 return (L_FAIL);
4666 }
4667 }
4668
4669 void
4670 mutex_unlock_09(mutex)
4671 register mutex_t *mutex;
4672 {
4673 if (mutex->use_count > 1) {
4674 mutex->use_count--;
4675 return;
4676 }
4677 if (*curlock == mutex) {
4678 *(curlock--) = (mutex_t *)NULL;
4679 } else {
4680 unstack_lock(mutex);
4681 }
4682 mutex->processor = NULLCPU;
4683 mutex->use_count = 0;
4684 return;
4685 }
4686
4687 int
4688 mutex_trylock_0A(mutex)
4689 register mutex_t *mutex;
4690 {
4691 if (mutex->processor == cpuid) {
4692 mutex->use_count++;
4693 #if MP_STAT
4694 ((lockinfo_t *)(mutex->mpdebug))->recursed++;
4695 #endif
4696 return (0);
4697 }
4698 simple_lock(&mutex->lock);
4699 if (mutex->use_count == 0) {
4700 mutex->processor = cpuid;
4701 mutex->use_count = 1;
4702 simple_unlock(&mutex->lock);
4703 *(++curlock) = mutex;
4704 #if MP_STAT
4705 ((lockinfo_t *)(mutex->mpdebug))->try_hits++;
4706 #endif
4707 return (0);
4708 } else {
4709 simple_unlock(&mutex->lock);
4710 #if MP_STAT
4711 ((lockinfo_t *)(mutex->mpdebug))->try_misses++;
4712 #endif
4713 return (L_FAIL);
4714 }
4715 }
4716
4717 void
```

```
4718 mutex_unlock_0A(mutex)
4719 register mutex_t *mutex;
4720 {
4721 if (mutex->use_count > 1) {
4722 mutex->use_count--;
4723 return;
4724 }
4725 if (*curlock == mutex) {
4726 *(curlock--) = (mutex_t *)NULL;
4727 } else {
4728 unstack_lock(mutex);
4729 }
4730 mutex->processor = NULLCPU;
4731 #ifdef i486
4732 Locked_Zero(&mutex->use_count);
4733 #else
4734 mutex->use_count = 0;
4735 #endif
4736 if ((mutex->lock == 0) && (mutex->wake_one == 0)) {
4737 return;
4738 }
4739 while ((mutex->lock != 0) && (mutex->wake_one <= 1)) {
4740 xintr_poll();
4741 }
4742 if (mutex->wake_one) {
4743 WAKE_ONE(&mutex->wake_one);
4744 }
4745 return;
4746 }
4747
4748 int
4749 mutex_trylock_e11(mutex)
4750 register mutex_t *mutex;
4751 {
4752 simple_lock(&mutex->lock);
4753 if (mutex->use_count == 0) {
4754 mutex->use_count = 1;
4755 mutex->flags = L_EXCL;
4756 simple_unlock(&mutex->lock);
4757 *(++curlock) = mutex;
4758 #if DEBUG
4759 mutex->processor = cpuid;
4760 #endif
4761 #if MP_STAT
4762 ((lockinfo_t *)(mutex->mpdebug))->try_hits++;
4763 #endif
4764 return (0);
4765 } else {
4766 simple_unlock(&mutex->lock);
4767 #if MP_STAT
4768 ((lockinfo_t *)(mutex->mpdebug))->try_misses++;
4769 #endif
4770 return (L_FAIL);
4771 }
4772 }
4773
4774 int
4775 mutex_trylock_s11(mutex)
4776 register mutex_t *mutex;
4777 {
4778 simple_lock(&mutex->lock);
4779 if ( (mutex->flags == L_SHARED) ||
4780      mutex_is_mine(mutex, L_SHARED) ) {
4781 mutex->use_count++;
4782 simple_unlock(&mutex->lock);
4783 *(++curlock) = mutex;
```

```
4784 #if MP_STAT
4785 ((lockinfo_t *)(mutex->mpdebug))->try_hits++;
4786 #endif
4787 return (0);
4788 } else {
4789 simple_unlock(&mutex->lock);
4790 #if MP_STAT
4791 ((lockinfo_t *)(mutex->mpdebug))->try_misses++;
4792 #endif
4793 return (L_FAIL);
4794 }
4795 }
4796
4797 void
4798 mutex_unlock_11(mutex)
4799 register mutex_t *mutex;
4800 {
4801 if (*curlock == mutex) {
4802 *(curlock--) = (mutex_t *)NULL;
4803 } else {
4804 unstack_lock(mutex);
4805 }
4806 simple_lock(&mutex->lock);
4807 if(mutex->flags == L_EXCL) {
4808 mutex->use_count = 0;
4809 mutex->flags = L_SHARED;
4810 simple_unlock(&mutex->lock);
4811 } else {
4812 mutex->use_count--;
4813 simple_unlock(&mutex->lock);
4814 }
4815 }
4816
4817 #endif /* !TRIVIAL_LOCKS */
4818 #endif /* ASM_LOCKS */
4819
4820 void
4821 mutex_release(mutex)
4822 mutex_t *mutex;
4823 {
4824 u.u_mutex = (unsigned long *)mutex;
4825 }
4826
4827 int
4828 mutex_is_mine(mutex, flags)
4829 register mutex_t *mutex;
4830 int flags;
4831 {
4832 register mutex_t **curlck;
4833
4834 #ifdef DEBUG
4835 check_lock_address(mutex);
4836 check_curlock_stack();
4837 #endif
4838 if (mutex->use_count == 0)
4839 return (0);
4840
4841 for (curlck = curlock; curlck >= curlock_table; curlck--) {
4842 if (*curlck == mutex) {
4843 if ((mutex->type & LOCK_TYPE_SHARED) == 0)
4844 return (1);
4845 if (flags == 0)
4846 return (1);
4847 if (flags & L_SHARED)
4848 return (mutex->flags & L_SHARED);
4849 if (flags & L_EXCL)
4850 return (mutex->flags == L_EXCL);
```

```
4851 cmn_err(CE_WARN, "mutex_is_mine: unknown flags.\n");
4852 return (1);
4853 }
4854 }
4855 return (0);
4856 }
4857
4858 int
4859 mutex_is_locked(mutex, flags)
4860 register mutex_t *mutex;
4861 int flags;
4862 {
4863 #ifdef DEBUG
4864 check_lock_address(mutex);
4865 #endif
4866 if (mutex->use_count == 0)
4867 return (0);
4868 if ((mutex->type & LOCK_TYPE_SHARED) == 0)
4869 return (1);
4870 if (flags == 0)
4871 return (1);
4872 if (flags & L_SHARED)
4873 return (mutex->flags & L_SHARED);
4874 if (flags & L_EXCL)
4875 return (mutex->flags == L_EXCL);
4876 cmn_err(CE_WARN, "mutex_is_locked: unknown flags.\n");
4877 return (1);
4878 }
4879
4880 simple_wait(lp)
4881 simple_lock_t *lp;
4882 {
4883 #ifdef DEBUG
4884 register unsigned long spins = 1;
4885 #endif
4886 while ( (*lp) || Xchg(lp) ) {
4887 xintr_poll();
4888 #ifdef DEBUG
4889 if (++spins >= simple_spins) {
4890 calldebug();
4891 spins = 0;
4892 }
4893 #endif
4894 }
4895 }
4896
4897 #ifdef DEBUG
4898
4899 lockinfo_t simple_lockinfo;
4900
4901 void
4902 _simple_lock_init(lp, info)
4903 mutex_t *lp;
4904 lockinfo_t *info;
4905 {
4906 if (info != NULL) {
4907 mutex_init(lp, L_EXCL | L_SPIN | L_NOSPL, info);
4908 info->is_simple = 1;
4909 } else{
4910 mutex_init(lp, L_EXCL | L_SPIN | L_NOSPL, &simple_lockinfo);
4911 simple_lockinfo.is_simple = 1;
4912 }
4913 }
4914
4915 void
4916 _simple_lock(lp)
```

```
4917 mutex_t *lp;
4918 {
4919 mutex_lock(lp, L_SPIN, splnull);
4920 }
4921
4922 int
4923 _simple_try_lock(lp)
4924 mutex_t *lp;
4925 {
4926 if (mutex_is_mine(lp, L_EXCL)) /* Avoid recursion test in mutex_
     lock */
4927 return(L_FAIL);
4928 else if (mutex_lock(lp, L_SPIN | L_TRY, splnull) == L_FAIL)
4929 return (L_FAIL);
4930 else
4931 return (0);
4932 }
4933
4934 void
4935 _simple_unlock(lp)
4936 mutex_t *lp;
4937 {
4938 mutex_unlock(lp, NULLSPL);
4939 }
4940
4941 void
4942 _simple_release(lp)
4943 mutex_t *lp;
4944 {
4945 u.u_mutex = (unsigned long *)lp;
4946 }
4947
4948 int
4949 _simple_is_locked(lp)
4950 mutex_t *lp;
4951 {
4952 return (mutex_is_locked(lp, L_EXCL));
4953 }
4954
4955 #else /* DEBUG */
4956 #if MP_STAT
4957
4958 lockinfo_t simple_lockinfo;
4959 typedef struct _simple_lck _simple_lock_t;
4960
4961 void
4962 _simple_lock_init(lp, info)
4963 _simple_lock_t *lp;
4964 lockinfo_t *info;
4965 {
4966 if (info != NULL) {
4967 lp->lock = 0;
4968 lp->mpdebug = (unsigned long)info;
4969 attach_lockinfo(0, info);
4970 info->is_simple = 1;
4971 info->type = EXCLUSIVE_SPIN_MUTEX;
4972 } else{
4973 lp->lock = 0;
4974 lp->mpdebug = (unsigned long)&simple_lockinfo;
4975 attach_lockinfo(0, &simple_lockinfo);
4976 simple_lockinfo.is_simple = 1;
4977 simple_lockinfo.type = EXCLUSIVE_SPIN_MUTEX;
4978 }
4979 }
4980
4981 _simple_wait(lp)
```

```
4982 register _simple_lock_t *lp;
4983 {
4984 register unsigned long spins = 1;
4985
4986 ((lockinfo_t *)(lp->mpdebug))->get_misses++;
4987 while ( (lp->lock) || Xchg(&lp->lock) ) {
4988 xintr_poll();
4989 if (++spins >= simple_spins) {
4990 calldebug();
4991 spins = 0;
4992 }
4993 }
4994 get_spins(lp->mpdebug, spins);
4995 }
4996
4997 void
4998 _simple_lock(lp)
4999 register _simple_lock_t *lp;
5000 {
5001 if (Xchg(&lp->lock))
5002 _simple_wait(&lp->lock);
5003 ((lockinfo_t *)(lp->mpdebug))->get_hits++;
5004 }
5005
5006 int
5007 _simple_try_lock(lp)
5008 register _simple_lock_t *lp;
5009 {
5010 if (Xchg(&lp->lock)) {
5011 ((lockinfo_t *)(lp->mpdebug))->try_misses++;
5012 return (L_FAIL);
5013 } else {
5014 ((lockinfo_t *)(lp->mpdebug))->try_hits++;
5015 return (0);
5016 }
5017 }
5018
5019 void
5020 _simple_unlock(lp)
5021 _simple_lock_t *lp;
5022 {
5023 simple_unlock(&lp->lock);
5024 }
5025
5026 void
5027 _simple_release(lp)
5028 _simple_lock_t *lp;
5029 {
5030 simple_release(&lp->lock);
5031 ((lockinfo_t *)(lp->mpdebug))->released++;
5032 }
5033
5034 int
5035 _simple_is_locked(lp)
5036 _simple_lock_t *lp;
5037 {
5038 return (simple_is_locked(&lp->lock));
5039 }
5040
5041 #endif /* MPSTAT */
5042 #endif /* DEBUG */
5043
5044 #if !TRIVIAL_LOCKS
5045
5046 int
5047 resource_init(resrc, flags, lockinfo)
```

```
5048 resource_t *resrc;
5049 int flags;
5050 lockinfo_t *lockinfo;
5051 {
5052 #ifdef DEBUG
5053 check_lock_address(resrc);
5054 resrc->flags = 0;
5055 resrc->wake_one = 0x00dead00;
5056 resrc->wake_all = 0x00dead00;
5057 resrc->aux_long = 0x00dead00;
5058 resrc->process = (struct proc *)0x00dead00;
5059 if (lockdebug == 1) {
5060 lock_log(LOG_RESRC_INIT, resrc, flags, lockinfo,
5061  0, prior_caller(1), prior_caller(2), cpuid);
5062 }
5063 #endif /* DEBUG */
5064
5065 simple_lock_init(&resrc->lock, 0);
5066 resrc->use_count = 0;
5067
5068 switch (flags & (L_EXCL | L_SHARED | L_SPIN | L_SLEEP | L_RECURS
     IVE)) {
5069 case (L_EXCL):
5070 case (L_EXCL | L_SLEEP): {
5071 resrc->type = EXCLUSIVE_SLEEP_RESOURCE;
5072 resrc->wake_one = 0;
5073 break;
5074 }
5075 case (L_EXCL | L_RECURSIVE):
5076 case (L_EXCL | L_SLEEP | L_RECURSIVE): {
5077 resrc->type = EXCLUSIVE_SLEEP_RECURSIVE_RESOURCE;
5078 resrc->process = (struct proc *)NULL;
5079 resrc->wake_one = 0;
5080 break;
5081 }
5082 case (L_SHARED):
5083 case (L_SHARED | L_SLEEP): {
5084 resrc->type = SHARED_SLEEP_RESOURCE;
5085 resrc->flags = L_SHARED;
5086 resrc->wake_one = 0;
5087 resrc->wake_all = 0;
5088 break;
5089 }
5090 default: {
5091 cmn_err(CE_WARN,
5092 "resource_init: (0x%x) unsupported flags\n",
5093 resrc);
5094 resrc->type = EXCLUSIVE_SLEEP_RECURSIVE_RESOURCE;
5095 break;
5096 }
5097 } /* end switch(flags & ()) */
5098 #if defined(DEBUG) || MP_STAT
5099 attach_lockinfo(resrc, lockinfo);
5100 #endif
5101 }
5102
5103 int
5104 resource_lock(resrc, flags)
5105 register resource_t *resrc;
5106 int flags;
5107 {
5108 #ifdef DEBUG
5109 register lockinfo_t *info;
5110
5111 check_lock_address(resrc);
5112 if (resrc->type == UNINITIALIZED_MUTEX) {
```

```
5113 cmn_err(CE_WARN,
5114 "resource_lock_db: (0x%x) uninitialized lock\n",
5115 resrc);
5116 }
5117 locks_by_type[resrc->type]++;
5118 info = (lockinfo_t *)(resrc->mpdebug);
5119 check_lock_address(info);
5120 if (lockdebug == 1) {
5121 lock_log(LOG_RESRC_LOCK, resrc, flags, resrc->mpdebug,
5122  0, prior_caller(1), prior_caller(2), cpuid);
5123 }
5124 #else /* DEBUG */
5125 #if MP_STAT
5126 register lockinfo_t *info;
5127
5128 info = (lockinfo_t *)(resrc->mpdebug);
5129 #endif
5130 #endif /* DEBUG */
5131
5132 switch (resrc->type) {
5133 case EXCLUSIVE_SLEEP_RESOURCE: {
5134 simple_lock(&resrc->lock);
5135 for (;;) {
5136 if (resrc->use_count == 0) {
5137 #ifdef DEBUG
5138 resrc->process = curproc;
5139 #endif
5140 resrc->use_count = 1;
5141 simple_unlock(&resrc->lock);
5142 #if MP_STAT
5143 if (flags & L_TRY)
5144 info->try_hits++;
5145 else
5146 info->get_hits++;
5147 #endif
5148 #ifdef DEBUG
5149 info->try_max = resource_spins;
5150 resrc->db_flags = DB_LOCKED;
5151 resrc->locker = lock_caller();
5152 #endif
5153 return (0);
5154 }
5155 if (flags & L_TRY) {
5156 #if MP_STAT
5157 info->try_misses++;
5158 #endif
5159 #ifdef DEBUG
5160 if (--info->try_max == 0) {
5161 calldebug();
5162 info->try_max = resource_spins;
5163 }
5164 #endif
5165 simple_unlock(&resrc->lock);
5166 return (L_FAIL);
5167 }
5168 #if MP_STAT
5169 info->get_misses++;
5170 #endif
5171 resrc->wake_one++;
5172 simple_release(&resrc->lock);
5173
5174 if (flags & L_PCATCH) {
5175 if(SLEEP(&resrc->wake_one, PCATCH | PZERO+2)) {
5176 return(L_INTR);
5177 }
5178 } else {
```

```
5179 SLEEP(&resrc->wake_one, PZERO);
5180 }
5181 #if MP_STAT
5182 info->get_sleeps++;
5183 #endif
5184 simple_lock(&resrc->lock);
5185 resrc->wake_one--;
5186 }
5187 }
5188 case EXCLUSIVE_SLEEP_RECURSIVE_RESOURCE: {
5189 if (resrc->process == curproc) {
5190 resrc->use_count++;
5191 #ifdef DEBUG
5192 if (lockdebug == 1)
5193 log_recursion(resrc);
5194 #endif
5195 return (0);
5196 }
5197 simple_lock(&resrc->lock);
5198 for (;;) {
5199 if (resrc->use_count == 0) {
5200 resrc->process = curproc;
5201 resrc->use_count = 1;
5202 simple_unlock(&resrc->lock);
5203 #if MP_STAT
5204 if (flags & L_TRY)
5205 info->try_hits++;
5206 else
5207 info->get_hits++;
5208 #endif
5209 #ifdef DEBUG
5210 info->try_max = resource_spins;
5211 resrc->db_flags = DB_LOCKED;
5212 resrc->locker = lock_caller();
5213 #endif
5214 return (0);
5215 }
5216 if (flags & L_TRY) {
5217 #if MP_STAT
5218 info->try_misses++;
5219 #endif
5220 #ifdef DEBUG
5221 if (--info->try_max == 0) {
5222 calldebug();
5223 info->try_max = resource_spins;
5224 }
5225 #endif
5226 simple_unlock(&resrc->lock);
5227 return (L_FAIL);
5228 }
5229 #if MP_STAT
5230 info->get_misses++;
5231 #endif
5232 resrc->wake_one++;
5233 simple_release(&resrc->lock);
5234
5235 if (flags & L_PCATCH) {
5236 if(SLEEP(&resrc->wake_one, PCATCH | PZERO+2)) {
5237 return(L_INTR);
5238 }
5239 } else {
5240 SLEEP(&resrc->wake_one, PZERO);
5241 }
5242 #if MP_STAT
5243 info->get_sleeps++;
5244 #endif
```

```
5245 simple_lock(&resrc->lock);
5246 resrc->wake_one--;
5247 }
5248 }
5249 case SHARED_SLEEP_RESOURCE: {
5250 MP_ASSERT( !(flags & L_PCATCH) );
5251 switch(flags & (L_SHARED | L_EXCL | L_CHG)) {
5252 case (L_SHARED): {
5253 for (;;) {
5254 simple_lock(&resrc->lock);
5255 if (resrc->flags == L_SHARED) {
5256 #ifdef DEBUG
5257 resrc->process = curproc;
5258 #endif
5259 resrc->use_count++;
5260 simple_unlock(&resrc->lock);
5261 #if MP_STAT
5262 if (flags & L_TRY)
5263 info->try_hits++;
5264 else
5265 info->get_hits++;
5266 #endif
5267 #ifdef DEBUG
5268 info->try_max = resource_spins;
5269 resrc->db_flags = DB_LOCKED;
5270 resrc->locker = lock_caller();
5271 #endif
5272 return (0);
5273 }
5274 if (flags & L_TRY) {
5275 #if MP_STAT
5276 info->try_misses++;
5277 #endif
5278 #ifdef DEBUG
5279 if (--info->try_max == 0) {
5280 calldebug();
5281 info->try_max = resource_spins;
5282 }
5283 #endif
5284 simple_unlock(&resrc->lock);
5285 return (L_FAIL);
5286 }
5287 #if MP_STAT
5288 info->get_misses++;
5289 #endif
5290 resrc->wake_all++;
5291 simple_release(&resrc->lock);
5292
5293 SLEEP(&resrc->wake_all, PZERO);
5294 #if MP_STAT
5295 info->get_sleeps++;
5296 #endif
5297 simple_lock(&resrc->lock);
5298 resrc->wake_all--;
5299 }
5300 }
5301 case (L_EXCL): {
5302 for (;;) {
5303 simple_lock(&resrc->lock);
5304 if (resrc->use_count == 0) {
5305 #ifdef DEBUG
5306 resrc->process = curproc;
5307 #endif
5308 resrc->use_count = 1;
5309 resrc->flags = L_EXCL;
5310 simple_unlock(&resrc->lock);
```

```
5311 #if MP_STAT
5312 if (flags & L_TRY)
5313 info->try_hits++;
5314 else
5315 info->get_hits++;
5316 #endif
5317 #ifdef DEBUG
5318 info->try_max = resource_spins;
5319 resrc->db_flags = DB_LOCKED;
5320 resrc->locker = lock_caller();
5321 #endif
5322 return (0);
5323 }
5324 if (flags & L_TRY) {
5325 #if MP_STAT
5326 info->try_misses++;
5327 #endif
5328 #ifdef DEBUG
5329 if (--info->try_max == 0) {
5330 calldebug();
5331 info->try_max = resource_spins;
5332 }
5333 #endif
5334 simple_unlock(&resrc->lock);
5335 return (L_FAIL);
5336 }
5337 resrc->flags |= L_EXCL;
5338 #if MP_STAT
5339 info->get_misses++;
5340 #endif
5341 resrc->wake_one++;
5342 simple_release(&resrc->lock);
5343
5344 SLEEP(&resrc->wake_one, PZERO);
5345 #if MP_STAT
5346 info->get_sleeps++;
5347 #endif
5348 simple_lock(&resrc->lock);
5349 resrc->wake_one--;
5350 }
5351 }
5352 case (L_SHARED | L_CHG): {
5353 MP_ASSERT( resrc->flags == L_EXCL );
5354 MP_ASSERT( resrc->use_count == 1 );
5355 resrc->flags = L_SHARED;
5356 #ifdef DEBUG
5357 resrc->db_flags = DB_DOWNGRADED;
5358 resrc->locker = lock_caller();
5359 #endif
5360 if (resrc->wake_all && !resrc->wake_one)
5361 WAKE_ALL(&resrc->wake_all);
5362 #if MP_STAT
5363 info->chg_down++;
5364 #endif
5365 return (0);
5366 }
5367 case (L_EXCL | L_CHG): {
5368 MP_ASSERT( resrc->flags & L_SHARED );
5369 MP_ASSERT( resrc->use_count > 0 );
5370 simple_lock(&resrc->lock);
5371 if (resrc->use_count == 1) {
5372 resrc->flags = L_EXCL;
5373 #if MP_STAT
5374 info->chg_hits++;
5375 #endif
5376 #ifdef DEBUG
```

```
5377    resrc->db_flags = DB_UPGRADED;
5378    resrc->locker = lock_caller();
5379 #endif
5380    simple_unlock(&resrc->lock);
5381    return (0);
5382 }
5383 if (flags & L_TRY) {
5384 #if MP_STAT
5385    info->chg_misses++;
5386 #endif
5387    simple_unlock(&resrc->lock);
5388    return (L_FAIL);
5389 }
5390 if (resrc->flags & L_CHG) {
5391 #if MP_STAT
5392    info->chg_fails++;
5393 #endif
5394    simple_unlock(&resrc->lock);
5395    return (L_FAIL);
5396 }
5397 resrc->flags |= L_CHG;
5398 for (;;) {
5399    resrc->wake_one++;
5400    simple_release(&resrc->lock);
5401    SLEEP(&resrc->wake_one, PZERO-1);
5402    simple_lock(&resrc->lock);
5403    resrc->wake_one--;
5404    if (resrc->use_count == 1) {
5405        resrc->flags = L_EXCL;
5406 #if MP_STAT
5407        info->chg_hits++;
5408 #endif
5409 #ifdef DEBUG
5410        resrc->db_flags = DB_UPGRADED;
5411        resrc->locker = lock_caller();
5412 #endif
5413        simple_unlock(&resrc->lock);
5414        return (0);
5415    }
5416 }
5417 }
5418 default: {
5419    cmn_err(CE_PANIC,
5420        "resource_lock: (0x%x) bad flags\n",
5421        resrc);
5422    return (L_FAIL);
5423 }
5424 } /* end switch */
5425 }
5426 case UNINITIALIZED_MUTEX: {
5427    cmn_err(CE_WARN,
5428        "resource_lock_db: (0x%x) uninitialized lock\n",
5429        resrc);
5430    return;
5431 }
5432 default: {
5433    cmn_err(CE_PANIC,
5434        "resource_lock_db: (0x%x) unknown lock\n",
5435        resrc);
5436    return;
5437 }
5438 } /* end switch(resrc->type) */
5439 }
5440
5441 void
5442 resource_unlock(resrc)
```

```
5443 register resource_t *resrc;
5444 {
5445 #ifdef DEBUG
5446 check_lock_address(resrc);
5447 if (lockdebug == 1) {
5448 lock_log(LOG_RESRC_UNLOCK, resrc, 0, resrc->mpdebug,
5449  0, prior_caller(1), prior_caller(2), cpuid);
5450 }
5451 #endif /* DEBUG */
5452
5453 switch (resrc->type) {
5454 case EXCLUSIVE_SLEEP_RESOURCE: {
5455 MP_ASSERT( resrc->process == curproc );
5456 MP_ASSERT( resrc->use_count == 1 );
5457 #ifdef DEBUG
5458 resrc->db_flags = DB_UNLOCKED;
5459 resrc->unlocker = lock_caller();
5460 #endif
5461 #ifdef i486
5462 Locked_Zero(&resrc->use_count);
5463 #else
5464 resrc->use_count = 0;
5465 #endif
5466 /*
5467  * If the simple lock is held, we may be in the window where
5468  * another processor saw the use_count non-zero and is getting
5469  * getting ready to set wake_one to 1 and go to sleep.
5470  * However, if another process is already asleep, the one in
5471  * the window can be safely ignored.
5472  */
5473 while ((resrc->lock != 0) && (resrc->wake_one <= 1)) {
5474 xintr_poll();
5475 }
5476 if (resrc->wake_one)
5477 WAKE_ONE(&resrc->wake_one);
5478 return;
5479 }
5480 case EXCLUSIVE_SLEEP_RECURSIVE_RESOURCE: {
5481 MP_ASSERT( resrc->process == curproc );
5482 MP_ASSERT( resrc->use_count > 0 );
5483 #ifdef DEBUG
5484 resrc->db_flags = DB_UNLOCKED;
5485 resrc->unlocker = lock_caller();
5486 #endif
5487 if (resrc->use_count > 1) {
5488 resrc->use_count--;
5489 return;
5490 }
5491 resrc->process = NULL;
5492 #ifdef i486
5493 Locked_Zero(&resrc->use_count);
5494 #else
5495 resrc->use_count = 0;
5496 #endif
5497 /*
5498  * If the simple lock is held, we may be in the window where
5499  * another processor saw the use_count non-zero and is getting
5500  * getting ready to set wake_one to 1 and go to sleep.
5501  * However, if another process is already asleep, the one in
5502  * the window can be safely ignored.
5503  */
5504 while ((resrc->lock != 0) && (resrc->wake_one <= 1)) {
5505 xintr_poll();
5506 }
5507 if (resrc->wake_one)
5508 WAKE_ONE(&resrc->wake_one);
```

```
5509 return;
5510 }
5511 case SHARED_SLEEP_RESOURCE: {
5512 simple_lock(&resrc->lock);
5513 if(resrc->flags == L_EXCL) {
5514 MP_ASSERT( resrc->process == curproc );
5515 MP_ASSERT( resrc->use_count == 1 );
5516 #ifdef DEBUG
5517 resrc->db_flags = DB_UNLOCKED;
5518 resrc->unlocker = lock_caller();
5519 #endif
5520 resrc->use_count = 0;
5521 resrc->flags = L_SHARED;
5522 simple_unlock(&resrc->lock);
5523 if (resrc->wake_one) {
5524 WAKE_ONE(&resrc->wake_one);
5525 } else if (resrc->wake_all) {
5526 WAKE_ALL(&resrc->wake_all);
5527 }
5528 } else {
5529 MP_ASSERT( resrc->use_count > 0 );
5530 #ifdef DEBUG
5531 resrc->db_flags = DB_UNLOCKED;
5532 resrc->unlocker = lock_caller();
5533 #endif
5534 if (resrc->use_count == 1) {
5535 resrc->use_count = 0;
5536 simple_unlock(&resrc->lock);
5537 if (resrc->wake_one) {
5538 WAKE_ONE(&resrc->wake_one);
5539 } else if (resrc->wake_all) {
5540 WAKE_ALL(&resrc->wake_all);
5541 }
5542 } else {
5543 resrc->use_count--;
5544 simple_unlock(&resrc->lock);
5545 if ((resrc->use_count == 1) &&
5546     (resrc->flags & L_CHG))
5547 WAKE_ONE(&resrc->wake_one);
5548 }
5549 }
5550 return;
5551 }
5552 case UNINITIALIZED_MUTEX: {
5553 cmn_err(CE_WARN,
5554 "resource_unlock_db: (0x%x) uninitialized lock\n",
5555 resrc);
5556 return;
5557 }
5558 default: {
5559 cmn_err(CE_PANIC,
5560 "resource_unlock_db: (0x%x) unknown lock\n",
5561 resrc);
5562 return;
5563 }
5564 } /* end switch(resrc->type) */
5565 }
5566
5567 #endif /* !TRIVIAL_LOCKS */
5568
5569 int
5570 resource_is_locked(resrc, flags)
5571 register resource_t *resrc;
5572 register int flags;
5573 {
5574 switch (resrc->type) {
```

```
5575 case EXCLUSIVE_SLEEP_RESOURCE: {
5576 return (resrc->use_count > 0);
5577 }
5578 case EXCLUSIVE_SLEEP_RECURSIVE_RESOURCE: {
5579 return (resrc->use_count > 0);
5580 }
5581 case SHARED_SLEEP_RESOURCE: {
5582 if (resrc->use_count == 0)
5583 return (0);
5584 if (flags & L_SHARED)
5585 return (resrc->flags & L_SHARED);
5586 if (flags & L_EXCL)
5587 return (resrc->flags == L_EXCL);
5588 return (resrc->use_count > 0);
5589 }
5590 default: {
5591 cmn_err(CE_PANIC,
5592 "resource_is_locked: (0x%x) unknown lock type.\n",
5593 resrc);
5594 return (resrc->use_count > 0);
5595 }
5596 } /* end switch(resrc->type) */
5597 }
5598
5599 int
5600 resource_is_mine(resrc, flags)
5601 register resource_t *resrc;
5602 int flags;
5603 {
5604 switch (resrc->type) {
5605 case EXCLUSIVE_SLEEP_RECURSIVE_RESOURCE: {
5606 return ((resrc->use_count > 0) && (resrc->process == curproc));
5607 }
5608 case EXCLUSIVE_SLEEP_RESOURCE:
5609 #ifdef DEBUG
5610 return ((resrc->use_count > 0) && (resrc->process == curproc));
5611 #else
5612 /* FALL THROUGH */
5613 #endif
5614 case SHARED_SLEEP_RESOURCE: {
5615 cmn_err(CE_WARN,
5616 "resource_is_mine: (0x%x) bad lock type.\n",
5617 resrc);
5618 return (resource_is_locked(resrc, flags));
5619 }
5620 default: {
5621 cmn_err(CE_PANIC,
5622 "resource_is_mine: (0x%x) unknown lock type.\n",
5623 resrc);
5624 }
5625 } /* end switch(resrc->type) */
5626 }
5627
5628 /*
5629  * The following function is used by the lockdebug code to exclude
5630  * functions in mplock.c when searching through the backtrace of
5631  * callers. The assumption is that the the order of the functions
5632  * in the source will be maintained in the object.
5633  */
5634
5635 #ifdef DEBUG
5636 int mplock_bottom() { return 1; }
5637 #endif
5638
5639 #endif /* MP */
```

What is claimed is:

1. A method for use in a multiple processor computer system for changing a tenure of a current owner of a re-entrant synchronization lock, comprising the steps of:
   a. accessing a first set of data identifying a first process as the current owner of a synchronization lock;
   b. determining if a second process that is requesting ownership of the synchronization lock is the first process, and if the first and second processes are the same then increasing a tenure level of the synchronization lock by one and exiting the method;
   c. acquiring exclusive access to a second set of data if said second process is not the same as the first process;
   d. determining if the synchronization lock is owned and if it is not owned by any process assigning the second process as the current owner, assigning a current tenure level of one, releasing said exclusive access to said second set of data, and exiting the method.

2. The method according to claim 1, further comprising the step of:
   e. if said synchronization lock is owned, releasing said exclusive access to said second set of data, performing a predetermined contention process, and returning to step c.

3. A method for use in a multiple processor computer system for releasing a state of tenure of a re-entrant synchronization lock by an owning process, comprising the steps of:
   a. decreasing a tenure level by one;
   b. determining if the decreased tenure level is zero;
   c. acquiring exclusive access to data representing a state of said re-entrant synchronization lock by said owning process if the tenure level is currently zero; and
   d. performing a predetermined re-entrant synchronization lock release process and releasing ownership of said re-entrant synchronization lock.

4. A method for use in a multiple processor computer system for releasing a state of tenure of a re-entrant synchronization lock by an owning process, according to claim 3, further comprising the steps of:
   e. exiting the method of releasing the state of tenure of the re-entrant synchronization lock with the re-entrant synchronization lock at a decreased tenure level but still owned by the current owner.

5. A method for use in a multiple processor computer system for releasing a state of tenure of a re-entrant synchronization lock by an owning process, comprising the steps of:
   a. decreasing a tenure level by one;
   b. determining if the decreased tenure level is zero;
   c. acquiring exclusive access to data representing a state of said re-entrant synchronization lock by said owning process if the tenure level is currently zero;
   d. performing a predetermined re-entrant synchronization lock release process and releasing ownership of said re-entrant synchronization lock; and
   e. exiting the method of releasing the state of tenure of the re-entrant synchronization lock with the re-entrant synchronization lock at a decreased tenure level but still owned by the current owner.

6. A method for use in a multiple processor computer system for changing a tenure of a current owner of a re-entrant synchronization lock, comprising the steps of:
   a. accessing a first set of data identifying a first process as the current owner of a synchronization lock;
   b. determining if a second process that is requesting ownership of the synchronization lock is the first process, and if the first and second processes are the same then increasing a tenure level of the synchronization lock by one and exiting the method;
   c. acquiring exclusive access to a second set of data if said second process is not the same as the first process;
   d. determining if the synchronization lock is owned and if it is not owned by any process assigning the second process as the current owner, assigning a current tenure level of one, and releasing said exclusive access to said second set of data;
   e. executing an exchange of data between the second process and the first process associated with the synchronization lock;
   f. decreasing a tenure level by one;
   g. determining if the decreased tenure level is zero;
   h. acquiring exclusive access to the second set of data representing a state of said re-entrant synchronization lock by said second process if the tenure level is currently zero;
   i. performing a predetermined re-entrant synchronization lock release process and releasing ownership of said re-entrant synchronization lock; and
   j. exiting the re-entrant synchronization lock release process at a decreased tenure level but with said re-entrant synchronization lock still being owned by the second process.

7. For use in a multiple processor computer system, an apparatus comprising:
   means, associated with a requesting processor that executes a first process that requests ownership over a re-entrant synchronization lock, for accessing data identifying a second process as the current owner of the synchronization lock;
   means associated with the requesting processor for determining if the first process is the second process, and if the first and second processes are the same then for increasing tenure level of the synchronization lock by one;
   means associated with the requesting processor for acquiring exclusive access to a second set of data representing the state of the synchronization lock of the second process if said first process is not the same as the second process;
   means associated with the requesting processor for reading said second set of data and determining if said synchronization lock of said second process is currently owned by any process;
   means associated with the requesting processor for assigning the first process as the current owner of the synchronization lock if said synchronization lock is not owned;
   means associated with the requesting processor for assigning a current tenure level of one;
   means associated with the requesting processor for releasing said exclusive access to said second set of data and performing a predetermined contention process if said synchronization lock is owned; and
   means associated with the requesting processor for re-acquiring said exclusive access to said second set of data after performing the predetermined contention process to attempt to acquire said re-entrant synchronization lock.

8. For use in a multiple processor computer system, an apparatus comprising:
   means, associated with a requesting processor that executes a first process having ownership over a re-entrant synchronization lock, for decreasing a tenure level associated with the re-entrant synchronization lock by one;

means associated with the owner process for determining if the decreased tenure level is zero;

means associated with the owner processor for causing the owner processor to acquire exclusive access to data representing a state of said re-entrant synchronization lock if the tenure level is currently zero; and means associated with the owner processor for performing a predetermined re-entrant synchronization lock release process and releasing ownership of said re-entrant synchronization lock with the re-entrant synchronization lock at a decreased tenure level but still owned by the owning process.

* * * * *

UNITED STATES PATENT AND TRADEMARK OFFICE
CERTIFICATE OF CORRECTION

PATENT NO. : 5,317,737
DATED : May 31, 1994
INVENTOR(S) : Richard Barton

It is certified that error appears in the above-indentified patent and that said Letters Patent is hereby corrected as shown below:

Column 177, line 16, after "process;" insert --and--.

Column 178, line 69, delete "a requesting" and substitute --an owner--.

Column 179, line 5, delete "process" and substitute --processor--.

Signed and Sealed this

Twenty-sixth Day of September, 1995

Attest:

BRUCE LEHMAN

Attesting Officer    Commissioner of Patents and Trademarks